United States Patent
Silverstein et al.

(10) Patent No.: US 10,613,213 B2
(45) Date of Patent: Apr. 7, 2020

(54) SYSTEMS, METHODS, AND DEVICES FOR UTILIZING RADAR WITH SMART DEVICES

(71) Applicant: GOOGLE LLC, Mountain View, CA (US)

(72) Inventors: Brian Silverstein, San Carlos, CA (US); Eric Marschalkowski, Inning BY (DE); Eden Sherry, San Francisco, CA (US); Andrew Goldenson, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 216 days.

(21) Appl. No.: 15/590,976

(22) Filed: May 9, 2017

(65) Prior Publication Data
US 2017/0328997 A1  Nov. 16, 2017

Related U.S. Application Data

(60) Provisional application No. 62/336,515, filed on May 13, 2016, provisional application No. 62/442,343, (Continued)

(51) Int. Cl.
*G01S 13/88* (2006.01)
*G01S 7/41* (2006.01)
(Continued)

(52) U.S. Cl.
CPC ............ *G01S 13/886* (2013.01); *G01S 7/003* (2013.01); *G01S 7/41* (2013.01); *G01S 13/06* (2013.01);
(Continued)

(58) Field of Classification Search
CPC ...... G01S 13/886; G01S 13/52; G01S 13/867; G01S 13/06; G01S 7/41; G01S 13/56;
(Continued)

(56) References Cited

U.S. PATENT DOCUMENTS 2,101,637 A    12/1937  Davis
3,681,603 A    8/1972   Scheidweiler et al.
(Continued)

FOREIGN PATENT DOCUMENTS

CN    101305248    11/2008
CN    101849311    9/2010
(Continued)

OTHER PUBLICATIONS

Li Yiran et al. "Wireless Radar Devices for Smart Human-Computer Interaction", 2013 IEEE 56TH International Midwest Symposium on Circuitsa and Systems, Aug. 3, 2014, 65-68 pgs.
(Continued)

*Primary Examiner* — Frank J McGue
(74) *Attorney, Agent, or Firm* — Morgan, Lewis & Bockius LLP

(57) ABSTRACT

The various implementations described herein include methods, devices, and systems for utilizing radar in smart devices. In one aspect, an electronic device includes: (1) circuit boards; (2) a housing encasing the circuit boards; (3) a communications module coupled to the circuit boards, including one or more antennas and configured for communicating with remote devices; (4) a radar module coupled to the circuit boards, configured for generating radar data for a home environment and including: (a) low power radar transmitters; and (b) radar receivers; (5) one or more processors mounted to one of the circuit boards, the processors configured to: (a) govern operation of the communications module and the radar module; (b) determine location and/or movement of detected objects in the home environment; and (c) detect anomalies associated with the detected objects; and (6) a power source coupled to the processors, the communications module, and the radar module.

20 Claims, 44 Drawing Sheets

Related U.S. Application Data filed on Jan. 4, 2017, provisional application No. 62/438,397, filed on Dec. 22, 2016, provisional application No. 62/455,449, filed on Feb. 6, 2017.

(51) Int. Cl.
| | |
|---|---|
| *G01S 13/06* | (2006.01) |
| *G01S 13/52* | (2006.01) |
| *G08B 21/18* | (2006.01) |
| *H04B 1/3827* | (2015.01) |
| *H04L 12/28* | (2006.01) |
| *G01S 7/00* | (2006.01) |
| *G01S 13/56* | (2006.01) |
| *G01S 13/86* | (2006.01) |
| *G01S 13/87* | (2006.01) |

(52) U.S. Cl.
CPC .............. *G01S 13/52* (2013.01); *G01S 13/56* (2013.01); *G01S 13/867* (2013.01); *G01S 13/87* (2013.01); *G01S 13/88* (2013.01); *G08B 21/18* (2013.01); *H04B 1/3827* (2013.01); *H04L 12/2803* (2013.01)

(58) Field of Classification Search
CPC .......... G01S 13/87; G01S 7/003; G01S 13/88; G08B 21/18; H04L 12/2803; H04B 1/3827
USPC .......................................................... 342/52
See application file for complete search history.

(56) References Cited

U.S. PATENT DOCUMENTS

| | | | |
|---|---|---|---|
| 3,948,441 A | 4/1976 | Perkins et al. | |
| 3,991,357 A | 11/1976 | Kaminski | |
| 4,121,110 A | 10/1978 | Solomon | |
| 4,157,506 A | 6/1979 | Spencer | |
| 4,177,923 A | 12/1979 | Krump | |
| 4,225,860 A | 9/1980 | Conforti | |
| 4,249,696 A | 2/1981 | Donnelly et al. | |
| 4,308,991 A | 1/1982 | Peinetti et al. | |
| 4,319,234 A | 3/1982 | Rice | |
| 4,460,125 A | 7/1984 | Barker et al. | |
| 4,528,459 A | 7/1985 | Wiegel | |
| 4,695,246 A | 9/1987 | Beilfuss et al. | |
| 4,842,510 A | 6/1989 | Grunden | |
| 4,845,474 A | 7/1989 | Moore et al. | |
| 4,872,828 A | 10/1989 | Mierzwinski et al. | |
| 4,898,229 A | 2/1990 | Brown et al. | |
| 4,948,044 A | 8/1990 | Cacciatore | |
| 4,955,805 A | 9/1990 | Ishiguro et al. | |
| 4,955,806 A | 9/1990 | Grunden et al. | |
| 5,107,918 A | 4/1992 | McFarlane et al. | |
| 5,127,464 A | 7/1992 | Butler | |
| 5,158,477 A | 10/1992 | Testa | |
| 5,175,439 A | 12/1992 | Haerer et al. | |
| 5,251,813 A | 10/1993 | Kniepkamp | |
| 5,255,179 A | 10/1993 | Zekan et al. | |
| 5,260,669 A | 11/1993 | Higgins et al. | |
| 5,277,363 A | 1/1994 | Hart | |
| 5,347,982 A | 9/1994 | Binzer et al. | |
| 5,352,930 A | 10/1994 | Ratz | |
| 5,381,950 A | 1/1995 | Aldridge | |
| 5,422,808 A | 6/1995 | Catanese, Jr. et al. | |
| 5,452,762 A | 9/1995 | Zillner, Jr. | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,506,569 A | 4/1996 | Rowlette | |
| 5,544,036 A | 8/1996 | Brown, Jr. et al. | |
| 5,570,837 A | 11/1996 | Brown et al. | |
| 5,589,824 A | 12/1996 | Lynch | |
| 5,595,342 A | 1/1997 | McNair et al. | |
| 5,611,484 A | 3/1997 | Uhrich | |
| 5,635,896 A | 6/1997 | Tinsley et al. | |
| 5,646,349 A | 7/1997 | Twigg et al. | |
| 5,655,709 A | 8/1997 | Garnett et al. | |
| 5,697,552 A | 12/1997 | McHugh et al. | |
| 5,719,557 A | 2/1998 | Rattman et al. | |
| 5,736,795 A | 4/1998 | Zuehlke | |
| 5,808,294 A | 9/1998 | Neumann | |
| 5,903,139 A | 5/1999 | Kompelien | |
| 5,918,474 A | 7/1999 | Khanpara et al. | |
| 5,966,077 A | 10/1999 | Wong | |
| 6,008,750 A * | 12/1999 | Cottle .................... | G01S 7/032 342/42 |
| 6,060,719 A | 5/2000 | DiTucci et al. | |
| 6,072,784 A | 6/2000 | Agrawal et al. | |
| 6,084,518 A | 7/2000 | Jamieson | |
| 6,084,522 A | 7/2000 | Addy | |
| 6,089,310 A | 7/2000 | Toth et al. | |
| 6,114,967 A | 9/2000 | Yousif | |
| 6,213,404 B1 | 4/2001 | Dushane et al. | |
| 6,218,995 B1 | 4/2001 | Higgins et al. | |
| 6,222,719 B1 | 4/2001 | Kadah | |
| 6,275,160 B1 | 8/2001 | Ha | |
| 6,315,211 B1 | 11/2001 | Sartain et al. | |
| 6,336,593 B1 | 1/2002 | Bhatnagar | |
| 6,356,038 B2 | 3/2002 | Bishel | |
| 6,377,182 B1 | 4/2002 | Devine et al. | |
| 6,509,838 B1 | 1/2003 | Payne et al. | |
| 6,513,723 B1 | 2/2003 | Mueller et al. | |
| 6,566,768 B2 | 5/2003 | Zimmerman et al. | |
| 6,619,055 B1 | 9/2003 | Addy | |
| 6,622,925 B2 | 9/2003 | Carner et al. | |
| 6,657,418 B2 | 12/2003 | Atherton | |
| 6,743,010 B2 | 6/2004 | Bridgeman et al. | |
| 6,778,091 B2 | 8/2004 | Qualey, III et al. | |
| 6,794,771 B2 | 9/2004 | Orloff | |
| 6,798,341 B1 | 9/2004 | Eckel et al. | |
| 6,886,754 B2 | 5/2005 | Smith et al. | |
| 6,956,463 B2 | 10/2005 | Crenella et al. | |
| 7,174,239 B2 | 2/2007 | Butler et al. | |
| 7,200,467 B2 | 4/2007 | Schanin et al. | |
| 7,476,988 B2 | 1/2009 | Mulhouse et al. | |
| 7,510,126 B2 | 3/2009 | Rossi et al. | |
| 7,537,171 B2 | 5/2009 | Mueller et al. | |
| 7,571,865 B2 | 8/2009 | Nicodem et al. | |
| 7,579,945 B1 | 8/2009 | Richter et al. | |
| 7,592,923 B2 | 9/2009 | Lax | |
| 7,648,077 B2 | 1/2010 | Rossi et al. | |
| 7,673,809 B2 | 3/2010 | Juntunen | |
| 7,748,640 B2 | 7/2010 | Roher et al. | |
| 7,755,220 B2 | 7/2010 | Sorg et al. | |
| 7,775,452 B2 | 8/2010 | Shah et al. | |
| 7,841,542 B1 | 11/2010 | Rosen | |
| 7,900,849 B2 | 3/2011 | Barton et al. | |
| 7,982,602 B2 | 7/2011 | Kates | |
| 7,994,928 B2 | 8/2011 | Richmond | |
| 8,016,205 B2 | 9/2011 | Drew | |
| 8,091,375 B2 | 1/2012 | Crawford | |
| 8,098,166 B2 | 1/2012 | Lang | |
| 8,232,884 B2 | 7/2012 | Pattok et al. | |
| 8,255,090 B2 | 8/2012 | Frader-Thompson et al. | |
| 8,265,798 B2 | 9/2012 | Imes | |
| 8,415,829 B2 | 4/2013 | Di Cristofaro | |
| 8,706,270 B2 | 4/2014 | Fadell et al. | |
| 8,752,711 B2 | 6/2014 | Campbell et al. | |
| 8,942,274 B2 | 1/2015 | Thoukydides | |
| 9,591,658 B2 | 3/2017 | Thoukydides | |
| 2002/0044061 A1 | 4/2002 | Johnson et al. | |
| 2002/0063472 A1 | 5/2002 | Irvin | |
| 2002/0074865 A1 | 6/2002 | Zimmerman et al. | |
| 2003/0037555 A1 | 2/2003 | Street et al. | |
| 2003/0064335 A1 | 4/2003 | Canon | |
| 2003/0090243 A1 | 5/2003 | Atherton | |
| 2003/0231001 A1 | 12/2003 | Bruning | |
| 2004/0120084 A1 | 6/2004 | Readio et al. | |
| 2004/0192219 A1 | 9/2004 | Malone et al. | |
| 2004/0209209 A1 | 10/2004 | Chodacki et al. | |
| 2004/0245349 A1 | 12/2004 | Smith | |

(56) References Cited

U.S. PATENT DOCUMENTS

| | | |
|---|---|---|
| 2005/0043907 A1 | 2/2005 | Eckel et al. |
| 2005/0145705 A1 | 7/2005 | Shah et al. |
| 2005/0195757 A1 | 9/2005 | Kidder et al. |
| 2005/0212708 A1 | 9/2005 | Fifield |
| 2005/0215284 A1 | 9/2005 | Su et al. |
| 2005/0270151 A1 | 12/2005 | Winick |
| 2006/0035657 A1 | 2/2006 | Lim |
| 2006/0102731 A1 | 5/2006 | Mueller et al. |
| 2006/0124759 A1 | 6/2006 | Rossi et al. |
| 2006/0132301 A1 | 6/2006 | Stilp |
| 2006/0133334 A1 | 6/2006 | Ross |
| 2006/0186214 A1 | 8/2006 | Simon et al. |
| 2006/0291483 A1 | 12/2006 | Sela |
| 2007/0045432 A1 | 3/2007 | Juntunen |
| 2007/0070961 A1 | 3/2007 | Tao |
| 2007/0095082 A1 | 5/2007 | Garrett et al. |
| 2007/0114848 A1 | 5/2007 | Mulhouse et al. |
| 2007/0115951 A1 | 5/2007 | Karaoguz et al. |
| 2007/0131787 A1 | 6/2007 | Rossi et al. |
| 2007/0218845 A1 | 9/2007 | Efland et al. |
| 2007/0228183 A1 | 10/2007 | Kennedy et al. |
| 2007/0241203 A1 | 10/2007 | Wagner et al. |
| 2007/0296280 A1 | 12/2007 | Sorg |
| 2008/0001734 A1 | 1/2008 | Stilp et al. |
| 2008/0015742 A1 | 1/2008 | Kulyk et al. |
| 2008/0054082 A1 | 3/2008 | Evans et al. |
| 2008/0054084 A1 | 3/2008 | Olson |
| 2008/0094010 A1 | 4/2008 | Black |
| 2008/0133956 A1 | 6/2008 | Fadell |
| 2008/0147242 A1 | 6/2008 | Roher et al. |
| 2008/0219377 A1 | 9/2008 | Nisbet |
| 2009/0099697 A1 | 4/2009 | Li et al. |
| 2009/0140057 A1 | 6/2009 | Leen |
| 2009/0194601 A1 | 8/2009 | Flohr |
| 2009/0195349 A1 | 8/2009 | Frader-Thompson et al. |
| 2009/0236433 A1 | 9/2009 | Mueller et al. |
| 2009/0241697 A1 | 10/2009 | Kato et al. |
| 2009/0259713 A1 | 10/2009 | Blumrich et al. |
| 2009/0323569 A1 | 12/2009 | Wentink |
| 2010/0006660 A1 | 1/2010 | Leen et al. |
| 2010/0053456 A1 | 3/2010 | Rowell |
| 2010/0070099 A1 | 3/2010 | Watson et al. |
| 2010/0084482 A1 | 4/2010 | Kennedy et al. |
| 2010/0084918 A1 | 4/2010 | Fells et al. |
| 2010/0106305 A1 | 4/2010 | Pavlak et al. |
| 2010/0106322 A1 | 4/2010 | Grohman |
| 2010/0127881 A1 | 5/2010 | Schechter et al. |
| 2010/0182743 A1 | 7/2010 | Roher |
| 2010/0193592 A1 | 8/2010 | Simon et al. |
| 2010/0238036 A1 | 9/2010 | Holcombe |
| 2010/0304770 A1 | 12/2010 | Wietfeldt et al. |
| 2011/0025257 A1 | 2/2011 | Weng |
| 2011/0045867 A1 | 2/2011 | Jeung et al. |
| 2011/0152024 A1 | 6/2011 | Kuehl |
| 2011/0241624 A1 | 10/2011 | Park et al. |
| 2011/0253796 A1 | 10/2011 | Posa et al. |
| 2012/0017611 A1 | 1/2012 | Coffel et al. |
| 2012/0126019 A1 | 5/2012 | Warren et al. |
| 2012/0146796 A1 | 6/2012 | Margon et al. |
| 2012/0248211 A1 | 10/2012 | Warren et al. |
| 2013/0093594 A1 | 4/2013 | Brigham et al. |
| 2013/0176401 A1 | 7/2013 | Monari et al. |
| 2014/0013361 A1 | 1/2014 | Monari et al. |
| 2014/0043496 A1 | 2/2014 | Azuma |
| 2014/0279122 A1 | 9/2014 | Luna |
| 2014/0324410 A1 | 10/2014 | Mathews et al. |
| 2014/0347478 A1 | 11/2014 | Cho et al. |
| 2015/0096876 A1 | 4/2015 | Mittleman et al. |

FOREIGN PATENT DOCUMENTS

| | | |
|---|---|---|
| EP | 0207295 | 1/1987 |
| EP | 510807 | 3/1992 |
| EP | 660287 | 12/1994 |
| EP | 690363 | 6/1995 |
| EP | 1184804 | 3/2002 |
| EP | 2302326 | 8/2005 |
| EP | 2769275 | 8/2014 |
| GB | 2294828 | 5/1996 |
| JP | 09298780 | 11/1997 |
| TW | 535320 | 6/2003 |
| TW | 200709529 | 3/2007 |
| TW | 201232994 | 8/2012 |
| WO | WO 2008054938 | 5/2008 |
| WO | WO 2011131938 | 10/2011 |
| WO | WO 2012068437 | 5/2012 |
| WO | WO 2013058820 | 4/2013 |
| WO | WO 2015/174879 A1 | 11/2015 |
| WO | WO 2016/053645 A1 | 4/2016 |

OTHER PUBLICATIONS

Google Inc., International Search Report/Written Opinion, PCT/US2017/031977, dated Aug. 8, 2017, 10 pgs.

Detroitborg, Nest Learning Thermostat: Unboxing and Review, (online), retrieved from the Internet: URL: http://www.youtube.com/watch?v=KrgcOL4oLzc, retrieved on Aug. 22, 2013, Feb. 10, 2012, pgs.

First Action Interview Office Action Summary dated on May 29, 2015 for U.S. Appl. No. 14/463,550, filed Aug. 19, 2014, all pages.

International Preliminary Report on Patentability issued Apr. 22, 2014, for International Patent Application No. PCT/US2012/030084 filed Mar. 22, 2012, 5 pgs.

International Preliminary Report on Patentability issued on Feb. 25, 2014 for International Patent Application No. PCT/US2011/061344 filed Nov. 18, 2011, 7 pgs.

International Search Report and Written Opinion dated Jul. 6, 2012 for International Patent Application No. PCT/US2012/030084 filed Mar. 22, 2012, 6 pgs.

International Search Report and Written Opinion dated Feb. 20, 2014 for International Application No. PCT/US2013/061021, 18 pgs.

International Search Report and Written Opinion dated Jul. 14, 2014 for International Patent Application PCT/US14/22834 filed Mar. 10, 2014, all pages.

ISR/WO issued Jun. 7, 2012 for International Patent Application No. PCT/US2011/061344 filed Nov. 18, 2011, 9 pages.

Pre-Interview Communication dated on Feb. 27, 2015 for U.S. Appl. No. 14/457,492, filed Aug. 12, 2014, 2 pgs.

SA720 Smoke Alarm User Manual, First Alert, Aug. 2007, 6 pgs.

Shadrach, Energy Scavenging for Wireless Sensor Nodes with a Focus on Vibration to Electricity Conversion, Dissertation [online], retrieved from the Internet: <URL: http://users.cecs.anu.edu.au/—Shad.Roundy/paper/ShadThesis.pdf>, Jun. 2003, 297 pages.

Smoke Alarm User Manual, Kidde, i9060, Dec. 1, 2009, 2 pgs.

U.S. Appl. No. 13/034,678, Non-Final Office Action dated Aug. 19, 2013, 9 pages.

U.S. Appl. No. 13/034,678, Notice of Allowance dated Feb. 4, 2014, 9 pages.

\* cited by examiner

Electronic Tag 206

Antenna Placement inside
the Camera Module

Sensor Board Bottom View

LED Board Top View

SYSTEMS, METHODS, AND DEVICES FOR UTILIZING RADAR WITH SMART DEVICES

RELATED APPLICATIONS

This application claims priority to U.S. Provisional Application No. 62/336,515, filed May 13, 2016, entitled "Systems, Methods, and Devices for Utilizing Radar with Smart Devices," U.S. Provisional Application No. 62/442,343, filed Jan. 4, 2017, entitled "Systems, Methods, and Devices for Utilizing Radar with Smart Devices," U.S. Provisional Application No. 62/438,397, filed Dec. 22, 2016, entitled "Systems, Methods, and Devices for Utilizing Radar-based Touch Interfaces," and U.S. Provisional Application No. 62/455,449, filed Feb. 6, 2017, entitled "Systems, Methods, and Devices for Utilizing Radar with Smart Devices," each of which is hereby expressly incorporated by reference in its entirety.

This application is related to U.S. patent application Ser. No. 14/819,373, filed Aug. 5, 2015, entitled "Systems, Methods, and Devices for Managing Coexistence of Multiple Transceiver Devices by Optimizing Component Layout," which is hereby incorporated by reference in its entirety.

TECHNICAL FIELD

This relates generally to computer technology, including but not limited to methods and systems for utilizing radar communications with smart devices.

BACKGROUND

Devices in a smart home environment include a host of circuit components and interfaces for enabling communications with other systems, devices, and/or servers. Some smart devices include multiple radios within a compact area for receiving and transmitting signals on various wavelengths to other devices and across networks. For example, some smart devices gather information and/or communicate via radar.

SUMMARY

Accordingly, there is a need for methods, apparatuses, and systems for managing radar usage and communications. Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to manage radar with smart devices. In one aspect, an electronic tag includes a first circuit configured to communicate with one or more other devices at a first frequency and a second circuit configured to communicate with the one or more other devices via radar.

In some implementations, a location beacon (also sometimes called a location tag) is used to submit a unique signature to a radar subsystem. In some implementations, the signature is encoded by sending a unique signature on the same frequency band as the radar system.

Radar systems detect the presence, direction, distance, and/or speed of objects. Radar presents advantages over other detection systems, such as passive infrared (PIR) motion sensors. Radar systems detect a wide range of velocities and thus can differentiate between different objects in motion. For example, radar systems can distinguish between pets and persons in a home. In addition, radar systems can detect whether an object is moving toward the radar system or away (or tangential). Radar systems are capable of detecting minute human movements, such as a heartbeat. Also, in comparison to convention heat detection systems, it is more difficult to evade detection in a radar system. For example, a heavy winter coat may be sufficient to evade detection in some heat detection systems.

In regards to PIR sensors, generally radar systems can detect objects further away than PIR sensors. Moreover, radar systems do not need a lens and have a wider field of view than PIR sensors. Radar systems are generally less sensitive to heat than PIR sensors. For example, PIR sensors can trigger false positives due to heating, via sunlight or operation of surrounding components.

Radar systems are also capable of penetrating walls and other objects. Thus, a radar system can monitor multiple rooms in a dwelling and detect movement behind various objects in the dwelling. Therefore, radar systems are capable of communicating between rooms and through objects. Radar systems are also capable of detecting and interpreting particular gestures.

Unlike conventional camera systems, radar systems operate without regards to the level of visible light in a room or dwelling. In addition, radar systems can be configured to consume less power by adjusting a duty cycle and/or sending out brief pulses at set intervals.

A radar system may be one-dimensional (1D) or multi-dimensional. A one-dimensional radar consists of 1 transmitter and 1 receiver. A multi-dimensional radar includes a plurality of transmitters and/or a plurality of receivers (e.g., 3 transmitters and 4 receivers).

A radar system can be used for multiple purposes, including proximity detection, occupancy determinations, people counts, location determinations, single-person respiration monitoring, classification of motion events, multi-person respiration monitoring, single-person identification, and multi-person identification. For some purposes, such as proximity and/or single-person respiration monitoring, 1D radar systems can be as effective (or nearly as effective) as multi-dimensional radar systems. For other purposes, such as location determinations and multi-person respiration monitoring, multi-dimensional radar systems provide significantly more precision and/or accuracy. In some implementations, a plurality of 1D radar systems are networked together to provide precision and accuracy as good as, or better, than a single multi-dimensional radar system.

There is provided an electronic device, such as a home electronic device, comprising: a communication module including one or more antennas and configured for communicating with one or more remote devices; a radar module configured for generating radar data for an environment, such as a home environment; and one or more processors configured to determine location and/or movement of objects in the home by analyzing the radar data. In examples, anomalies may be determined associated with the location and/or movement of the detected objects. These anomalies may include determining that objects are moving in an unusual manner or include objects that should not be present in the environment or part of the environment. The anomalies may include one or more of an unexpected velocity, an unexpected acceleration, and an unexpected location. The determination of whether these factors are unexpected may be performed by comparison to stored data, such as historical data, mean data, or median data for objects found in the home. In examples, the radar module may include one or more low power radar transmitters, wherein by the term low we mean a power suitable for use in the home, details of which are set out in the following detailed description. The radar module may additionally include one or more radar receivers. The electronic device may further comprise: one or more circuit boards; a housing encasing the one or more circuit boards; the communications module may be coupled to the one or more circuit boards; the radar module may be coupled to the one or more circuit boards; and the one or more processors may be mounted to the one or more circuit boards. The one or more processors may be configured to: govern operation of the communications module and the radar module, and/or detect anomalies associated with the detected objects based at least in part on the determined location and/or movement of the detected objects. The electronic device may further comprise a power source coupled to the one or more processors, the communications module, and the radar module.

The radar module may be arranged to have a field of view through the housing, such as through a front surface of the housing.

The electronic device may be a smart home electronic device such as selected from a group consisting of: a smart thermostat; a smart camera; a hub device; a smart hazard detector; a smart irrigation device; a smart media playback device; a smart entryway interface device; a smart appliance; and a smart security device. By the term "smart" we mean a device that can communicate with other devices such as wirelessly, wired and directly, indirectly or by the Internet.

The detection of anomalies associated with the detected objects may include determining that a detected object has one or more of: an unexpected velocity, an unexpected acceleration, and an unexpected location. Unexpected velocity, unexpected acceleration, and unexpected location may be determined by comparison to expected location and movement information for objects in the home environment based on historical data for the home environment.

Other aspects as set out in the detailed description below may be added or combined with the above examples.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
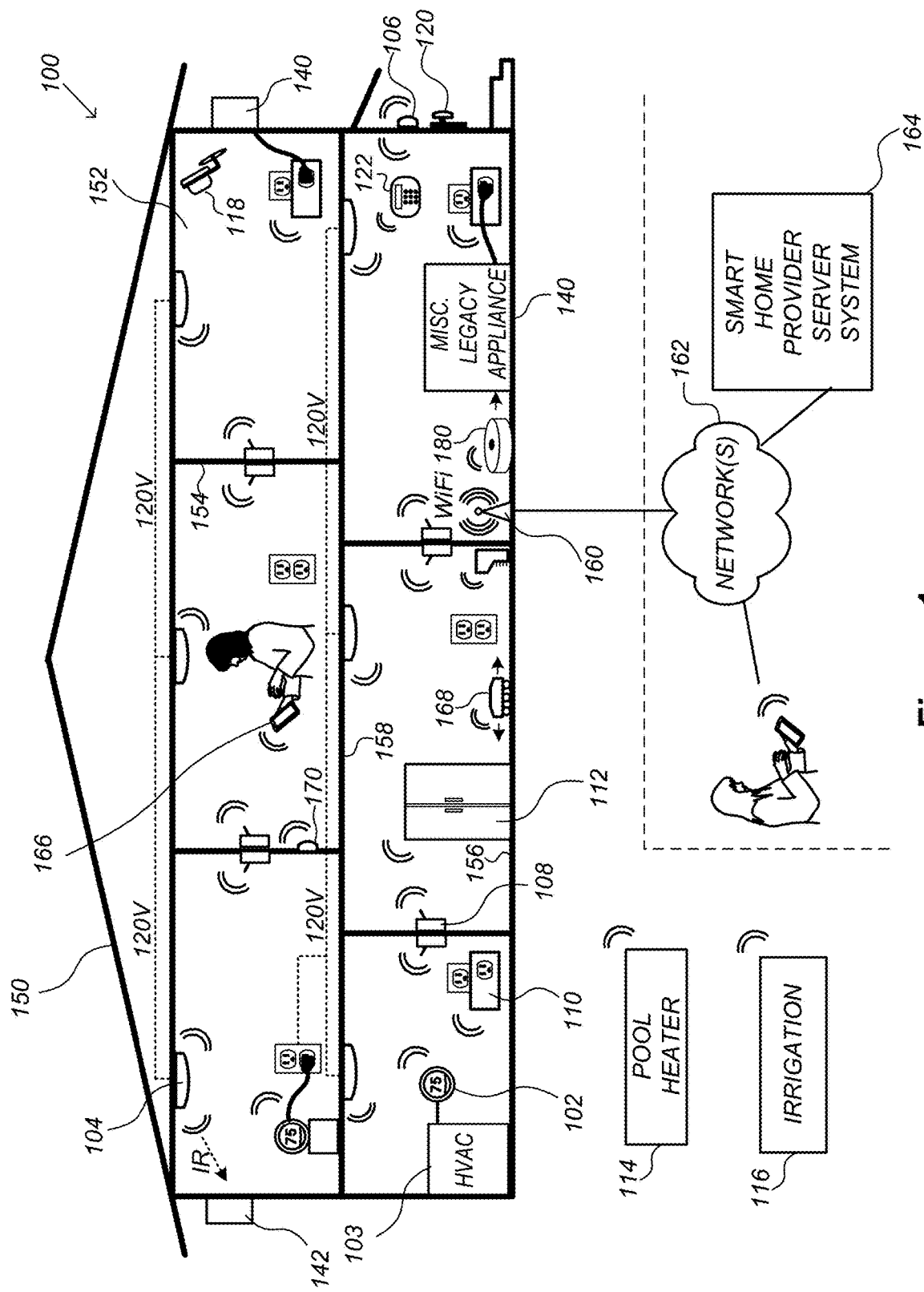
FIG. 1 is an example smart home environment, in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, affixed to, integrated with and/or supported by a wall 154, floor 156 or ceiling 158. In some implementations, electronic tags are affixed to a wall 154, floor 156, ceiling 158, window, or door.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (e.g., "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). The cameras 118 optionally include one or more sensors (e.g., IR sensors, radar systems, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

In some implementations, the smart home environment 100 includes one or more electronic tags that are configured to communicate with one or more smart devices via radar. In some implementations, the electronic tags are affixed to an object such as a window, door, or wall and are configured to impart a radar signature for the object. In some implementations, the electronic tags are affixed to an entity, such as a pet, and are configured to impart a radar signature for the entity. In some implementations, the electronic tags are configured to communicate via multiple wavelengths and/or protocols. For example a particular electronic tag is configured to communicate via RFID as well as via radar. In some implementations, a smart device, such as any of the smart devices discussed previously, includes a radar module for detecting the presence, direction, distance, and/or speed of objects, by sending out pulses of high-frequency electromagnetic waves that are reflected off the object back to the source. In some implementations, a smart device further includes a communications module, distinct from the radar module, for communicating with other smart devices and/or the electronic tags (e.g., via RFID, Wi-Fi, Bluetooth, and the like).

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices communicate via radar. In some implementations, the smart devices communicate with one or more electronic tags via radar. In some implementations, the smart devices communicate with one another and/or with electronic tags using a plurality of communication channels, such as RFID and radar. In some implementations, the smart devices communicate via one or more radio frequency bands, such as 3-10 GHz, 24-24.5 GHz, 57-64 GHz, and/or 77-81 GHz.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application (sometimes called a smart home application) running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

Figure 7A:
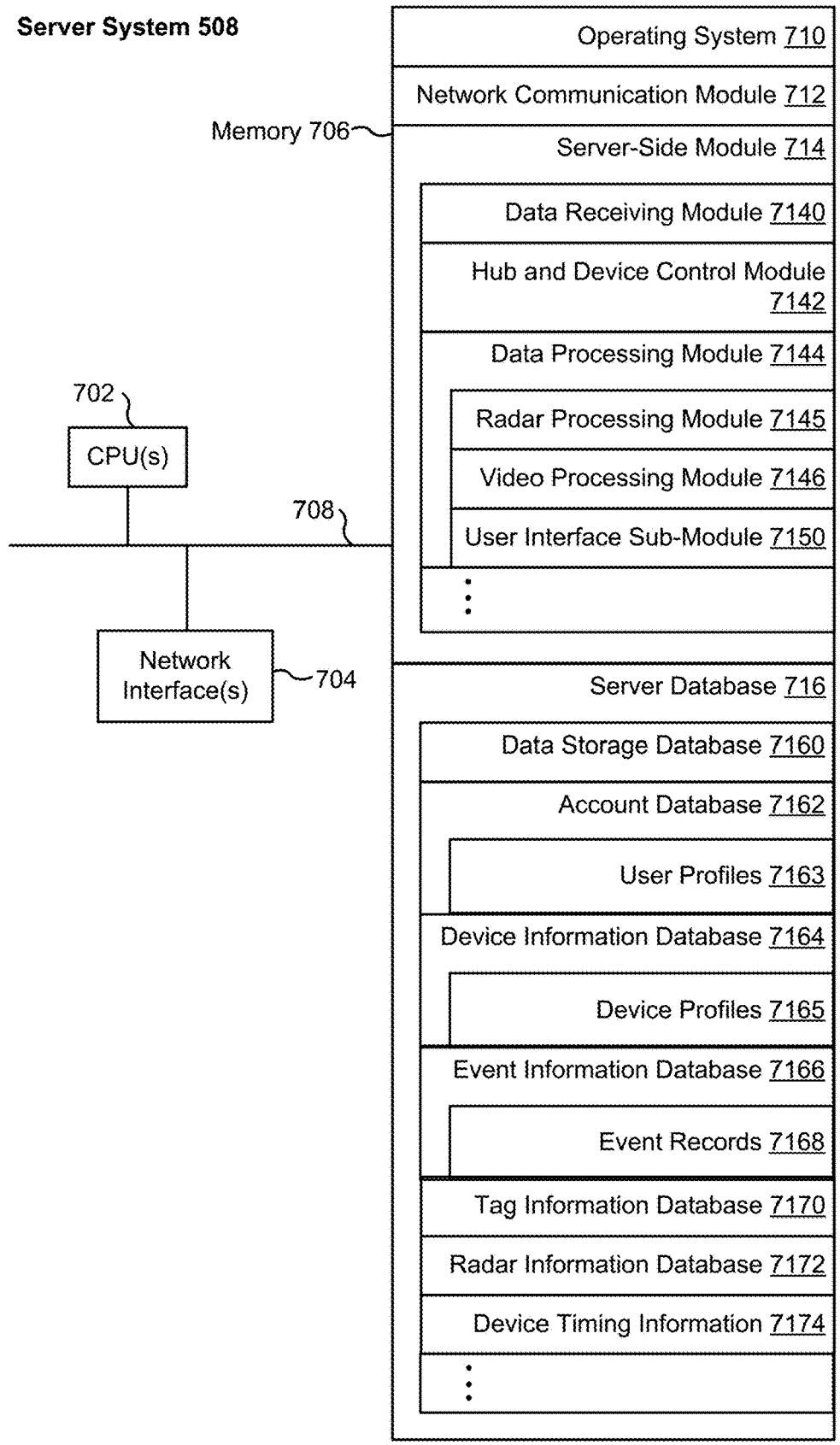
FIG. 7A is a block diagram illustrating a representative server system, in accordance with some implementations.

In some implementations, smart home environment 100 includes a local storage device for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, the local storage device is communicatively coupled to one or more smart devices via a smart home network (e.g., smart home network 202, FIG. 2). In some implementations, the local storage device is selectively coupled to one or more smart devices via a wired and/or wireless communication network. In some implementations, the local storage device is used to store video data when external network conditions are poor. For example, the local storage device is used when an encoding bitrate of camera 118 exceeds the available bandwidth of the external network (e.g., network(s) 162). In some implementations, the local storage device temporarily stores video data from one or more cameras (e.g., camera 118) prior to transferring the video data to a server system (e.g., server system 508, FIG. 5). In some implementations, the local storage device is a component of a camera device. In some implementations, each camera device includes a local storage. In some implementations, the local storage device performs some or all of the data processing described below with respect to server system 508 (FIG. 7A). In some implementations, the local storage device stores some or all of the data described below with respect to server system 508, such as data storage database 7160, account database 7162, device information database 7164, and event information database 7166. In some implementations, the local storage device performs some or all of the operations described herein with respect to the server system 508.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings or other structures, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Figure 2:
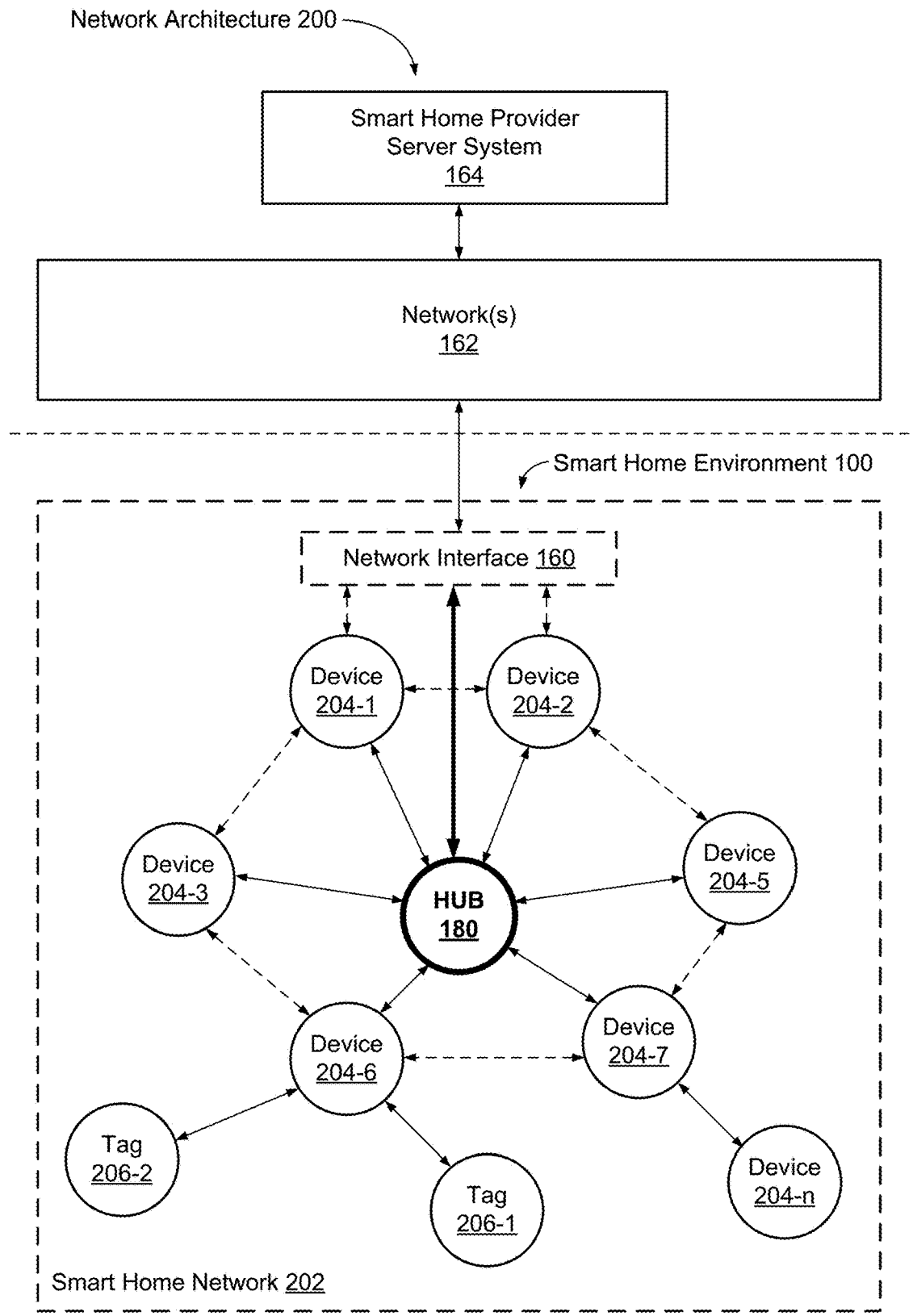
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, radar, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes. In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 optionally send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment includes electronic tags 206, such as the electronic tag 206-1 and the electronic tag 206-2. In some implementations, the electronic tags 206 are low-power nodes in the smart home network 202. In some implementations, the electronic tags 206 are not connected to an external power source. In some implementations, the electronic tags 206 are battery-powered. In some implementations, an electronic tag (e.g., electronic tag 206-1) is capable of harvesting energy for use in operating the tag. For example, harvesting thermal, vibrational, electromagnetic, and/or solar energy received by the electronic tag.

In some implementations, electronic tags 206 are capable of "listening" on a first communication channel (e.g., an RFID channel), but not sending messages. In some implementations, electronic tags 206 are passive radar devices. Passive radar devices comprise radar devices that do not have a dedicated transmitter.

Passive radar devices include corner reflector devices and printed radar devices. Corner reflector devices are generally used to generate a strong radar echo from objects that would otherwise have only very low effective radar cross section (RCS). A corner reflector includes two or more electrically conductive surfaces that are mounted crosswise (e.g., at an angle of exactly 90 degrees). Incoming electromagnetic waves are backscattered by multiple reflection accurately in that direction from which they come. Thus, even small objects with small RCS yield a strong echo.

In some implementations, printed radar reflectors comprise simple aluminum fibers that form half-wave resonators within the object to be tracked (e.g., a piece of paper). The radar-reflecting fibers are approximately the same diameter as paper fibers (typically 6.5 mm long and 1.5 µm in diameter). Randomly oriented radar-reflecting fibers provide a unique backscatter pattern that can be read and stored in a database for future identification. Ordered patterns can also be designed so that individual resonators are coupled or decoupled, whatever is likely to give the optimum backscatter pattern. When illuminated with radar, the backscattered fields interact to create a unique interference pattern that enables one tagged object to be identified and differentiated from other tagged objects.

In some implementations, electronic tags 206 are active radar devices capable of transmitting radio frequency tones or pulses independent of any received waves. In various implementations, electronic tags 206 are capable of reflecting, amplifying, and/or modulating received radio waves. Active radar devices comprise single transistor devices, MEMS-based devices, and mechanical gated (shuttered) devices.

In some implementations, electronic tags 206 are configured to communicate via radar in response to enablement commands received via a communications channel (e.g., an RFID channel) from a smart device, such as smart device 204-6 in FIG. 2. In some implementations, electronic tags 206 are configured to communicate via radar at particular intervals, such as intervals preset by a smart device. For example, electronic tags 206-1 and 206-2 are configured by device 204-6 such that only one of the tags is communicating via radar at any given time. In some implementations, electronic tags 206 are configured to communicate via radar in response to detecting a change in the environment, such as motion of the object to which the electronic tag is affixed. For example, in some implementations, electronic tags 206 include one or more of: a humidity sensor; a temperature sensor; an accelerometer; a gyroscope; and/or an optical sensor. In this example, the tags are configured to communicate via radar in response to changes detected by one or more of the sensors.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
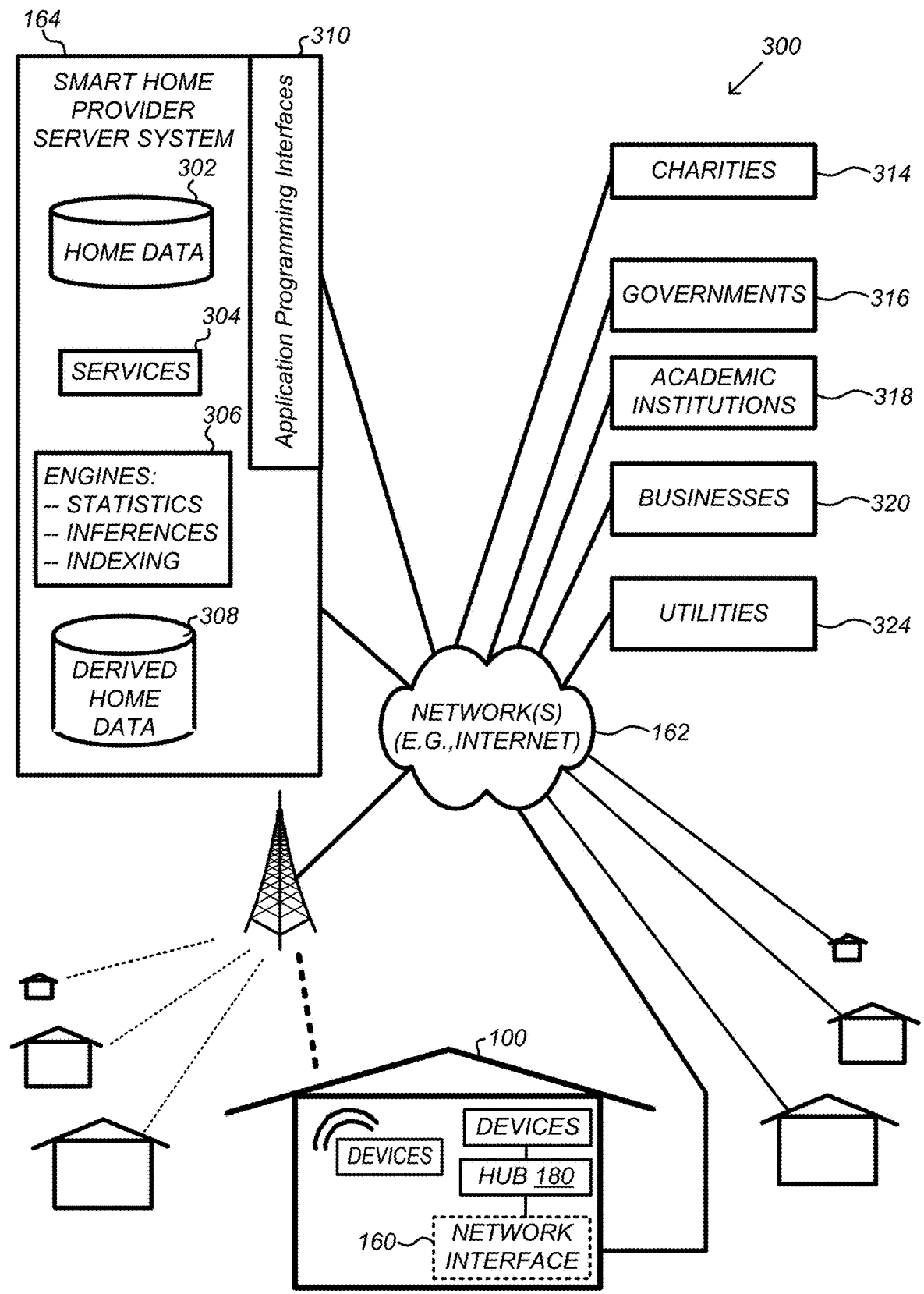
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
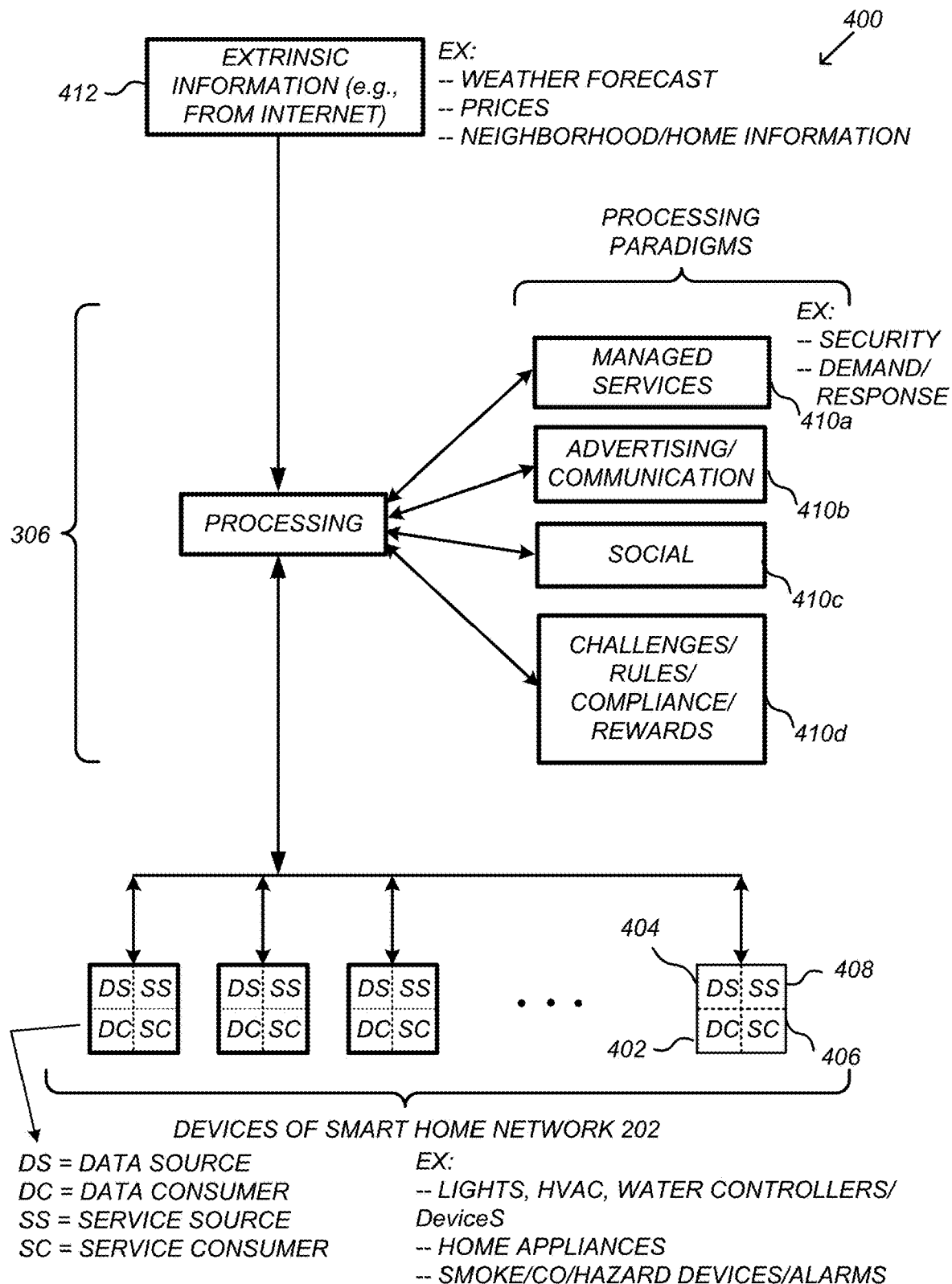
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
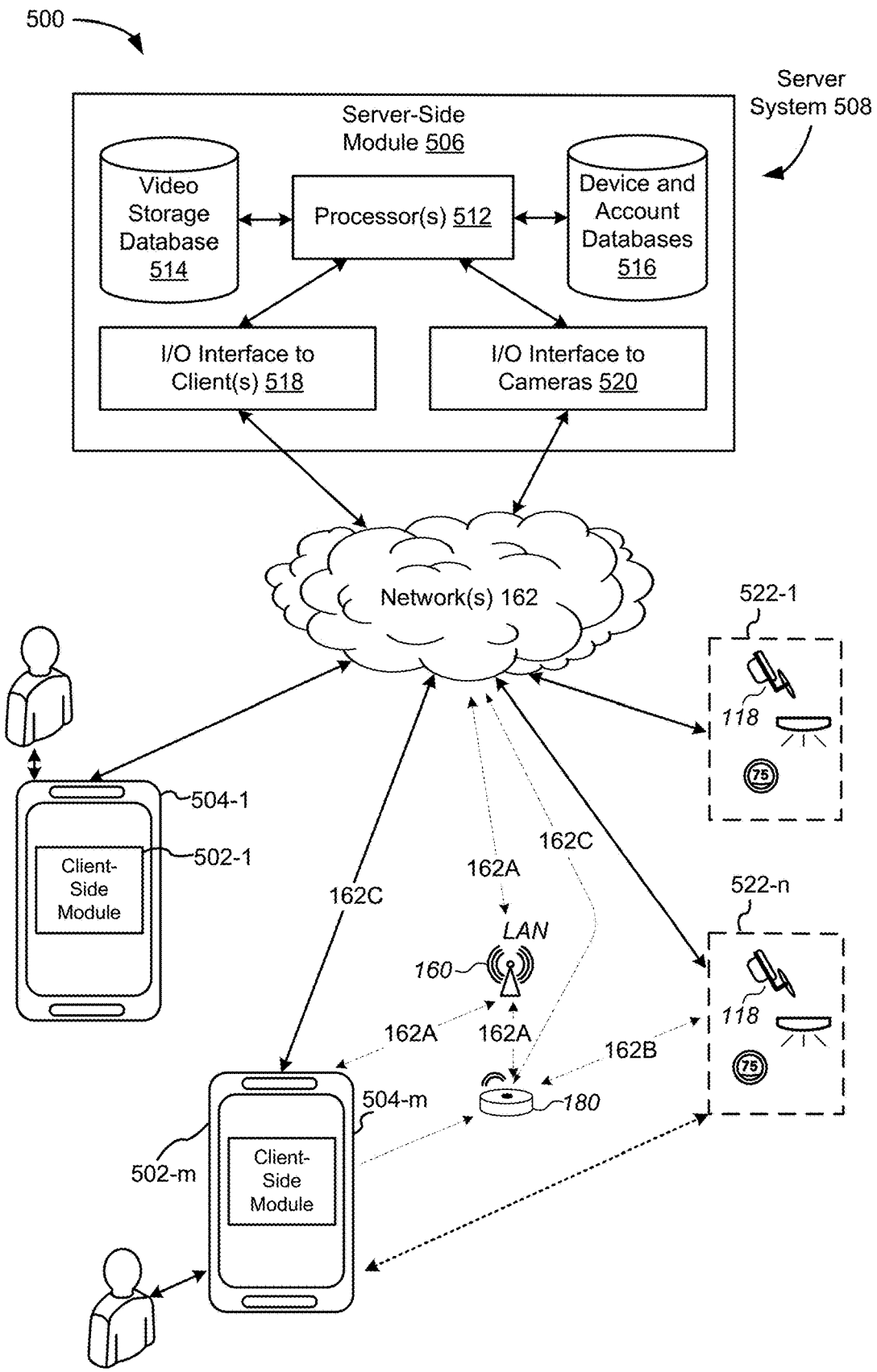
FIG. 5 is a representative operating environment in which a server system interacts with client devices and hub devices communicatively coupled to local smart devices, in accordance with some implementations.

FIG. 5 illustrates a representative operating environment 500 in which a server system 508 provides data processing for one or more smart devices, such as one or more cameras 118. In some implementations, the server system 508 monitors and facilitates review of motion events in video streams captured by video cameras 118. In some implementations, server system 508 monitors and facilitates review of radar events detected by one or more radar-equipped smart devices. As shown in FIG. 5, in some implementations, the server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the server system 508. In some implementations, the server system 508 includes a dedicated video processing server that provides video processing services to video sources and client devices 504 independent of other services provided by the server system 508. In some implementations, the server system 508 includes a dedicated radar processing server that provides radar processing services for various radar-equipped devices and client device 504.

In some implementations, each of the video sources 522 includes one or more video cameras 118 that capture video and send the captured video to the server system 508 substantially in real-time. In some implementations, each of the video sources 522 optionally includes a controller device (not shown) that serves as an intermediary between the one or more cameras 118 and the server system 508. The controller device receives the video data from the one or more cameras 118, optionally, performs some preliminary processing on the video data, and sends the video data to the server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 508. In some implementations, the captured video is stored in a local storage (not shown) prior to being uploaded to the server system 508.

As shown in FIG. 5, in accordance with some implementations, each of the client devices 504 includes a client-side module 502. The client-side module 502 communicates with a server-side module 506 executed on the server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 508 is implemented on one or more standalone data processing apparatuses or a distributed network of computers. In some implementations, the server system 508 also employs various virtual devices and/or services of third party service providers (e.g., third-party cloud service providers) to provide the underlying computing resources and/or infrastructure resources of the server system 508. In some implementations, the server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the server system 508 can vary in different implementations.

For example, in some implementations, client-side module 502 is a thin-client that provides only user-facing input and output processing functions, and delegates all other data processing functionalities to a backend server (e.g., the server system 508). Similarly, in some implementations, a respective one of the video sources 522 is a simple video capturing device that continuously captures and streams video data to the server system 508 without no or limited local preliminary processing on the video data. Although many aspects of the present technology are described from the perspective of the server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the server system 508, the client device 504, and the video sources 522 cooperatively.

It should be understood that operating environment 500 that involves the server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

Figure 6:
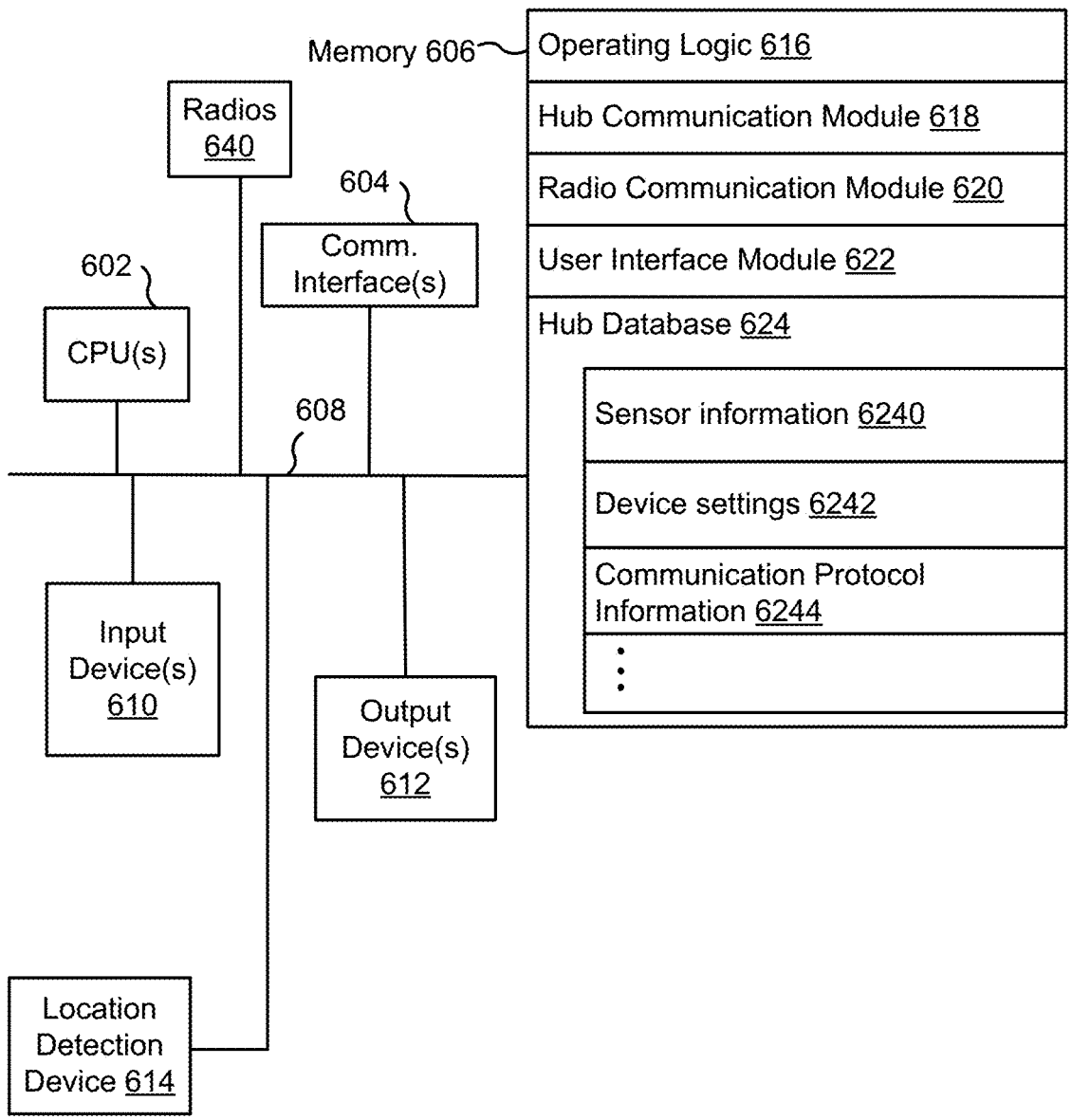
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, radar, occupancy sensors (e.g., using RFID sensors), ambient light sensors, motion detectors, accelerometers, and/or gyroscopes.

The radios 640 enable and/or connect to one or more radio communication networks in the smart home environments, and allow a hub device to communicate with smart devices 204. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some implementations, the radios 640 include multiple different physical radios, each of which implements a different communication protocol. For example, in some implementations the radios 640 include a Wi-Fi radio, a Bluetooth radio and an IEEE 802.15.4 radio, all of which operate at 2.4 GHz. In some implementations, the radios 640 include one or more radar transceivers. In some implementations, some of the radios are combined. For example, in some implementations, a Bluetooth radio and a Wi-Fi radio are incorporated in a single chip coupled to a single antenna. In other implementations, a Bluetooth radio and an IEEE 802.15.4 radio are incorporated in a single chip coupled to a single antenna. Any combination of these radios can be implemented in any of the smart devices employed in a smart home environment.

In some implementations, hub device 180 includes a radar subsystem. In some implementations, the radar subsystem uses radio waves (also sometimes called radar signals) to determine the range, angle, position, or velocity of objects. In some implementations, the radar subsystem transmits radio waves (or microwaves) that reflect from objects in their path. The radar subsystem further receives and processes the reflected waves to determine properties of the objects. In some implementations, the radar subsystem includes one or more communication modules (e.g., radio communication module 620) in memory 606, one or more radios 640, and/or one or more communication interfaces 604.

Communication interfaces 604 include, for example, hardware capable of interfacing the one or more radios 640 with the hub device 180, so as to enable data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some implementations, communication interfaces 604 include one or more antennas for transmitting and receiving signals as governed by radios 640.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer-readable storage medium. In some implementations, memory 606, or the non-transitory computer-readable storage medium of memory 606, stores the following programs, modules, and data structures, or a subset or superset thereof:

Operating logic 616 including procedures for handling various basic system services and for performing hardware dependent tasks;

Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);

Radio communication module 620 for connecting the hub device 180 to other devices (e.g., controller devices, smart devices 204 in smart home environment 100, client devices 504, and/or electronic tags) via one or more radio communication devices (e.g., radios 640);

User interface module 622 for providing and displaying a user interface in which settings, captured data, and/or other data for one or more devices (e.g., smart devices 204 in smart home environment 100) can be configured and/or viewed; and Hub device database 624, including but not limited to:
    Sensor information 6240 for storing and managing data received, detected, and/or transmitted by one or more sensors of the hub device 180 and/or one or more other devices (e.g., smart devices 204 in smart home environment 100);
    Device settings 6242 for storing operational settings for one or more devices (e.g., coupled smart devices 204 in smart home environment 100), such as device identifications, timing settings, radar settings, operational modes, and/or preference settings; and
    Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

FIG. 7A is a block diagram illustrating the server system 508 in accordance with some implementations. The server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer-readable storage medium. In some implementations, memory 706, or the non-transitory computer-readable storage medium of memory 706, stores the following programs, modules, and data structures, or a subset or superset thereof:

Operating system 710 including procedures for handling various basic system services and for performing hardware dependent tasks;

Network communication module 712 for connecting the server system 508 to other systems and devices (e.g., client devices, electronic devices, and systems connected to one or more networks 162, FIGS. 1-5) via one or more network interfaces 704 (wired or wireless);

Server-side module 714, which provides server-side functionalities for device control, data processing and data review, including but not limited to:

Data receiving module 7140 for receiving data from electronic devices (e.g., video data from a camera 118 and/or radar information from a radar-equipped device), and preparing the received data for further processing and storage in the data storage database 7160;

Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 7144 for processing the data provided by the electronic devices, and/or preparing and sending processed data to a device for review (e.g., client devices 504 for review by a user), including but not limited to:

Radar processing module 7145 for processing radar data provided by radar-equipped devices, such as classifying radar events and identifying radar-detected entities;

Video processing module 7146 processing video data provided by one or more cameras, such as classifying motion events and identifying motion entities; and User interface sub-module 7150 for communicating with a user (e.g., sending alerts, timeline events, etc. and receiving user edits and zone definitions and the like); and Server database 716, including but not limited to:

Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;

Account database 7162 for storing account information for user accounts, including user account information such as user profiles 7163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

Device information database 7164 for storing device information related to one or more devices such as device profiles 7165, e.g., device identifiers and hub device specific secrets, independently of whether the corresponding hub devices have been associated with any user account;

Event information database 7166 for storing event information such as event records 7168, e.g., event log information, event categories, and the like;

Tag information database 7170 for storing tag information for one or more electronic tags, e.g., tag identifiers, tag signal timing, tag location information, and the like;

Radar information database 7172 for storing radar information for one or more smart devices, e.g., radar band and/or mode information, historical radar data, radar object modeling information, and the like; and Device timing information 7174 for storing timing information for one or more smart device, e.g., timing synchronization information for synchronizing various smart devices.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 7B:
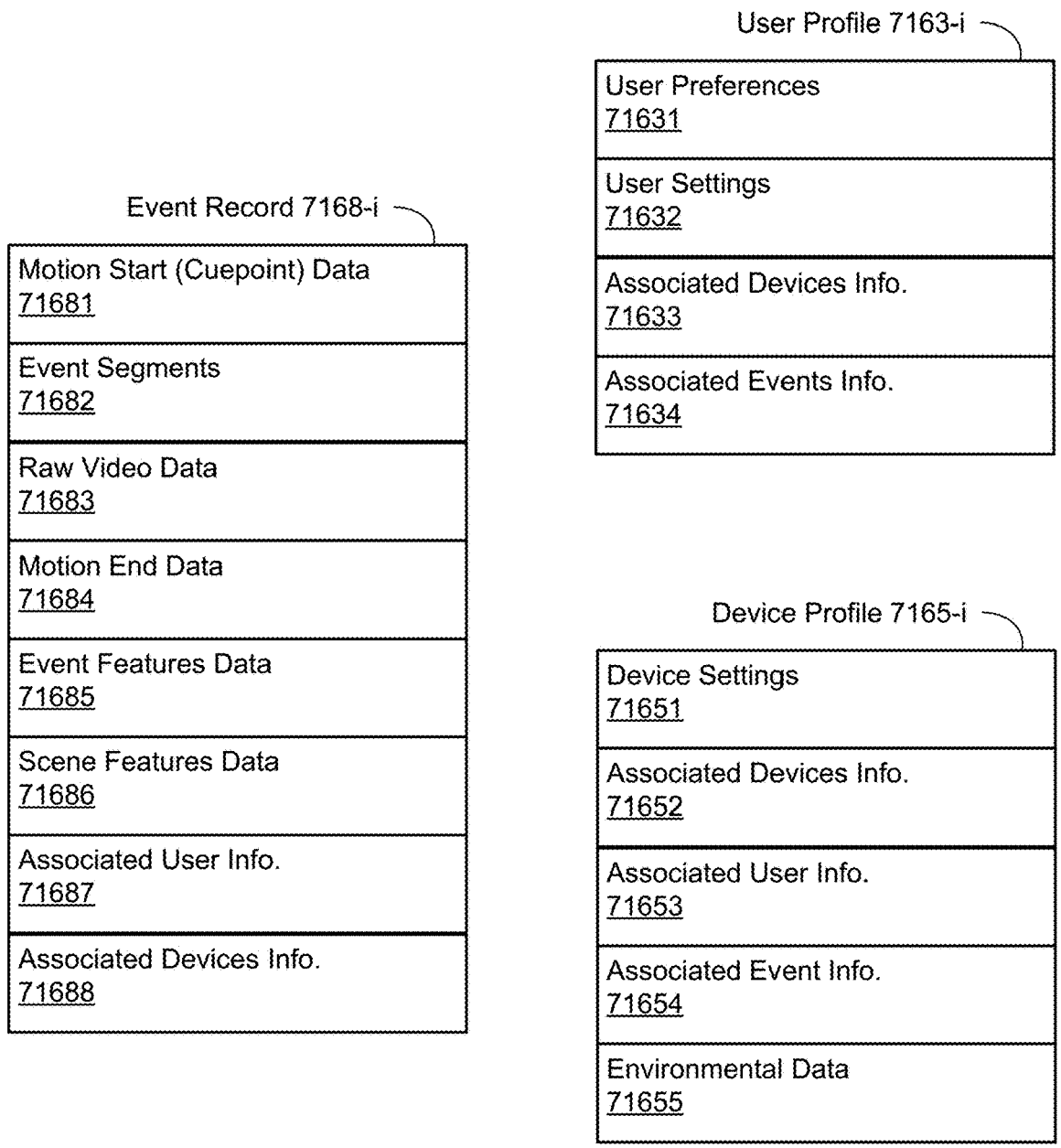
FIG. 7B illustrates various data structures used by some implementations.

FIG. 7B illustrates various data structures used by some implementations, including an event record 7168-i, a user profile 7163-i, and a device profile 7165-i. The event record 7168-i corresponds to a motion event i and data for the motion event i. In some instances, the data for motion event i includes motion start (also sometimes called cuepoint) data 71681, event segments data 71682, raw video data 71683, motion end data 71684, event features data 71685, scene features data 71686, associated user information 71687, and associated devices information 71688. In some instances, the event record 7168-i includes only a subset of the above data. In some instances, the event record 7168-i includes additional event data not shown such as data regarding event/motion masks.

Motion start data 71681 includes date and time information such as a timestamp and optionally includes additional information such as information regarding the amount of motion present and/or the motion start location. Similarly, motion end data 71684 includes date and time information such as a timestamp and optionally includes additional information such as information regarding the amount of motion present and/or the motion end location.

Event segments 71682 includes information regarding segmentation of motion event i. In some instances, event segments are stored separately from the raw video data 71683. In some instances, the event segments are stored at a lower display resolution than the raw video data. For example, the event segments are optionally stored at 480p or 780p and the raw video data is stored at 1080i or 1080p. Storing the event segments at a lower display resolution enables the system to devote less time and resources to retrieving and processing the event segments. In some instances, the event segments are not stored separately and the segmentation information includes references to the raw video data 71683 as well as date and time information for reproducing the event segments.

Event features data 71685 includes information regarding event features such as event categorizations/classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like. Scene features data 71686 includes information regarding the scene in which the event took place such as depth map information, information regarding the location of windows, televisions, fans, the ceiling/floor, etc., information regarding whether the scene is indoors or outdoors, information regarding zones of interest, and the like.

Associated user information 71687 includes information regarding users associated with the event such as users identified in the event, users receiving notification of the event, and the like. In some instances, the associated user information 71687 includes a link, pointer, or reference to a user profile 7163 for to the user. Associated devices information 71688 includes information regarding the device or devices involved in the event (e.g., a camera 118 that recorded the event). In some instances, the associated devices information 71688 includes a link, pointer, or reference to a device profile 7165 for the device.

The user profile 7163-*i* corresponds to a user i associated with the smart home network (e.g., smart home network 202) such as a user of a hub device 204, a user identified by a hub device 204, a user who receives notifications from a hub device 204 or from the server system 508, and the like. In some instances, the user profile 7163-*i* includes user preferences 71631, user settings 71632, associated devices information 71633, and associated events information 71634. In some instances, the user profile 7163-*i* includes only a subset of the above data. In some instances, the user profile 7163-*i* includes additional user information not shown such as information regarding other users associated with the user i.

The user preferences 71631 include explicit user preferences input by the user as well as implicit and/or inferred user preferences determined by the system (e.g., server system 508 and/or client device 504). In some instances, the inferred user preferences are based on historical user activity and/or historical activity of other users. The user settings 71632 include information regarding settings set by the user i such as notification settings, device settings, and the like. In some instances, the user settings 71632 include device settings for devices associated with the user i.

Associated devices information 71633 includes information regarding devices associated with the user i such as devices within the user's smart home environment 100 and/or client devices 504. In some instances, associated devices information 71633 includes a link, pointer, or reference to a corresponding device profile 7165. Associated events information 71634 includes information regarding events associated with user i such as events in which user i was identified, events for which user i was notified, events corresponding to user i's smart home environment 100, and the like. In some instances, the associated events information 71634 includes a link, pointer, or reference to a corresponding event record 7168.

The device profile 7165-*i* corresponds to a device i associated with a smart home network (e.g., smart home network 202) such a hub device 204, a camera 118, a client device 504, and the like. In some instances, the device profile 7165-*i* includes device settings 71651, associated devices information 71652, associated user information 71653, associated event information 71654, and environmental data 71655. In some instances, the device profile 7165-*i* includes only a subset of the above data. In some instances, the device profile 7165-*i* includes additional device information not shown such as information regarding whether the device is currently active.

Device settings 71651 include information regarding the current settings of device i such as positioning information, mode of operation information, and the like. In some instances, the device settings 71651 are user-specific and are set by respective users of the device i. Associated devices information 71652 includes information regarding other devices associated with device i such as other devices linked to device i and/or other devices in the same smart home network as device i. In some instances, associated devices information 71652 includes a link, pointer, or reference to a respective device profile 7165 corresponding to the associated device.

Associated user information 71653 includes information regarding users associated with the device such as users receiving notifications from the device, users registered with the device, users associated with the smart home network of the device, and the like. In some instances, associated user information 71653 includes a link, pointer, or reference to a user profile 7163 corresponding to the associated user.

Associated event information 71654 includes information regarding events associated with the device i such as historical events involving the device i. In some instances, associated event information 71654 includes a link, pointer, or reference to an event record 7168 corresponding to the associated event.

Environmental data 71655 includes information regarding the environment of device i such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

Figure 8:
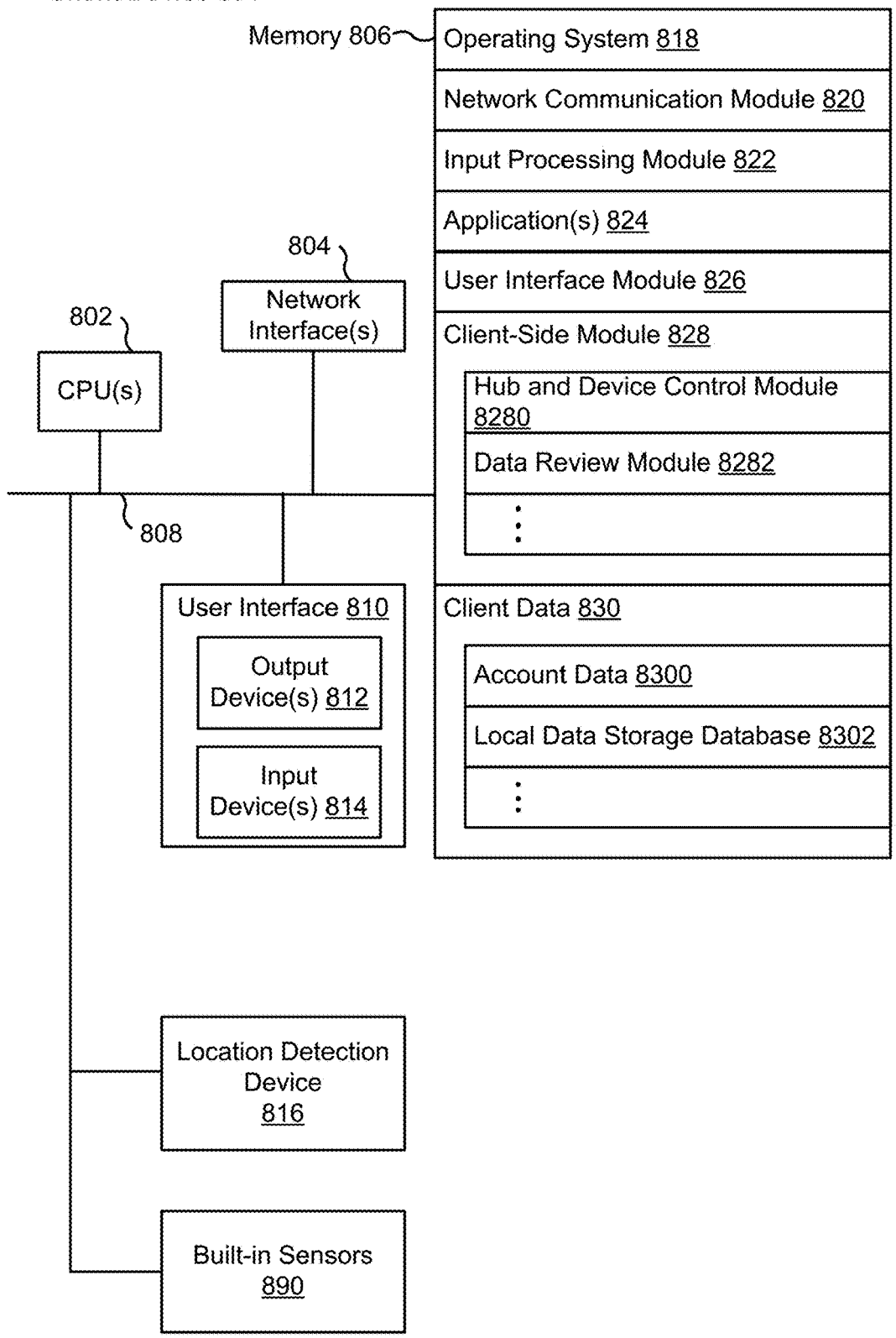
FIG. 8 is a block diagram illustrating a representative client device associated with a user account, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). Optionally, the client device also includes a user interface 810 and one or more built-in sensors 890 (e.g., accelerometer and gyroscope). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 816, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer-readable storage medium. In some implementations, memory 806, or the non-transitory computer-readable storage medium of memory 806, stores the following programs, modules, and data structures, or a subset or superset thereof:

- Operating system 818 including procedures for handling various basic system services and for performing hardware dependent tasks;
- Network communication module 820 for connecting the client device 504 to other systems and devices (e.g., client devices, electronic devices, and systems connected to one or more networks 162, FIGS. 1-5) via one or more network interfaces 804 (wired or wireless);
- Input processing module 822 for detecting one or more user inputs or interactions from one of the one or more input devices 814 and interpreting the detected input or interaction;
- One or more applications 824 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);
- User interface module 622 for providing and displaying a user interface in which settings, captured data, and/or other data for one or more devices (e.g., smart devices 204 in smart home environment 100) can be configured and/or viewed;
- Client-side module 828, which provides client-side functionalities for device control, data processing and data review, including but not limited to:
  - Hub device and device control module 8280 for generating control commands for modifying an operating mode of the hub device or the electronic devices in accordance with user inputs; and
  - Data review module 8282 for providing user interfaces for reviewing data processed by the server system 508; and
- Client data 830 storing data associated with the user account and electronic devices, including, but is not limited to:
  - Account data 8300 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and
  - Local data storage database 8302 for selectively storing raw or processed data associated with electronic devices (e.g., of the video sources 522, such as a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, client device 504 includes one or more graphical user interfaces and/or one or more modules for registering smart devices and/or electronic tags in the smart home environment. In some implementations, client device 504 includes an application, such as a smart home application, for interacting with a smart home environment. In some implementations, the smart home application includes one or more user interfaces for one or more of the following: registering smart device(s), registering electronic tag(s), adjusting operation of smart device(s), reviewing data from smart device(s), and the like. In some implementations, the smart home application includes user interface module 826 and client-side module 828.

Figure 9A:
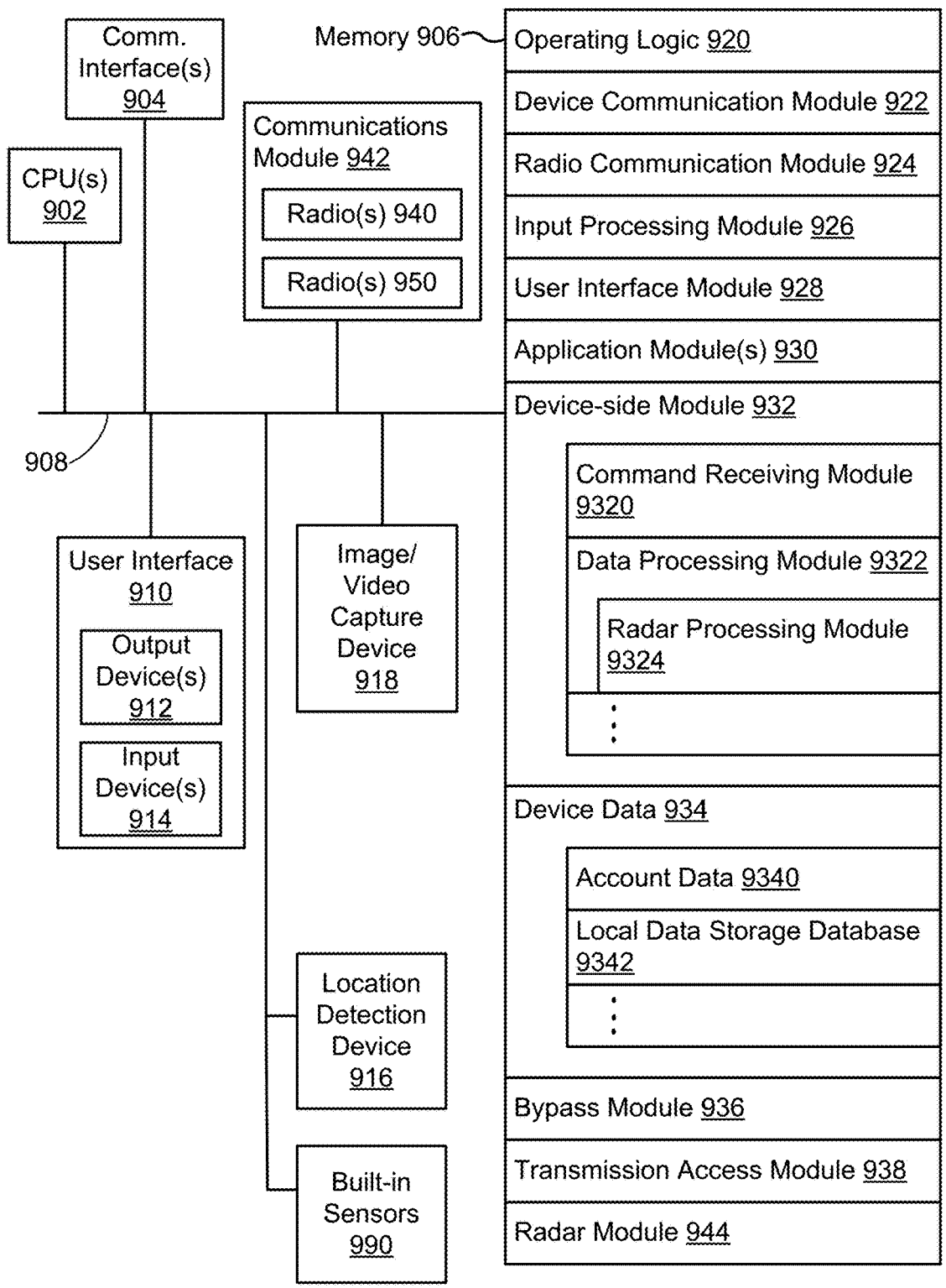
FIG. 9A is a block diagram illustrating a representative smart device, in accordance with some implementations.

FIG. 9A is a block diagram illustrating a representative smart device 204 in accordance with some implementations. In some implementations, the smart device 204 (e.g., any device of a smart home environment 100 (FIGS. 1 and 2), such as a camera 118, a smart hazard detector 104, a smart thermostat 102, hub device 180, etc.) includes one or more processing units (e.g., CPUs, ASICs, FPGAs, microprocessors, and the like) 902, memory 906, a communications module 942 that includes one or more radio(s) 940 and radio(s) 950, communication interfaces 904, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radio(s) 940 and radio(s) 950 enable one or more radio communication networks in the smart home environments, and allow a smart device 204 to communicate with other devices. In some implementations, the radio(s) 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some implementations, radio(s) 940 and/or radio(s) 950 are utilized for radar communications.

Communication interfaces 904 include, for example, hardware capable of interfacing the one or more radio(s) 940 and 950 with the smart device 204, so as to enable data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some implementations, each radio(s) 940 and radio(s) 950 has a respective communication interface 904 for facilitating and managing data communications for the respective radio, while in other implementations, multiple radio(s) 940 and/or 950 are managed by a single communication interface 904.

In some implementations, radio(s) 940 and/or radio(s) 950 are configured to transmit and receive the same or distinct types of signals in the smart home environment. For example, radio(s) 940 may include transceivers configured to transmit data between other devices (e.g., smart devices) within the smart home environment (e.g., IEEE 802.15.4 communications protocol for unilaterally/bilaterally transmitting data between and among smart devices). Signals transmitted between devices optionally include, for example, signals directed to critical hazard information (e.g., pings indicating the detection of smoke) or device status information (e.g., ping indicating low battery). In contrast, in some implementations, the radio(s) 950 may include transceivers configured to transmit high-bandwidth data across data networks (e.g., IEEE 802.11 Wi-Fi for uploading a video stream to a smart home provider server system 164). In some implementations, the radio(s) 940 and/or the radio(s) 950 include transceivers configured for close-range communications with devices (e.g., Bluetooth communications protocol for device provisioning). In some implementations, the radio(s) 940 and/or the radio(s) 950 include transceivers configured to transmit low-power signals (e.g., smart hazard detectors 104 not connected to a persistent power source). In some implementations, radio(s) 940 and/or radio(s) 950 are configured to transmit multiple types of signals in the smart home environment (e.g., a Wi-Fi radio 950 uploads video stream data to the smart home provider server system 164, in addition to routing received beacons to other nearby smart devices). In some implementations, the radio(s) 940 and/or the radio(s) 950 of a respective device include transceivers for directly and communicably bridging the respective device to other devices. For example, pairing devices directly via Bluetooth, rather than communicating via a router by using Wi-Fi. In some implementations, the radio(s) 940 and/or the radio(s) 950 are configured to translate signals received through a first radio 940, and further to re-transmit the translated signals using the first radio 940 and/or a radio 950 (e.g., a proprietary message format is received via Bluetooth and translated, where the translated messages are re-transmitted to other devices using Wi-Fi).

In some implementations, the radio(s) 940 and/or the radio(s) 950 include transceivers configured to transmit data via RFID (e.g., for use in identifying electronic tags and/or other devices). In some implementations, the radio(s) 940 and/or the radio(s) 950 include transceivers configured for radar operations (e.g., for use in determining distances, velocities, and the like). In some implementations, the radio(s) 940 and/or the radio(s) 950 are configured for radar operations via one or more radio frequency bands, such as 3-10 GHz, 24-24.5 GHz, 57-64 GHz, and/or 77-81 GHz.

The communications module 942 includes a variety of components for enabling the receiving and transmitting of signals by a respective smart device 204, including one or more amplifiers, oscillators, antennas, filters, switches, memory, firmware, and/or any other support circuits or circuit components. In some implementations, the one or more radio(s) 940 and radio(s) 950 are integrated components of the communications module 942 (e.g., System on a Chip (SOC)). In some implementations, the one or more radio(s) 940 and radio(s) 950 have respective circuit components. Alternatively, the one or more radio(s) 940 and radio(s) 950 share one or more circuit components.

In some implementations, the communications module 942 includes a 1D radar subsystem having one transmitter and one receiver. In some implementations, the communications module 842 includes a multi-dimensional radar subsystem. For example, in some implementations, the communications module 842 includes two radar transmitters and four radar receivers.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer-readable storage medium. In some implementations, memory 906, or the non-transitory computer-readable storage medium of memory 906, stores the following programs, modules, and data structures, or a subset or superset thereof:

Operating logic 920 including procedures for handling various basic system services and for performing hardware dependent tasks;

Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);

Radio communication module 924 for connecting the smart device 204 to other devices (e.g., controller devices, smart devices 204 in smart home environment 100, client devices 504) utilizing radio communication in conjunction with communications module 942;

Input processing module 926 for detecting one or more user inputs or interactions from the one or more input devices 914 and interpreting the detected inputs or interactions;

User interface module 928 for providing and displaying a user interface in which settings, captured data, and/or other data for one or more devices (e.g., the smart device 204, and/or other devices in smart home environment 100) can be configured and/or viewed;

One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

Device-side module 932, which provides device-side functionalities for device control, data processing and data review, including but not limited to:

Command receiving module 9320 for receiving, forwarding, and/or executing instructions and control commands (e.g., from a client device 504, from a smart home provider server system 164, from user inputs detected on the user interface 910, etc.) for operating the smart device 204; and Data processing module 9322 for processing data captured or received by one or more inputs (e.g., input devices 914, image/video capture devices 918, location detection device 916), sensors (e.g., built-in sensors 990), interfaces (e.g., communication interfaces 904, radio(s) 940), and/or other components of the smart device 204, and for preparing and sending processed data to a device for review (e.g., client devices 504 for review by a user), including but not limited to:

Radar processing module 9324 for processing radar data captured or received by the smart device 204, such as classifying radar events, recognizing radar entities, and/or aggregating radar data with data from other sensors (e.g., video data);

Device data 934 storing data associated with devices (e.g., the smart device 204), including but not limited to:

Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and Local data storage database 9342 for selectively storing raw or processed data associated with the smart device 204 (e.g., captured video footage and/or radar data);

Bypass module 936 for detecting whether radio(s) 940 and/or radio(s) 950 are transmitting signals via respective antennas coupled to the radio(s) 940 and/or radio(s) 950 and to accordingly couple radio(s) 940 and/or radio(s) 950 to their respective antennas either via a bypass line or an amplifier;

Transmission access module 938 for granting or denying transmission access to one or more radio(s) 940 and/or radio(s) 950 (e.g., based on detected control signals and transmission requests); and Radar module 944 for sending, receiving, and/or manipulating radar signals (e.g., in conjunction with communications module 942 and/or communications interface 904).

Each of the above identified elements may be stored in one or more of the previously mentioned memory devices, and corresponds to a set of instructions for performing a function described above. For example, in some implementations, the one or more radio(s) 940 and radio(s) 950 include respective memory and firmware for storing one or more programs/executable modules of the memory 906. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above, such as a video processing module.

Figure 9B:
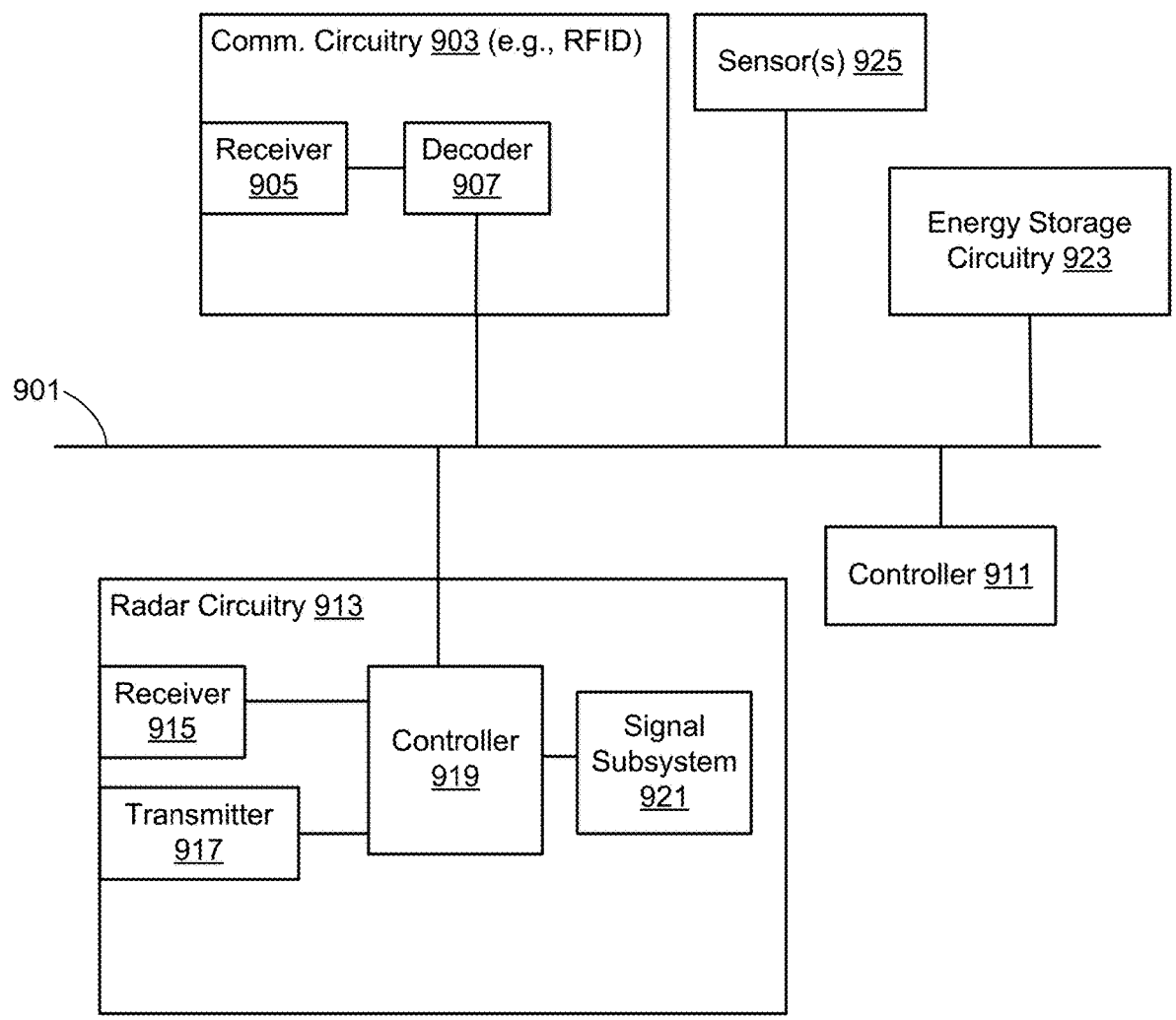
FIG. 9B is a block diagram illustrating a representative electronic tag, in accordance with some implementations.

FIG. 9B is a block diagram illustrating a representative electronic tag 206 in accordance with some implementations. FIG. 9B shows the electronic tag 206 including communication circuitry 903, radar circuitry 913, a controller 911, energy storage circuitry 923, and communication line(s) 901. In some implementations, the electronic tag 206 includes one or more additional sensors 925, such as a humidity sensor, an accelerometer, a gyroscope, a temperature sensor, an optical sensor, and the like. In some implementations, the controller 911 is a component of the communication circuitry 903. The communication circuitry 903 includes a receiver 905 for receiving signals such as RFID signals. In some implementations, the communication circuitry 903 includes a transmitter (not shown) for transmitting signals, such as RFID signals. In some implementations, the communication circuitry 903 includes a decoder 907 for decoding and/or decrypting signals received via the receiver 905. In some implementations, the decoder 907 is a component of the controller 911. In some implementations, the controller 911 decodes and/or decrypts signals received via the receiver 905. In some implementations, the communication circuitry 903 includes an encoder (not shown) for encoding outgoing transmissions.

The radar circuitry 913 includes a receiver 915 for receiving radar signals, a transmitter 917 for transmitting radar signals, a controller 919 for managing various components of the radar circuitry 913, such as the receiver 915 and/or the transmitter 917, and a signal subsystem 921. In some implementations the controller 919 is a component of the controller 911. In some implementations, the signal subsystem 921 includes components for amplifying, modulating, and/or generating radar signals. In some implementations, the radar circuitry 913 comprises passive radar circuitry, while in other implementations, the radar circuitry 913 comprises active radar circuitry. In some implementations, the energy storage circuitry 923 includes an energy storage device, such as a capacitor or battery. In some implementations, the energy storage circuitry 923 includes circuitry to couple the electronic tag 206 to an external power source, such as a battery or outlet. In some implementations, the energy storage circuitry 923 includes a power management integrated circuit (IC). In some implementations, the energy storage circuitry 923 includes circuitry to harvest energy from signals received via an antenna (e.g., the receiver 905) of the electronic tag. In some implementations, the energy storage circuitry 923 includes circuitry to harvest thermal, vibrational, electromagnetic, and/or solar energy received by the electronic tag.

In some implementations, the controller 911 is configured to: (1) receive a command from another device via the one or more antennas; (2) determine whether the command was intended for the electronic tag (e.g., based on a unique ID of the electronic device); (3) in accordance with a determination that the command was intended for the electronic tag, operate in accordance with the command; and (4) in accordance with a determination that the command was not intended for the electronic tag, disregard the command.

In some implementations, the electronic tag 206 is configured such that an adjustable carrier tone range is set to 1 megahertz (MHz). In some implementations, the electronic tag 206 is configured such that an adjustable modulation range is set to 100 kilohertz (kHz). In some implementations, the electronic tag 206 consumes less than 10 milliwatts (mW) of power, such as 5 mW of power consumption.

In some implementations, the electronic tag 206 is configured to harvest energy via a radio. In some implementations, the electronic tag 206 is configured to harvest energy via a half-wave dipole antenna.

Figure 10:
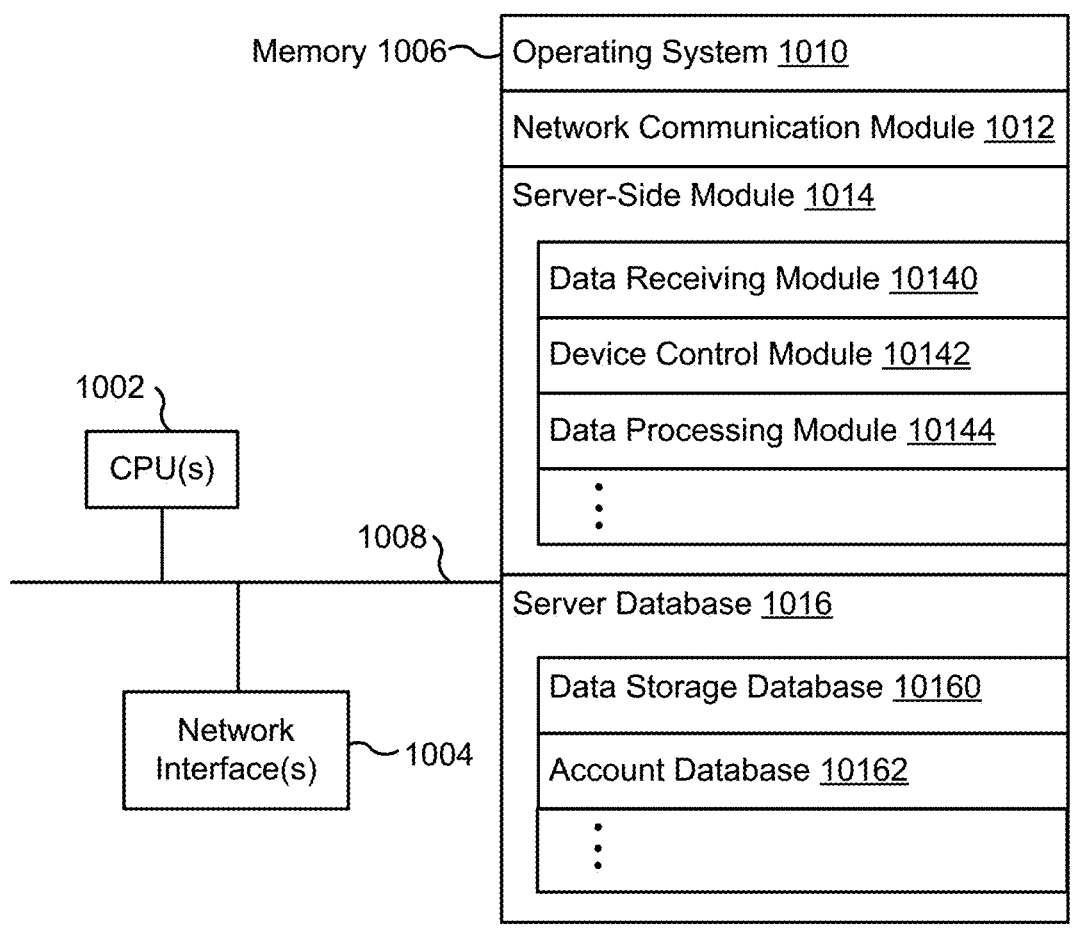
FIG. 10 is a block diagram illustrating a representative smart home provider server system, in accordance with some implementations.

FIG. 10 is a block diagram illustrating the smart home provider server system 164 in accordance with some implementations. The smart home provider server system 164 typically includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer-readable storage medium. In some implementations, memory 1006, or the non-transitory computer-readable storage medium of memory 1006, stores the following programs, modules, and data structures, or a subset or superset thereof:

Operating system 1010 including procedures for handling various basic system services and for performing hardware dependent tasks;

Network communication module 1012 for connecting the smart home provider server system 164 to other systems and devices (e.g., client devices, electronic devices, and systems connected to one or more networks 162, FIGS. 1-5) via one or more network interfaces 1004 (wired or wireless);

Server-side module 1014, which provides server-side functionalities for device control, data processing and data review, including but not limited to:

Data receiving module 10140 for receiving data from electronic devices (e.g., video data from a camera 118, FIG. 1), and preparing the received data for further processing and storage in the data storage database 10160;

Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 10144 for processing the data provided by the electronic devices, and/or preparing and sending processed data to a device for review (e.g., client devices 504 for review by a user); and Server database 1016, including but not limited to:

Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above, such as a radar data processing module.

Furthermore, in some implementations, the functions of any of the devices and systems described herein (e.g., hub device 180, server system 508, client device 504, smart device 204, smart home provider server system 164) are interchangeable with one another and may be performed by any other devices or systems, where the corresponding sub-modules of these functions may additionally and/or alternatively be located within and executed by any of the devices and systems. The devices and systems shown in and described with respect to FIGS. 6-10 are merely illustrative, and different configurations of the modules for implementing the functions described herein are possible in various implementations.

As described with respect to FIGS. 6-10, devices and tags in a smart home environment (e.g., smart devices 204 in FIG. 2, such as cameras 118, smart thermostats 102, smart hazard detectors 104, etc. of a smart home environment 100, FIG. 1) include a host of circuit components and interfaces for enabling communications with other systems, devices, and/or servers. For example, in some implementations, smart devices include a communications module (e.g., communications module 942, FIG. 9A) which comprises one or more radio(s) 940 and/or radio(s) 950 for receiving and transmitting signals to other devices and across networks (sometimes referred to generally as "transceivers" or "transceiver devices"). In some implementations, the one or more radio(s) 940 and radio(s) 950 are components of a single integrated circuit (e.g., System on a Chip (SOC)). Given the typical physical compactness of smart devices, components of the communications module 942 and other components of the device are often collocated in close physical proximity with one another. For example, a typical smart device may contain multiple radio antennas, memory devices, sensors, chips, and other electronic components. As a consequence of their close physical spacing within smart devices, however, and in combination with components coming into close contact with conductive materials (e.g., metal casing, camera stand, wires, etc.), device components, such as antennas, are typically poorly isolated from transmissions of one another. Additionally, because these devices sometimes share the same or close frequency bands in operation (e.g., IEEE 802.11 (i.e., Wi-Fi) and 802.15.4 sharing 2.4 GHz frequency band), signals transmitted by one component tend to interfere with signals transmitted and/or received by other components. Ultimately, components of the communications module 942 typically achieve poor signal-to-noise ratio (SNR), distortion, degraded analog signal quality, and increased bit error rate (BER).

Furthermore, the poor isolation of these devices has an additional impact on the maximum input power of device components, since the transmission power of signals transmitting by one transceiver adds unexpectedly to the expected transmission of signals simultaneously received by other nearby transceivers. Sensitive device components are thus often risk of damage when their input power thresholds are exceeded.

System Architecture and Processing Pipeline

Figure 11A:
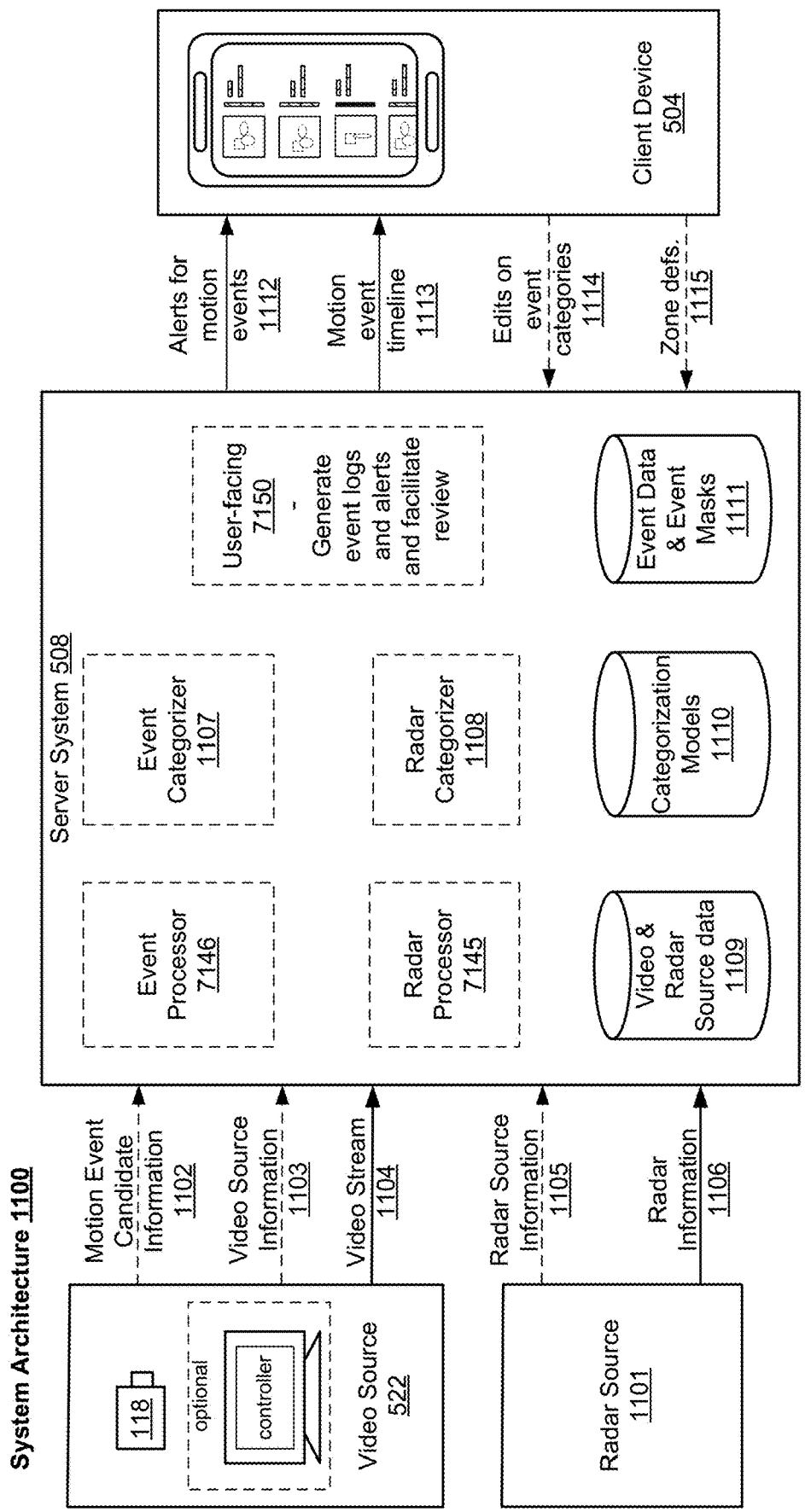
FIG. 11A illustrates a representative system architecture for video analysis and categorization, in accordance with some implementations.
Figure 11B:
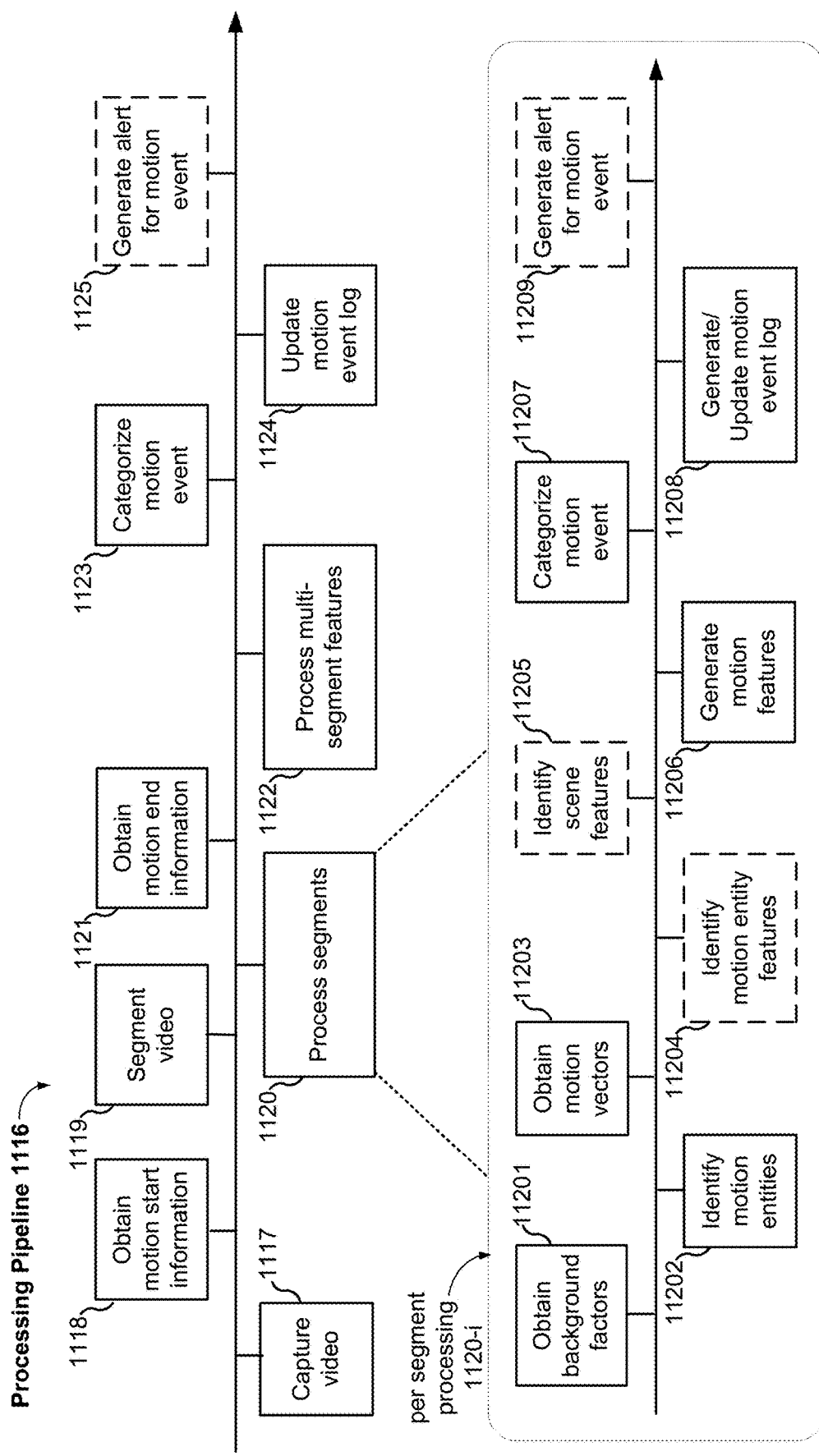
FIG. 11B illustrates a representative processing pipeline for video analysis and categorization, in accordance with some implementations.

FIG. 11A illustrates a representative system architecture 1100 and FIG. 11B illustrates a corresponding data processing pipeline 1116. In some implementations, the server system 508 includes functional modules for an event processor 7146, an event categorizer 1107, radar processor 7145, radar categorizer 1108, and a user-facing frontend 7150. The event processor 7146 obtains the motion event candidates (e.g., by processing the video stream or by receiving the motion start information from the video source 522). The event categorizer 7148 categorizes the motion event candidates into different event categories. The radar processor 7145 obtains radar information 1106 from one or more radar source(s) 1101, including raw and/or preprocessed radar data, and processes the radar information 1106 to obtain radar event candidates (e.g., to identify motion entities and/or stationary objects). In some implementations, the radar processor 7145 receives radar source information 1105 such as a device id, device location information, and the like from the radar source 1101. The radar categorizer 1108 categorizes the radar event candidates into different radar event categories. In some implementations, the radar categorizer 1108 performs machine learning based on the radar event candidate (e.g., to update the radar event categories). In some implementations, the radar categorizer 1108 adjusts one or more radar event categories based on categorization of one or more radar event candidates and/or feedback on the categorizations (e.g., from a user). In some implementations, the radar categorizer 1108 learns based on one or more motion event candidates and/or motion event categories. In some implementations, the server system 508 includes one or more additional modules to categorize an event candidate based on both video information and radar information (e.g., by aggregating the video information and radar information).

The user-facing frontend 7150 generates event alerts and facilitates review of the motion events by a reviewer through a review interface on a client device 504. The client facing frontend also receives user edits on the event categories, user preferences for alerts and event filters, and zone definitions for zones of interest. The event categorizer optionally revises event categorization models and results based on the user edits received by the user-facing frontend. The server system 508 also includes a video and radar source data database 1109, a categorization models database 1110 (e.g., categorization models for both radar events and video events), and an event data and event masks database 1111. In some implementations, each of these databases is part of the server database 716. In some implementations distinct databases are utilizing for radar-related information (e.g., radar source data and radar categorization models) and video-related information (e.g., video source data and video categorization models).

The server system 508 receives the video stream 1104 from the video source 522 and optionally receives motion event candidate information 1102 such as motion start information and video source information 1103 such as device settings for camera 118 (e.g., a device profile 7165 for camera 118). In some implementations, the event processor sub-module 7146 communicates with the video source 522. The server system sends alerts for motion events 1105 and motion event timeline information 1107 to the client device 504. In some implementations, the server system 508 optionally receives user information from the client device 504 such as edits on event categories 1109 and zone definitions 1111.

The server system 508 receives radar information 1106 for the radar source 1101 (e.g., a radar-equipped smart device) and optionally receives radar source information 1105 such as device settings for the radar source 1101. In some implementations, the radar processor 7145 communicates with the radar source 1101. In some implementations, the server system 508 sends alerts for radar events and/or radar event timeline information to the client device. In some implementations, the server system 508 optionally receives user information from the client device 504 such as edits on radar event categories and/or radar zone definitions.

The data processing pipeline 1116 processes a live video feed received from a video source 522 (e.g., including a camera 118 and an optional controller device) in real-time to identify and categorize motion events in the live video feed, and sends real-time event alerts and a refreshed event timeline to a client device 504 associated with a reviewer account bound to the video source 522. The data processing pipeline 1116 also processes stored video feeds from a video source 522 to reevaluate and/or re-categorize motion events as necessary, such as when new information is obtained regarding the motion event and/or when new information is obtained regarding motion event categories (e.g., a new activity zone is obtained from the user).

After video data is captured at the video source 522 (1117), the video data is processed to determine if any potential motion event candidates are present in the video stream. A potential motion event candidate detected in the video data is also sometimes referred to as a cuepoint. Thus, the initial detection of a motion event candidate is referred to as motion start detection and/or cuepoint detection. Motion start detection (1118) triggers performance of a more thorough event identification process on a video segment (also sometimes called a "video slice" or "slice") corresponding to the motion event candidate. In some implementations, the video data is initially processed at the video source 522. Thus, in some implementations, the video source sends motion event candidate information, such as motion start information, to the server system 508. In some implementations, the video data is processed at the server system 508 for motion start detection. In some implementations, the video stream is stored on server system 508 (e.g., in video and radar source data database 1109). In some implementations, the video stream is stored on a server distinct from server system 508. In some implementations, after a cuepoint is detected, the relevant portion of the video stream is retrieved from storage (e.g., from video and radar source data database 1109).

In some implementations, the more thorough event identification process includes segmenting (1119) the video stream into multiple segments then categorizing the motion event candidate within each segment (1120). In some implementations, categorizing the motion event candidate includes an aggregation of background factors, motion entity detection identification, motion vector generation for each motion entity, motion entity features, and scene features to generate motion features (11206) for the motion event candidate. In some implementations, the more thorough event identification process further includes categorizing each segment (11207), generating or updating a motion event log (11208) based on categorization of a segment, generating an alert for the motion event (11209) based on categorization of a segment, categorizing the complete motion event (1123), updating the motion event log (1124) based on the complete motion event, and generating an alert for the motion event (1125) based on the complete motion event. In some implementations, a categorization is based on a determination that the motion event candidate is within a particular zone of interest. In some implementations, a categorization is based on a determination that the motion event candidate involves one or more particular zones of interest.

The event analysis and categorization process may be performed by the video source 522 and the server system 508 cooperatively, and the division of the tasks may vary in different implementations, for different equipment capability configurations, and/or for different network and server load situations. After the server system 508 categorizes the motion event candidate, the result of the event detection and categorization may be sent to a reviewer associated with the video source 522.

In some implementations, the server system 508 also determines an event mask for each motion event candidate and caches the event mask for later use in event retrieval based on selected zone(s) of interest.

In some implementations, the server system 508 stores raw or compressed video data (e.g., in a video and radar source data database 1109), event categorization models (e.g., in an categorization model database 1110), and event masks and other event metadata (e.g., in an event data and event mask database 1111) for each of the video sources 522. In some implementations, the video data is stored at one or more display resolutions such as 480p, 780p, 1080i, 1080p, and the like.

The above is an overview of the system architecture 1100 and the data processing pipeline 1116 for event processing in video monitoring. More details of the processing pipeline and processing techniques are provided below.

As shown in FIG. 11A, the system architecture 1100 includes the video source 522. The video source 522 transmits a live or stored video feed to the remote server system 508 via one or more networks (e.g., the network(s) 162). In some implementations, the transmission of the video data is continuous as the video data is captured by the camera 118. In some implementations, the transmission of video data is irrespective of the content of the video data, and the video data is uploaded from the video source 522 to the server system 508 for storage irrespective of whether any motion event has been captured in the video data. In some implementations, the video data may be stored at a local storage device of the video source 522 by default, and only video portions corresponding to motion event candidates detected in the video stream are uploaded to the server system 508 (e.g., in real-time).

In some implementations, the video source 522 dynamically determines at what display resolution the video stream is to be uploaded to the server system 508. In some implementations, the video source 522 dynamically determines which parts of the video stream are to be uploaded to the server system 508. For example, in some implementations, depending on the current server load and network conditions, the video source 522 optionally prioritizes the uploading of video portions corresponding to newly detected motion event candidates ahead of other portions of the video stream that do not contain any motion event candidates; or the video source 522 uploads the video portions corresponding to newly detected motion event candidates at higher display resolutions than the other portions of the video stream. This upload prioritization helps to ensure that important motion events are detected and alerted to the reviewer in real-time, even when the network conditions and server load are less than optimal. In some implementations, the video source 522 implements two parallel upload connections, one for uploading the continuous video stream captured by the camera 118, and the other for uploading video portions corresponding to detected motion event candidates. At any given time, the video source 522 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 11A, the video source 522 includes a camera 118, and an optional controller device. In some implementations, the camera 118 includes sufficient on-board processing power to perform all necessary local video processing tasks (e.g., cuepoint detection for motion event candidates, video uploading prioritization, network connection management, etc.), and the camera 118 communicates with the server system 508 directly, without any controller device acting as an intermediary. In some implementations, the camera 118 captures the video data and sends the video data to the controller device for the necessary local video processing tasks. The controller device optionally performs the local processing tasks for multiple cameras. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the server system 508. In some implementations, the continuous video stream is sent and stored at one server facility while the video segments containing motion event candidates are sent to and processed at a different server facility.

After video data is captured by the camera 118, the video data is optionally processed locally at the video source 522 in real-time to determine whether there are any cuepoints in the video data that warrant performance of a more thorough event identification process. Thus, in some implementations, the video source 522 sends the motion event candidate information 1102, such as cuepoint detections, to the server system 508. In some implementations, the video source 522 sends additional metadata, such as the amount of motion between frames, to the server system 508.

Cuepoint detection is a first layer motion event identification which is generally intended to be slightly over-inclusive, such that real motion events are a subset of all identified cuepoints. In some implementations, cuepoint detection is based on the number of motion pixels in each frame of the video stream. In some implementations, any method of identifying motion pixels in a frame may be used. For example, a Gaussian mixture model is optionally used to determine the number of motion pixels in each frame of the video stream. In some implementations, when the total number of motion pixels in a current image frame exceeds a predetermined threshold, a cuepoint is detected. In some implementations, a running sum of total motion pixel count is calculated for a predetermined number of consecutive frames as each new frame is processed, and a cuepoint is detected when the running sum exceeds a predetermined threshold. In some implementations, a profile of total motion pixel count over time is obtained. In some implementations, a cuepoint is detected when the profile of total motion pixel count for a current frame sequence of a predetermined length (e.g., 30 seconds) meets a predetermined trigger criterion (e.g., total pixel count under the profile>a threshold motion pixel count). In some implementations, the cuepoint detection calculations are based on where in the scene the motion occurs. For example, a lower threshold is required for motion occurring in or near a preset zone of interest. In some implementations, a higher threshold is required for motion occurring in or near a preset zone that has been denoted as likely containing less significant motion events (e.g., a zone of interest where notifications are disabled). In some implementations, cuepoints are suppressed for motion occurring within a zone of interest where notifications are disabled.

In some implementations, cuepoint detection is based on one or more additional inputs such as audio inputs to an associated microphone. For example, a cuepoint may be based at least in-part on the sound of breaking glass and/or a human voice.

In some implementations, the beginning of a cuepoint is the time when the total motion pixel count meets a predetermined threshold (e.g., 50 motion pixels). In some implementations, the start of the motion event candidate corresponding to a cuepoint is the beginning of the cuepoint. In some implementations, the start of the motion event candidate is a predetermined lead time (e.g., 5 seconds) before the beginning of the cuepoint. In some implementations, the start of a motion event candidate is used to process a video portion corresponding to the motion event candidate for a more thorough event identification process.

In some implementations, the thresholds for detecting cuepoints are adjusted over time based on performance feedback. For example, if too many false positives are detected, the threshold for motion pixel count is optionally increased. If too many motion events are missed, the threshold for motion pixel count is optionally decreased. In some implementations, the thresholds for detecting cuepoints are based on where in the scene the motion is detected. In some implementations, the thresholds are based on whether the motion is detected within a particular zone of interest. In some implementations, the threshold are set and/or adjusted by users (e.g., a user of client device 504, FIG. 5). For example, a threshold is adjusted by adjusting a corresponding motion sensitivity slider within a user interface.

In some implementations, the cuepoint detection occurs at the video source 522, and immediately after a cuepoint is detected in the live video stream, the video source 522 sends an event alert to the server system 508 to trigger the subsequent event processing. In some implementations, the video source 522 includes a video camera with very limited on-board processing power and no controller device, and the cuepoint detection described herein is performed by the server system 508 on the continuous video stream transmitted from the camera to the server system 508.

In some implementations, the video source 522 sends additional video source information 1103 to the server system 508. This additional video source information 1103 may include information regarding a camera state (e.g., IR mode, AE mode, DTPZ settings, etc.) and/or information regarding the environment in which the video source 522 is located (e.g., indoors, outdoors, night-time, day-time, etc.). In some implementations, the video source information 1103 is used by the server system 508 to perform cuepoint detection and/or to categorize motion event candidates within the video stream 1104.

In some implementations, after the cuepoint detection, the video portion after the detected cuepoint is divided into multiple segments. In some implementations, the segmentation continues until motion end information (sometimes also called an "end-of-motion signal") is obtained. In some implementations, the segmentation occurs within the server system 508 (e.g., by the event processor module 7146).

As shown in FIG. 11B, in some implementations, the video stream is captured (1117) and the motion start information corresponding to a motion event candidate is obtained (1118). After the motion start information is obtained, the video stream is segmented (1119) as discussed above. Next, each segment is processed and categorized (1120). As will be discussed in greater detail below, this processing includes obtaining information about the background in the scene (e.g., background factors) (11201), identifying motion entities (11202), and obtaining motion vectors (11203). In some implementations, the processing also includes identifying additional features of each motion entity (motion entity features), such as the amount of a particular color within the motion entity and/or the height-to-width ratio of the motion entity (11204). In some implementations, the motion features include information regarding what, if any, zones of interest were involved with the motion entity. In some implementations, the processing also includes identifying additional features of the scene, such as the ratio of particular colors within the scene, audio information corresponding to the scene, and/or the total amount of motion within the scene (11205). In some implementations, the scene features include information regarding zones of interest within the scene. Next, the background factors, motion entities, motion vectors, and any additional motion entity and/or scene features are aggregated to generate resulting motion features (11206). The resulting motion features are categorized and a category is assigned to the motion event candidate (11207). In some implementations, a log entry is generated for the motion event candidate (11208), and the assigned category is stored within. In some implementations, an alert is generated and sent to the client device 504 (11209). Once the motion end information is obtained, the final segment is processed and categorized (1121). In some implementations, after all segments are categorized, multi-segment features are processed (1122). These multi-segment features optionally include features generated by comparing motion event categories, event masks, motion entity features, and the like from the various segments comprising the event. For example, motion event masks for individual segments are combined to form a single motion event mask across all segments. In some implementations, after the multi-segment features are processed, an event category is assigned based on the multi-segment features (1123). In some implementations, the event category is assigned based on the multi-segment features and the categories assigned to the individual segments. In some implementations, the event log corresponding to the motion event candidate is updated (1124). In some implementations, an alert is generated based on the event category (1125).

In some implementations, after a motion event candidate is detected in the video stream, a video portion corresponding to the motion event candidate, or a particular segment within the video portion, is used to identify a motion track of a motion entity in the video segment. The identification of motion track is optionally performed locally at the video source 522 or remotely at the server system 508. In some implementations, motion track information is included in the motion event candidate information 1102 sent from the video source 522 to the server system 508. In some implementations, the identification of the motion track based on a video segment corresponding to a motion event candidate is performed at the server system 508 by an event processor module. In some implementations, the event processor module receives an alert for a cuepoint detected in the video stream, and retrieves the video portion corresponding to the cuepoint from cloud storage (e.g., the video and radar source data database 1109, FIG. 11A) or from the video source 522. In some implementations, the video portion used to identify the motion track may be of higher quality than the video uploaded for cloud storage, and the video portion is retrieved from the video source 522 separately from the continuous video feed uploaded from the video source 522.

In some implementations, after the event processor module obtains the video portion corresponding to a motion event candidate, the event processor module 7146 obtains background factors and performs motion entity detection identification, motion vector generation for each motion entity, and feature identification. Once the event processor module 7146 completes these tasks, the event categorizer module 7148 aggregates all of the information and generates a categorization for the motion event candidate. In some implementations, false positive suppression is optionally performed to reject some motion event candidates before the motion event candidates are submitted for event categorization. In some implementations, determining whether a motion event candidate is a false positive includes determining whether the motion event candidate occurred in a particular zone. In some implementations, determining whether a motion event candidate is a false positive includes analyzing an importance score for the motion event candidate. The importance score for the motion event candidate is optionally the same as the importance score for the corresponding cuepoint, or incorporates the importance score for the corresponding cuepoint. The importance score for a motion event candidate is optionally based on zones of interest involved with the motion event candidate, background features, motion vectors, scene features, entity features, motion features, motion tracks, and the like.

In some implementations, the video source 522 has sufficient processing capabilities to perform, and does perform, the background estimation, motion entity identification, the motion vector generation, and/or the feature identification.

In some implementations, the motion vector representing a motion event candidate is a simple two-dimensional linear vector defined by a start coordinate and an end coordinate of a motion entity (also sometimes called a "motion object") in a scene depicted in the video portion, and the motion event categorization is based on the motion vector. In some implementations, a motion vector for a motion event candidate is independently generated for each segment. In some implementations, a single motion vector is used for all segments and the motion vector is revised as each segment is processed. The advantage of using the simple two-dimensional linear motion vector for event categorization is that the event data is very compact, and fast to compute and transmit over a network. When network bandwidth and/or server load is constrained, simplifying the representative motion vector and off-loading the motion vector generation from the event processor module of the video server system 508 to the video source 522 can help to realize the real-time event categorization and alert generation for many video sources in parallel.

In some implementations, after motion tracks in a video segment corresponding to a motion event candidate are determined, track lengths for the motion tracks are determined. In some implementations, the track lengths are independently determined for each segment. In some implementations, the track lengths are revised as each subsequent segment is processed. In some implementations, "short tracks" with track lengths smaller than a predetermined threshold (e.g., 8 frames) are suppressed, as they are likely due to trivial movements, such as leaves shifting in the wind, water shimmering in the pond, etc. In some implementations, pairs of short tracks that are roughly opposite in direction are suppressed as "noisy tracks." In some implementations, after the track suppression, if there are no motion tracks remaining for the video segment, the cuepoint is determined to be a false positive, and no motion event candidate is sent to the event categorizer for event categorization. In some implementations, after the track suppression, if there are no motion tracks remaining, the motion event candidate is categorized as a non-event. If at least one motion track remains after the false positive suppression is performed, a motion vector is generated for each remaining motion track. In other words, multiple motion entities may be identified within a particular video segment. The false positive suppression occurring after the cuepoint detection and before the motion vector generation is the second layer false positive suppression, which removes false positives based on the characteristics of the motion tracks.

In some implementations, the radar information 1106 is processed independently of the video stream 1104. In some implementations, the video stream 1104 is processed on a first server of the server system 508 and the radar information 1106 is processed on a second server of the server system 508. In some implementations, radar information received via a radio receiver is processed at the radar source 1101. In some implementations, the radar information 1106 comprises raw radar information from the radio receiver and/or processed radar information such as radar cuepoint information. In some implementations, similar to video processing, radar processing includes cuepoint detection. A radar cuepoint is optionally based on total motion detected, velocity of motion detected, angle or location of motion, or a combination thereof. In some implementations, radar data is processed without performing a cuepoint detection. The radar data corresponds to an outgoing radio transmission and one or more corresponding received radio transmissions.

In some implementations, the radar processing of the radar processor 7145 identifies the location and velocity of moving objects. In some implementations, the radar categorizer 1108 obtains the location and velocity data and assigns a radar event category based on the location and velocity data. In some implementations, additional information is obtained and utilized by the radar categorizer 1108 to categorize the event, such as information regarding the dimensions of the moving objects, information regarding the acceleration of the moving objects, information from one or more radar tags, and background information received from other sources (e.g., identification information for one or more detected objects). In some implementations, the radar processor 7145 and/or the radar categorizer 1108 receive radar information from multiple radar sources and process the information to assign a radar event category. For example, the server system 508 receives radar data from multiple radar sources within a particular room (e.g., 1D radar sources) and aggregates the radar data to categorize an event occurring in the particular room. In some implementations, the server system 508 receives and processes radar data from one or more radar-equipped smart device and from one or more radar tags to categorize a radar event.

In some implementations, a composite event category is assigned (e.g., by a composite categorizer) based on the radar category assigned by the radar categorizer 1108 and the motion event category assigned by the motion event categorizer 1107. For example, the motion event category indicates that a person with an active flashlight and a ski mask is moving in the room and the radar category indicates that a particular person, John, is walking toward the back of the room. In this example, the composite event category indicates that John is walking toward the back of the room while wearing a ski mask and carrying an active flashlight. In some implementations, the assigned radar category is used as an input to the processing pipeline 1116. For example, the assigned radar category is obtained and used to category a motion event segment (11207) and/or used to categorize the entire motion event (1123). In some implementations, the assigned motion event category is used to categorize the radar event.

Radar Tag Operations

Figure 12A:
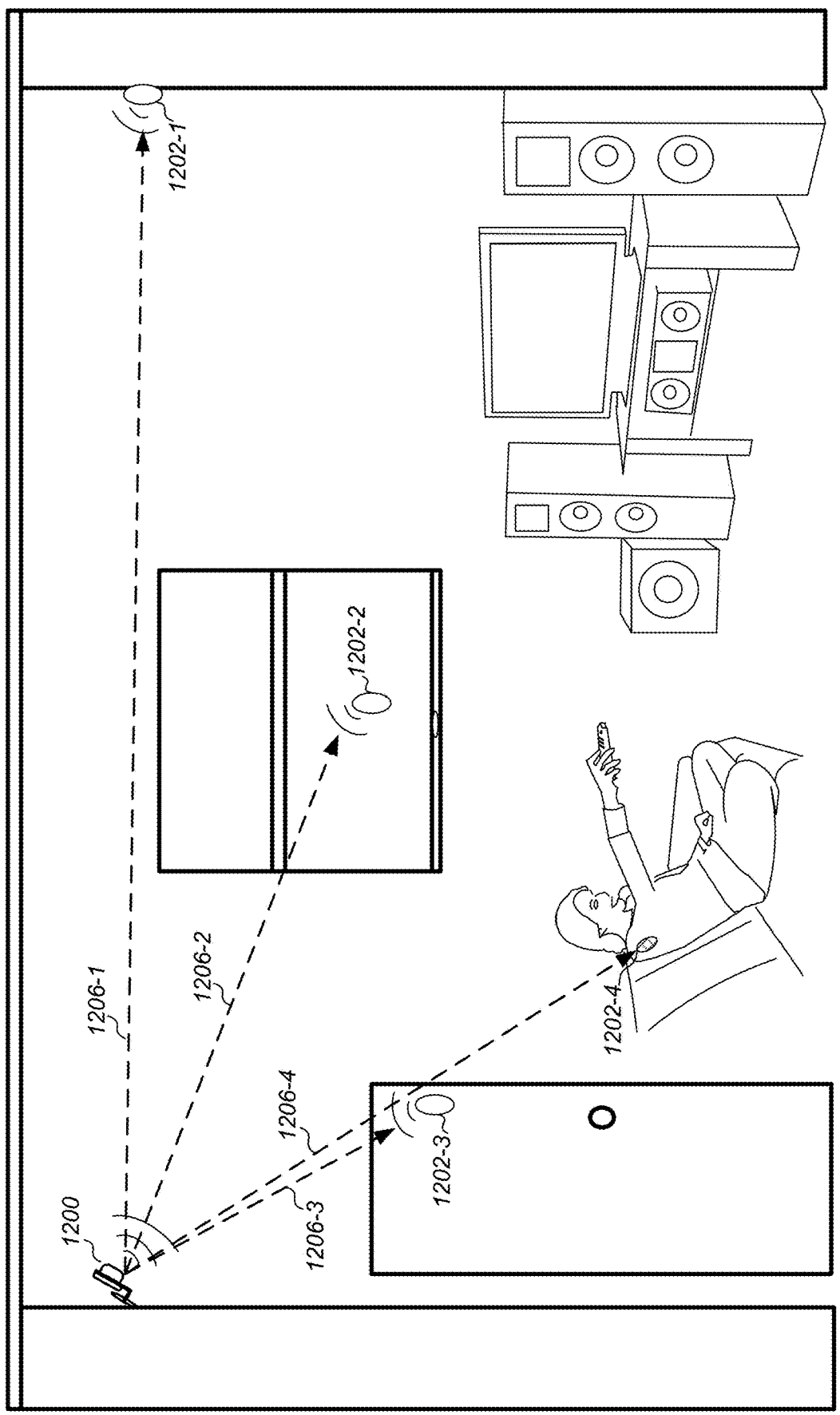
FIG. 12A illustrates an environment and system for communicating via radar signals, in accordance with some implementations.

FIG. 12A shows an environment and system for communicating via radar signals in accordance with some implementations. FIG. 12A shows a control device 1200 communicating via signals 1206 with electronic tags 1202 within a dwelling. In some implementations, the control device 1200 is a smart device, such as a camera, a thermostat, a hazard detector, a hub device, or the like. In some implementations, the control device 1200 comprises a smart device 204 (e.g., FIG. 9A), in accordance with any of the implementations disclosed in FIGS. 1-9 (e.g., devices 102, 104, 106, 108, 110, 112, 114, 116, 118, 120, and/or 122, FIG. 1, such as a camera 118, a smart hazard detector 104, a smart thermostat 102, etc.). In some implementations, the electronic tags 1202 comprise electronic tags 206 (FIG. 9B). In some implementations, the signals 1206 comprise RFID signals. In some implementations, the signals 1206 comprise signals transmitted at a same frequency, while in other implementations, at least a subset of the signals 1206 are transmitted a distinct frequencies (e.g., distinct frequencies within a frequency band). In some implementations, the signals 1206 each include device identification information. For example, each of the electronic tags 1202 receives the signal 1206-1 and analyzes the included device identification information to determine whether the signal 1206-1 was intended for the particular tag. Thus, in accordance with some implementations, the signal 1206-1 includes device identification for the electronic tag 1202-1, the signal 1206-2 includes device identification for the electronic tag 1202-2, the signal 1206-3 includes device identification for the tag 1202-3, and the signal 1206-4 includes device identification for the tag 1202-4. The control device 1200 further transmits and receives radar signals. In some implementations, the radar signals are used to determine distance, velocity, acceleration, location, and/or direction of movement for a plurality of objects within signal range. The electronic tags 1202 communicate via radar signals with control device 1200. In some implementations, the electronic tags 1202 communicate via radar signals in response to an enablement signal (e.g., signal 1206-1). In some implementations, communicating via radar signals comprises reflecting, modifying, and/or amplifying received radar signals. In some implementations, communicating via radar signals comprises generating radar signals at the electronic tag independent of any radar signals received by the tag. As shown in FIG. 12A, an electronic tag 1202 is optionally configured to be affixed to inanimate objects such as walls and ceilings, moving objects such as doors and windows, and/or moving entities such as people and pets.

Figure 12B:
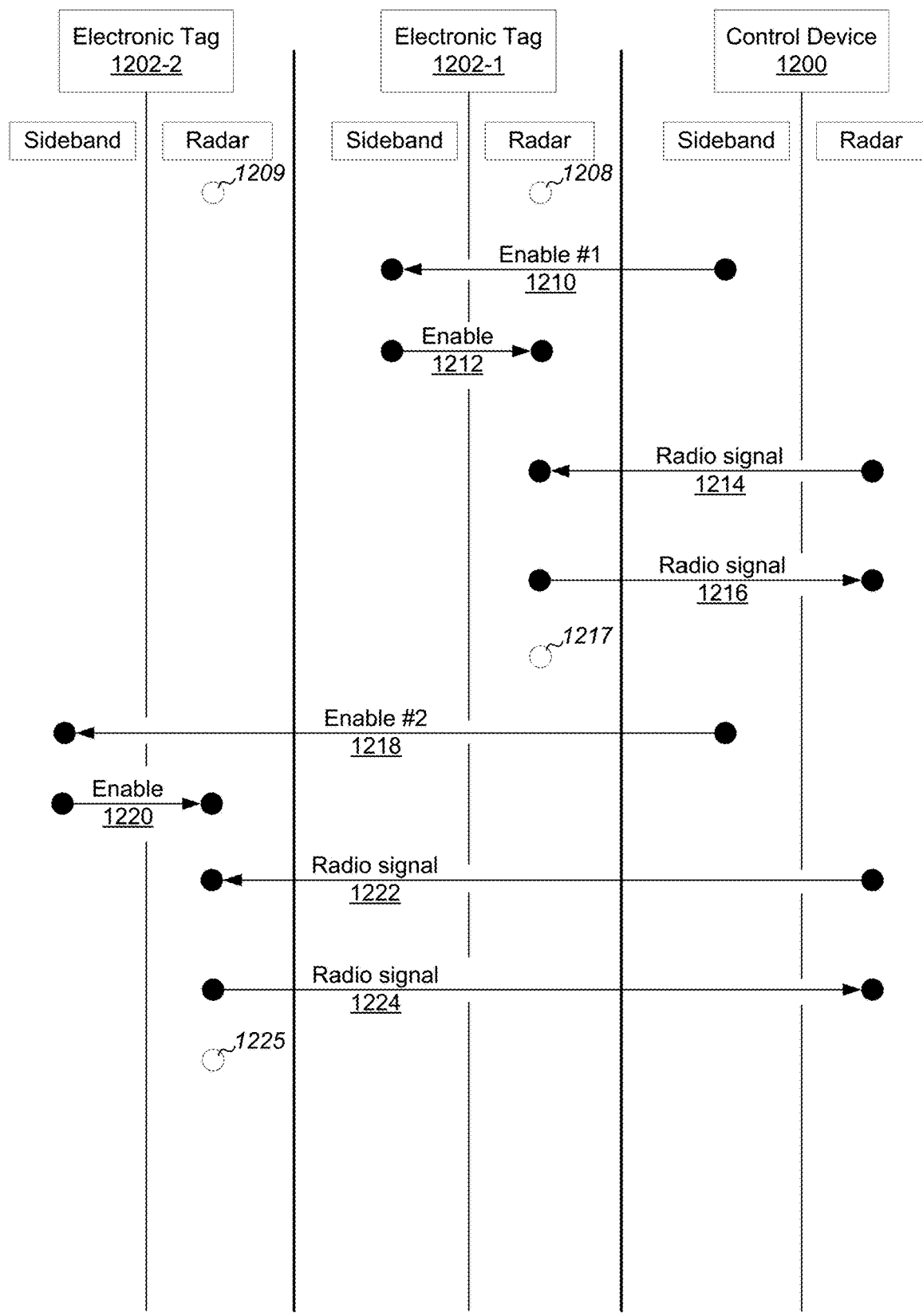
FIG. 12B illustrates a representative system and process for utilizing radar tags, in accordance with some implementations.

FIG. 12B illustrates a representative system and process for utilizing radar tags, in accordance with some implementations. At a first time, the radar circuitry for electronic tags 1202-1 and 1202-2 are disabled as illustrated by 1208 and 1209. In some implementations, disabling the radar circuitry includes disconnecting the radar circuitry from a power source. In some implementations, disabling the radar circuitry includes preventing the radar circuitry from transmitting radio signals.

At a second time, the control device 1200 (e.g., smart device 204) transmits a first enable signal 1210 via a sideband (e.g., Wi-Fi). The electronic tag 1202-1 receives the first enable signal 1210. In some implementations, the electronic tag 1202-1 determines that the first enable signal 1210 is intended for the electronic tag 1202-1. In some implementations, determining that the first enable signal 1210 is intended for the electronic tag 1202-1 includes comparing device identification within signal 1210 with device identification of the electronic tag 1202-1. In response to receiving the first enable signal 1210, or in response to determining that the signal 1210 was intended for the electronic tag 1202-1, the electronic tag 1202-1 enables (1212) its radar circuitry.

In some implementations, the electronic tag 1202-2 receives the first enable signal 1210 and determines that the first enable signal is not intended for the electronic tag 1202-2.

At a third time, the control device 1200 transmits a radio signal 1214 using its radar circuitry. The electronic tag 1202-1 receives the radio signal 1214. In some implementations, the electronic tag 1202-1 modifies the received radio signal 1214. In some implementations, modifying the radio signal 1214 includes amplifying the radio signal 1214 and/or modulating the radio signal 1214. In some implementations, the electronic tag 1202-1 transmits the modified radio signal 1216. In some implementations, the electronic tag 1202-1 transmits a radio pulse or tone in response to receiving the radio signal 1214. Subsequent to sending radio signal 1216, the electronic tag 1202-1 disables (1217) its radar circuitry.

The control device 1200 receives the signal 1216 from the electronic tag 1202-1. In some implementations, the control device 1200 processes the received signal 1216 to determine the location and/or motion of electronic tag 1202-1. In some implementations, the control device 1200 sends information regarding radio signals 1214 and 1216 to another device (e.g., a device of server system 508) for processing.

At a fourth time, the control device 1200 transmits a second enable signal 1218 via the sideband. The electronic tag 1202-2 receives the second enable signal 1218. In some implementations, the electronic tag 1202-2 determines that the second enable signal 1218 is intended for the electronic tag 1202-2. In response to receiving the second enable signal 1218, or in response to determining that the signal 1218 was intended for the electronic tag 1202-2, the electronic tag 1202-2 enables (1220) its radar circuitry.

At a fifth time, the control device 1200 transmits a radio signal 1222 using its radar circuitry. The electronic tag 1202-2 receives the radio signal 1222. In some implementations, the electronic tag 1202-2 modifies the received radio signal 1222. In some implementations, the electronic tag 1202-2 transmits the modified radio signal 1224. In some implementations, the electronic tag 1202-2 transmits a radio pulse or tone signal 1224 in response to receiving the radio signal 1222. Subsequent to sending radio signal 1224, the electronic tag 1202-2 disables (1225) its radar circuitry.

The control device 1200 receives the signal 1224 from the electronic tag 1202-2. In some implementations, the control device 1200 processes the received signal 1224 to determine the location and/or motion of electronic tag 1202-2. In some implementations, the control device 1200 sends information regarding radio signals 1222 and 1224 to another device (e.g., a device of server system 508) for processing.

Figure 12C:
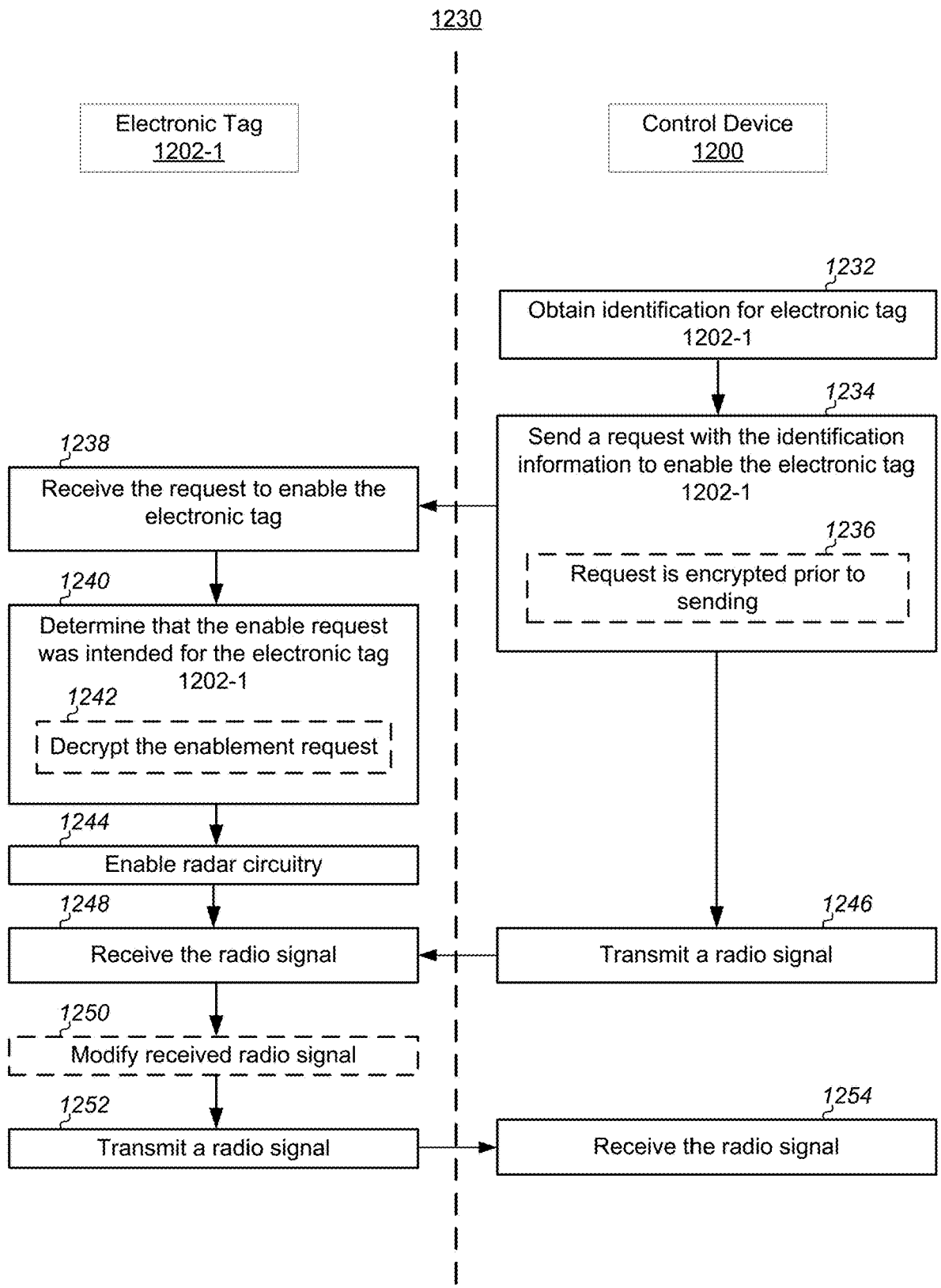
FIG. 12C illustrates a representative system and process for utilizing a radar tag, in accordance with some implementations.

FIG. 12C illustrates a representative system and process for utilizing a radar tag, in accordance with some implementations. The control device 1200 obtains (1232) identification for the electronic tag 1202-1. In some implementations, the identification is obtained via an application, such as a smart home application, on a client device 504. In some implementations, the client device 504 scans a barcode or QR code of the electronic tag 1202-1 and transmits the scanned information to the control device 1200.

The control device 1200 sends (1234) a request with the identification information to enable the electronic tag 1202-1. In some implementations, the request is sent via a first communications channel (e.g., RFID). In some implementations, the control device 1200 encrypts (1236) the request prior to sending.

The electronic tag 1202-1 receives (1238) the request to enable the electronic tag 1202-1. The electronic tag determines (1240) that the enable request was intended for the electronic tag 1202-1. In some implementations, prior to determining whether the enable request was intended for the electronic tag 1202-1, the electronic tag 1202-1 decrypts (1242) the enablement request. In some implementations, determining that the enable request was intended for the electronic tag 1202-1 includes comparing the identification information in the request with device identification stored at electronic tag 1202-1.

In accordance with the determination that the enable request was intended for the electronic tag 1202-1, the electronic tag 1202-1 enables (1244) its radar circuitry. In some implementations enabling the radar circuitry comprises supplying power to one or more components of the radar circuitry. In some implementations, enabling the radar circuitry comprises configuring the radar circuitry to respond to received radio signals (e.g., received radio signals having a particular frequency or within a particular frequency range).

The control device 1200 transmits (1246) a radio signal. In some implementations, the control device 1200 utilizes radar circuitry to transmit the radio signal.

The electronic tag 1202-1 receives (1248) the radio signal. In some implementations, the radio signal is received via the radar circuitry of the electronic tag 1202-1. In some implementations, the electronic tag 1202-2 modifies (1250) the received radio signal. In some implementations, modifying the received radio signal includes amplifying and/or modulating the received radio signal. The electronic tag 1202-1 transmits (1252) a radio signal corresponding to the radio signal transmitted by the control device 1200. In some implementations, the transmitted signal includes the modified signal. In some implementations, the transmitted signal includes a radio tone and/or pulse generated by the electronic tag 1202-1.

The control device 1200 receives (1254) the radio signal transmitted by the electronic tag 1202-1. In some implementations, the control device 1200 processes the received radio signal to determine a location and motion of the electronic tag 1202-1. In some implementations, the control device 1200 transmits information regarding its transmitted radio signal the radio signal received from the electronic tag 1202-1 to a second device or server system (e.g., server system 508) for processing.

In some implementations, the control device 1200 obtains information (e.g., during a registration process) regarding an object to which each electronic tag 1202 is affixed. For example, the control device 1200 obtains information that the electronic tag 1202-1 is affixed to a wall; information that the electronic tag 1202-2 is affixed to a window; and information that the electronic tag 1202-3 is affixed to a door. In some implementations, the control device 1200 utilizes the object information in processing received radar signals. For example, the control device 1200 ignores radar information related to objects beyond the wall to which the electronic tag 1202-1 is affixed.

In some implementations, the control device 1200 is configured to enable each of the electronic tags 1202 at particular times (or at particular time intervals) to reduce interference between electronic tag communications. For example, the control device 1200 is configured such that only one electronic tag is communicating via radar at a given time. In some implementations, the control device 1200 sends enablement signals to enable radar communication for a particular electronic tag. In some implementations, the control device 1200 sends disable signals to disable radar communication for a particular electronic tag.

In some implementations, each of the electronic tags 1202 is configured to communicate via radar at set intervals. In some implementations, the intervals are set by the control device 1200 such that only one electronic tag 1202 is communicating at a given time. In some implementations, the intervals are based at least in part on the object to which the electronic tag is affixed. For example, in accordance with some implementations, an electronic tag affixed to a wall communicates once per day while an electronic tag affixed to a window communicates once per minute.

In some implementations, an electronic tag 1202 communicates via radar in response to stimulus received at a sensor of the electronic tag. For example, the electronic tag 1202-3 communicates via radar in response to detecting movement of the door (e.g., via an accelerometer) to which it is affixed. In some implementations, the electronic tag 1202 detects movement of the object to which it is affixed and, in response, sends a notification to the control device 1200 (e.g., via a sideband). In some implementations, the control device 1200 receives the notification and, in response, transmits a radio signal for use in radar analysis.

In some implementations, the control device 1200 uses the radar communications from the electronic tags 1202 in conjunction with other radar signals to improve the accuracy and precision of the radar system. For example, the control device 1200 detects slight movement of the door to which the tag 1202-3 is affixed during a particular time frame. In this example, during the same time frame, the tag 1202-3 transmits a signal, and the control device 1200 utilizes the detected movement of the door and the signal from the tag 1202-3 to map the movement of the door (e.g., with greater precision/accuracy than a mapping based on just the detected movement of the door).

In some implementations, an electronic tag, such as electronic tag 1202-3, is affixed (e.g., temporarily) to an object and a registration signal is sent to the control device 1200. In some implementations, the registration signal is sent via an application (e.g., a smart home application) on a mobile device, such as client device 504. In some implementations, the registration signal includes information about the object to which the electronic tag is affixed (e.g., identifying the object as a door, window, or wall). In some implementations, control device 1200 completes the registration process by processing the registration information and radar information received from the electronic tag to classify the object to which the electronic tag is affixed and/or determine the object's location relative to the control device 1200. In some implementations, the classification and/or location information is used for future radar processing. In some implementations, after the registration process is completed, the electronic tag is not used in future radar processing of the object. In some implementations, after the registration process is completed, the electronic tag is used to register one or more additional objects.

In some implementations, an electronic tag (e.g., electronic tag 1202-1) for affixing to an object and imparting a radar signature for the object includes a first circuit configured to communicate with one or more other devices at a first frequency (e.g., communication circuitry 903, FIG. 9B). In some implementations the first circuit includes: (a) one or more antennas configured to communicate at the first frequency (e.g., receiver 905); and (b) a first controller coupled to the one or more antennas (e.g., controller 911) and configured to govern the one or more antennas. In some implementations, the electronic tag includes a second circuit configured to communicate with the one or more other devices via radar (e.g., radar circuitry 913). In some implementations, the second circuit includes: (a) one or more second antennas configured to communicate via radar (e.g., receiver 915 and/or transmitter 917); (b) a second controller coupled to the one or more second antennas and the first controller (e.g., controller 919) and configured to communicate with the first controller and to govern the one or more second antennas.

In some implementations, the first controller is further configured to: (1) receive a command from another device via the one or more antennas; (2) determine whether the command was intended for the electronic tag (e.g., based on a unique ID of the electronic device); (3) in accordance with a determination that the command was intended for the electronic tag, operate in accordance with the command; and (4) in accordance with a determination that the command was not intended for the electronic tag, disregard the command.

In some implementations, the command comprises a command to enable radar communication, and wherein the first controller operating in accordance with the command comprises the first controller communicating the enablement command to the second controller. In some implementations, the command includes a recipient identification, and wherein the first controller determining whether the command was intended for the electronic tag comprises comparing the recipient identification with an identification of the electronic tag. In some implementations, the command is encrypted, and wherein the first controller is further configured to decrypt the command.

In some implementations, the first circuit further includes a decoder configured to decode signals received via the one or more antennas. In some implementations, the decoder is further configured to decrypt commands. In some implementations, the decoder is further configured to determine whether the command was intended for the electronic device. In some implementations, the decoder is a component of the first controller. In some implementations, the second controller is further configured to encrypt information sent via the one or more second antennas.

In some implementations, the electronic tag includes an energy storage circuit coupled to the first circuit and the second circuit and configured to provide power to the first circuit and the second circuit.

In some implementations, the energy storage circuit includes at least one of: (i) one or more capacitors; (ii) one or more batteries; (iii) circuitry configured to harvest energy from signals received via an antenna of the electronic tag (e.g., one of the one or more antennas, one of the one or more second antennas, or a third antenna dedicated to harvesting); and (iv) circuitry configured to harvest thermal, vibrational, electromagnetic, and/or solar energy received by the electronic tag.

In some implementations, the second controller is further configured to selectively enable radar communication via the one or more second antennas comprising at least one of: (i) reflecting received radio waves (e.g., at a given wavelength); (ii) amplifying received radio waves; (iii) modulating received radio waves; and (iv) generating radio waves. In some implementations, the second controller is configured to enable radar communication in response to receiving an enablement command from the first controller.

In some implementations, the second circuit further includes a modulator configured to modulate radio waves received via the one or more second antennas. In some implementations, the second circuit further includes a signal generator configured to generate radio waves at a particular frequency.

In some implementations, the electronic tag further includes one or more additional sensors coupled to the first controller, the one or more additional sensors including at least one of: a humidity sensor; a temperature sensor; an accelerometer; a gyroscope; and an optical sensor.

In some implementations, the first circuit is configured to transmit tag information via the one or more antennas (e.g., tag state information such as battery life, sensor readings, etc.). In some implementations, the second circuit is configured to transmit tag information via the one or more second antennas (e.g., tag state information such as battery life, sensor readings, etc.).

In some implementations, the electronic tag comprises a passive tag, such as a corner reflector or printed radar tag. In some implementations, passive tags modulate an incoming radio signal. The modulated incoming signal is reflected back toward the transmitting device (e.g., control device 1200). In some implementations, the signal is modulated such that when the radar system analyzes the reflected signal the tag appears to be moving at a particular speed.

Figure 12D:
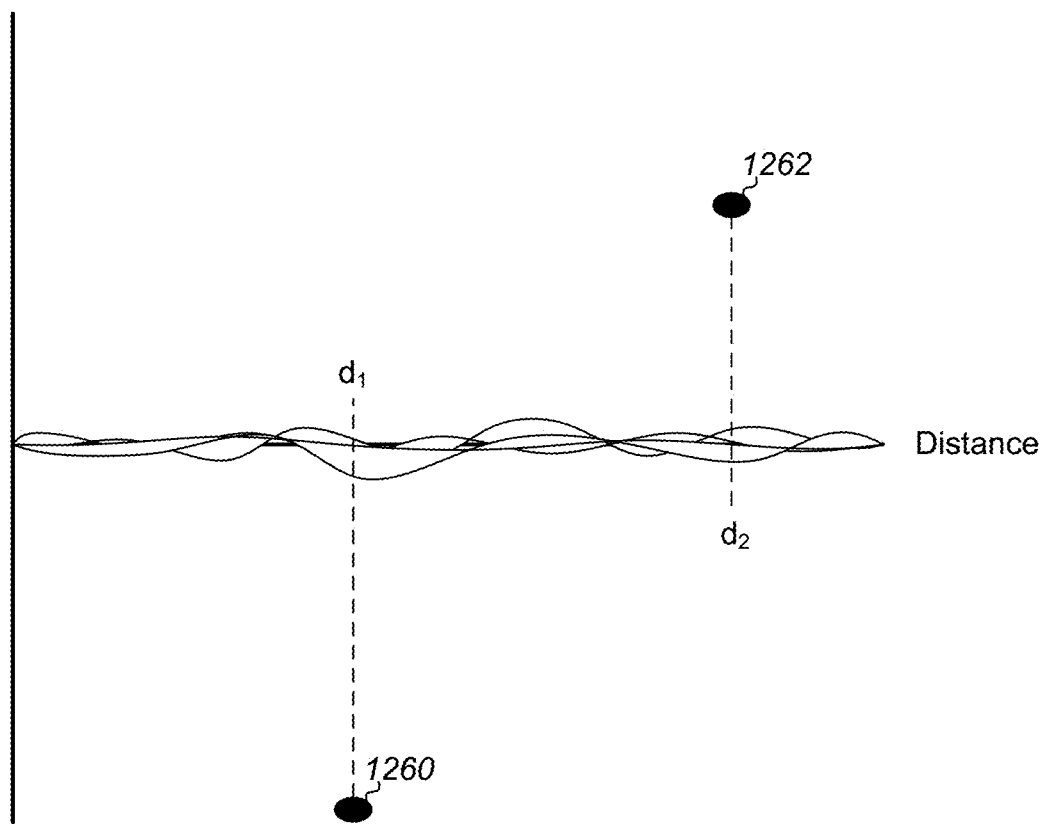
FIG. 12D is a prophetic diagram of radar data, in accordance with some implementations.

FIG. 12D is a prophetic diagram of radar data, in accordance with some implementations. FIG. 12D shows detected velocities of various objects based on received radar data. In FIG. 12D most of the detected objects are either stationary or have little velocity. Two objects, object 1260 and object 1262, are detected with high velocities. The detected object 1260 is detected a distance $d_1$ with a large negative velocity indicating that it is moving away from the radar device. The detected object 1262 is detected at a distance $d_2$ with a large positive velocity indicating that it is moving toward the radar device.

In accordance with some implementations, the detected objects 1260 and 1262 represent passive radar tags. The passive radar tags are configured to modulate incoming radio waves such that they appear to be moving with high velocity even when the tag itself is stationary. The apparent velocity of the radar tag due to the modulation is sometimes called a phantom velocity. Each radar tag is optionally configured such that its modulation produces a distinct phantom velocity. In some implementations, the radar device determines that the velocities of objects 1260 and 1262 are phantom velocities based on the value of each velocity. For example, a radar-equipped device installed within a smart home environment detects an object with a velocity of 30 miles per hour. Since objects within the smart home generally do not move at such high velocities, the radar-equipped device determines that the velocity is a phantom velocity and the object is a radar tag. In some implementations, the radar-equipped device determines that the velocities of objects 1260 and 1262 are phantom velocities based on the constant location of the objects. For example, a radar-equipped device performs a first scan and detects the object 1260 at distance $d_1$ with an apparently high velocity. The radar-equipped device performs a second scan at a later time and again detects the object 1260 at distance $d_1$. Because the object 1260 is at the same distance in both scans the velocity is determined to be a phantom velocity. In some implementations, the radar-equipped device stores a list of radar tag information with each tag's expected distance and/or expected phantom velocity (e.g., obtained during a registration process for the radar tags). In some implementations, the radar-equipped device compares the list of radar tag information with the detected results to identify any detected tags.

In some implementations, a radar tag is affixed to an object such as a door or window. In some instances, the object to which the device is affixed is in motion during a radar scan. In these circumstances, the detected velocity of the radar tag includes both a phantom velocity due to the modulation of the radio signal and an actual velocity of the object to which the radar tag is attached. In some implementations, the radar-equipped device identifies the actual velocity component and associates it with the object to which the radar tag is affixed. For example, the radar tag is affixed to a door and the radar-equipped device determines that the radar tag is moving 1 inch per second. In this example, the radar-equipped device associates the 1 inch per second movement with the door and optionally alerts a user of the smart home environment that movement of the door has been detected. In some implementations, the radar-equipped device identifies the actual velocity component based on the radar tag's detected distance (e.g., detected distance over a period of time). In some implementations, the radar-equipped device identifies the actual velocity component based on an expected phantom velocity for the radar tag.

In some implementations, a radar tag is configured such that it optionally selectively modulates incoming radio waves to exhibit one of a plurality of different phantom velocities. For example, a particular radar tag may be configured to operate in a first state where it exhibits a phantom velocity of 10 miles per hour; operate in a second state where it exhibits a phantom velocity of 15 miles per hour; or operate in a third state where it exhibits a phantom velocity of 20 miles per hour. In some implementations, the operating state of the radar tag is governed by a control device, such as control device 1200. In some implementations, the operating state of the radar tag is configured during a registration process.

In some implementations, a method is performed at a computing system having one or more processors and memory (e.g., control device 1200). The method comprises (1) sending a request via a first transmitter to enable a remote radar device (e.g., electronic tag 1202-1); and (2) in response to the request, receiving via a radar receiver a radio communication from the radar device.

In some implementations, the method further comprises: (1) obtaining identification for the remote radar device; and (2) encrypting the identification; where sending the request comprises sending the encrypted identification.

In some implementations, the method further comprises, after receiving the radio communication from the radar device, sending a request via the first transmitter to enable a second remote radar device.

In some implementations, the method further comprises, after receiving the radio communication from the radar device, sending a request via the first transmitter to disable radio communication by the radar device (e.g., to prevent interference with communication by a second radar device).

In some implementations, the method further comprises: (1) prior to sending the request, receiving a registration request for the remote radar device; and (2) in response to receiving the registration request, determining a location of the remote radar device.

In some implementations, determining the location of the remote radar device comprises determining the location of the remote radar device based on the received radio communication.

In some implementations, the registration request is received via an application (e.g., an application on a mobile device).

In some implementations, the registration request includes information regarding an object to which the remote radar device is affixed (e.g., attached to a door, window, wall, or the like).

In some implementations, the computing system comprises a smart device (e.g., smart device 204).

In some implementations, the smart device comprises one of: a thermostat; a camera; a hub device; a hazard detector; an irrigation device; media playback device; entryway interface device; appliance; or a security device.

In some implementations, the radio communication comprises at least one of: (i) a reflection of a radio signal transmitted by the computing device; (ii) a modulation of a radio signal transmitted by the computing device; and (iii) a radio signal generated at the remote radar device (e.g., a tone or pulse).

In some implementations, the radio communication includes information regarding operation of the remote radar device (e.g., sensor readout information).

In some implementations, the method further comprises receiving via a first receiver, communications from the radar device (e.g., status information).

In some implementations, a method performed at an electronic device (e.g., electronic tag 1202-1), comprises: (1) receiving, via a first receiver, an enablement request from a remote device (e.g., control device 1200); (2) determining whether the enablement request was intended for the electronic device; (3) in accordance with a determination that the enablement request was not intended for the electronic device, disregarding the enablement request; and (4) in accordance with a determination that the enablement request was intended for the electronic device, communicating with the remote device via radar.

In some implementations, the enablement request is encrypted, and the method further comprises decrypting the enablement request.

In some implementations, determining whether the enablement request was intended for the electronic device comprises comparing an identification of the electronic device to identification in the enablement request.

In some implementations, the enablement request includes timing information for communicating with the remote device via radar, and the method further comprises communicating with the remote device via radar in accordance with the received timing information (e.g., send pulse every minute, hour, or day).

In some implementations, the method further comprises encrypting information to be sent via to the remote device, wherein communicating with the remote device via radar comprises communicating the encrypted information.

In some implementations, the method further comprises: (1) storing energy received via one or more antennas of the electronic device; and (2) utilizing the stored energy to communicate with the remote device via radar.

In some implementations, communicating with the remote device via radar includes at least one of: reflecting received radio waves; amplifying received radio waves; modulating received radio waves; and generating radio waves.

Synchronization of Multiple Radar-Equipped Devices

Figure 13A:
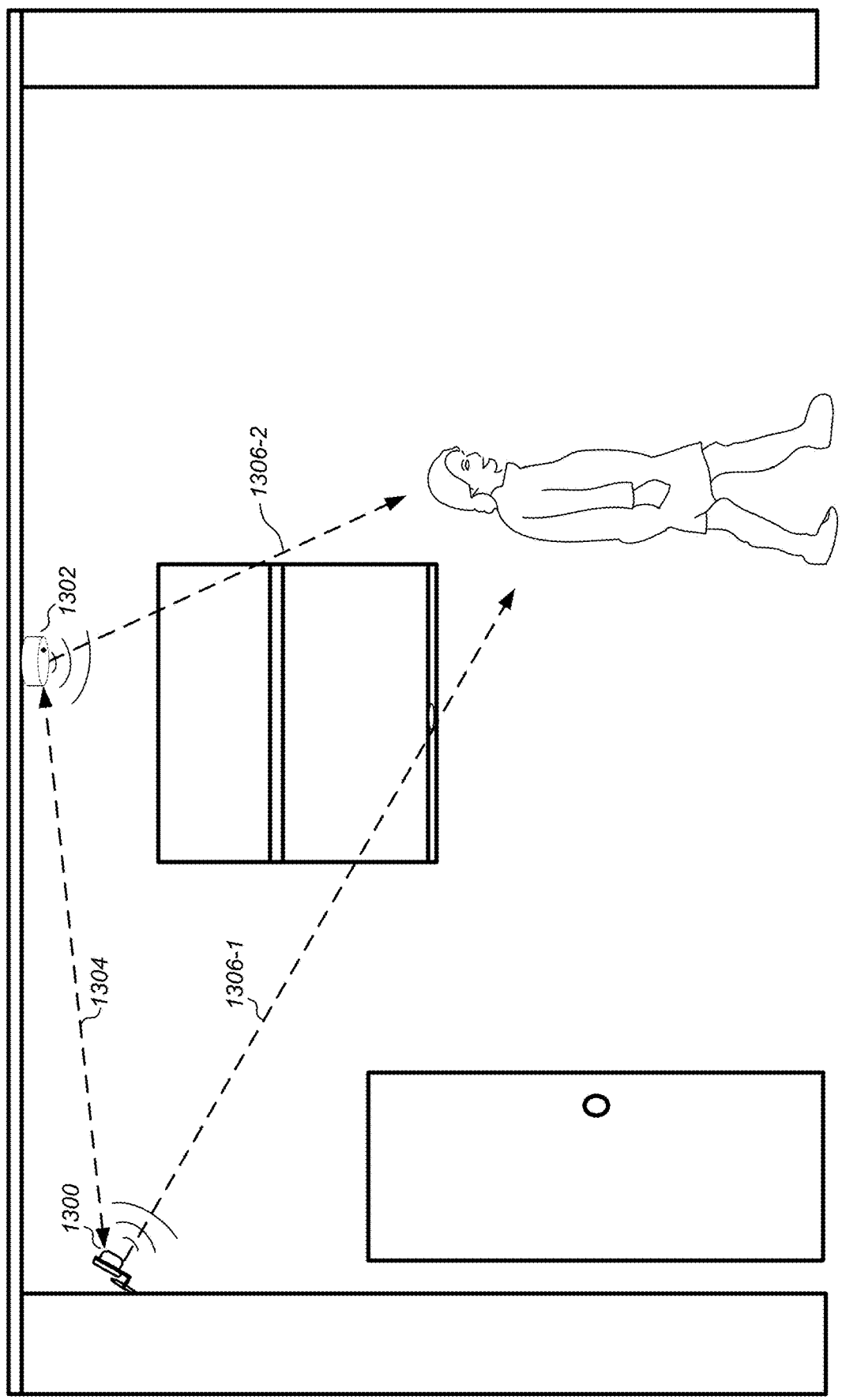
FIG. 13A illustrates an environment and system for utilizing data from multiple radar devices, in accordance with some implementations.

FIG. 13A illustrates an environment and system for utilizing data from multiple radar devices, in accordance with some implementations. FIG. 13A shows a first radar-equipped device 1300 (e.g., a camera 118) communicating with a second radar-equipped device 1302 (e.g., a smart hazard detector 104) via signals 1304. In some implementations, signals 1304 comprise wireless signals utilizing a precise timing protocol, such as Wi-Fi. For example, in accordance with some implementations, the device 1300 and the device 1302 communicate utilizing IEEE 1588 Precision Time Protocol (PTP). In some implementations, signals 1304 enable the first device 1300 and the second device 1302 to precisely synchronize in time (e.g., synchronized within microseconds or nanoseconds of one another).

FIG. 13A further shows the first radar-equipped device 1300 utilizing radar via radio signals 1306-1, and the second radar-equipped device 1302 utilizing radar via radio signals 1306-2. In some implementations, the synchronization between the first device 1300 and the second device 1302 is utilized to combine the radar data from the first device 1300 and the radar data from the second device 1302. Combining the radar data allows for more accuracy and precision in determining object locations and motion. For example, in accordance with some implementations, the first device 1300 and the second device 1302 each include a one-dimensional radar system. In this example, the radar data collected at each device is combined to generate results equivalent to, or better than, a single multi-dimensional radar system located at either device, in terms of accuracy and/or precision. Thus, synchronization of multiple radar-equipped devices enables the system to generate accurate and precise results while utilizing lower dimensional radar systems (e.g., 1D radar systems) at each device. One dimensional radar systems generally require a smaller physical footprint (e.g., smaller antenna), consume less operating power, and require less processing power at the device than higher dimensional radar systems (e.g., two dimensional radar systems).

In some implementations, combining radar data between devices includes analyzing radio signals received by a first device that correspond to radio signals transmitted by a second device. For example, the second device emits a brief radio transmission (also sometimes called a chirp) and the first device receives a radio signal corresponding to the emitted radio transmission (e.g., after the radio signals have bounced or reflected off of various objects/entities). In some implementations, combining the radar data between devices includes analyzing first radio signals received by the first device corresponding to radio signals transmitted by the first device, and analyzing second radio signals received by the second device corresponding to radio signals transmitted by the second device. For example, at a first time the first device emits a brief radio transmission and receives a corresponding radio signal; then, at a second time, the second device emits its own brief radio transmission (e.g., utilizing a same or substantially same radio frequency) and receives a corresponding radio signal. In this example, radar information from both devices is combined and analyzed.

In some implementations, synchronization of multiple radar-equipped devices enables multi-dimensional radar processing. For example, a radio signal transmitted by a first device (e.g., utilizing a first transmitter) is received by multiple receivers, including a receiver at the first device and a receiver at a second device. Utilizing multiple receivers at distinct locations enables the system to determine an object's position with greater accuracy and precision. For example, the angle between the transmitter and the object can be determined based on a scatter pattern received across the multiple receivers.

In some implementations, a system includes a plurality of synchronized radar-equipped devices (e.g., device 1300 and device 1302). The system determines which device should transmit a radio signal. In some implementations, the system determines which device should transmit based on a preset schedule. In some implementations, the system determines which device should transmit based on a particular object of interest. For example, the system determines that a first device (e.g., device 1302) should transmit because it is the closest radar-equipped device to the object of interest. In another example, the system determines that a second device (e.g., device 1300) should transmit because it has a clear field of view of the object. In some implementations, the system includes a hub device (e.g., hub device 180) and the hub device governs radar operations of the plurality of devices (e.g., makes the determinations as to which device should transmit at a given time). In some implementations, the system includes a server (e.g., a server of server system 508) and the server governs radar operations of the plurality of devices (e.g., makes the determinations as to which device should transmit at a given time). In some implementations, the plurality of synchronized devices includes one device designated as the master device. In some implementations, the master device governs radar operations of the plurality of devices. In some implementations, processing and analysis of radar data from the plurality of devices occurs at the master device.

In some implementations, the distance between synchronized devices is determined via a wireless signal. For example, the distance between device 1300 and device 1302 is determined utilizing signals 1304. In some implementations, the distance between synchronized devices is determined based on travel time of the wireless signal.

In some implementations, in a first mode, the system cycles between the plurality of synchronized radar-equipped devices, where each device transmits in turn. For example, a first device transmits at time 0, a second device transmits at time 5, and a third device transmits at time 10. In some implementations, the system analyzes the received radio signals from each transmission and determines whether the transmission includes an object of interest. For example, the system determines that a detected object is an object of interest based on the object's position or motion, such as the location, velocity, direction of movement, and/or acceleration of the object. In this example, the system optionally determines: (1) that the object's location is within a zone of interest or meets one or more other predefined criteria (e.g., is within 20, 10, or 5 feet of the transmitting device); (2) that object's velocity meets one or more predefined criteria (e.g., exceeds a predefined threshold, such as 1 meter per second, 1 foot per second, or 1 inch per second); (3) the object's direction of movement meets one or more predefined criteria (e.g., is in the direction of a zone of interest or is in the direction of the transmitting device); or (4) the object's acceleration meets one or more predefined criteria (e.g., exceeds a predefined threshold). In some implementations, in accordance with a determination that a detected object is an object of interest, the system switches to a second mode. In some implementations, in the second mode, the system determines that a first device of the plurality of devices should transmit based on the relative positions and fields of view of the plurality of devices. For example, the system determines that the first device is the closest to the object of interest and/or has a clear field of view of the object of interest. In some implementations, the first device transmits a radio signals that is received by at least a subset of the plurality of devices. In some implementations, the received signals are analyzed to determine the object's position and motion, in some situations with greater precision and/or accuracy than when the object of interest was initially detected and/or determined to be an object of interest. In some implementations, the system utilizes multiple-input and multiple-output (MIMO) methods, such as phase shifting at the transmit antenna, to increase resolution.

Figure 13B:
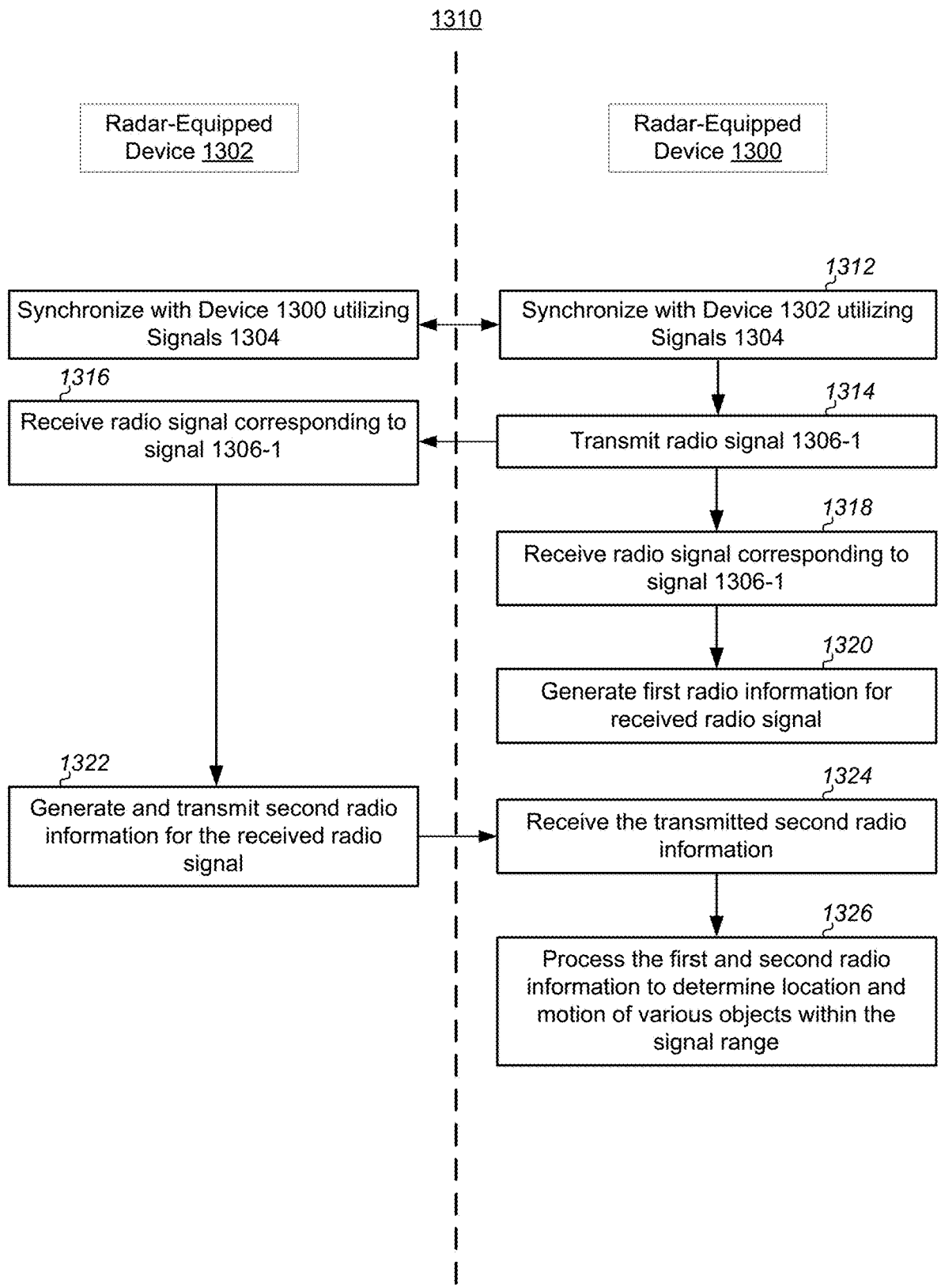
FIG. 13B illustrates a representative system and process for utilizing radar data from multiple radar-equipped devices, in accordance with some implementations.

FIG. 13B illustrates a representative system and process for utilizing radar data from multiple radar-equipped devices, in accordance with some implementations. At a first time, the radar-equipped device 1300 is synchronized with the radar-equipped device 1302 utilizing signals 1304. In some implementations, the radar-equipped device 1300 is synchronized with the radar-equipped device 1302 utilizing IEEE 1588 Precision Time Protocol in conjunction with signals 1304.

At a second time, the device 1300 transmits (1314) a radio signal 1306-1. In some implementations, the device 1300 utilizes radar circuitry to transmit the radio signal 1306-1. The device 1300 receives (1318) a radio signal corresponding to the transmitted radio signal 1306-1. For example, the device 1300 receives a radio signal that includes radio waves from the transmitted radio signal that bounced off of various objects and returned back to the device 1300. The device 1300 generates (1320) first radio information for the received radio signal. In some implementations, the device 1300 analyzes the relationship between the transmitted radio signal 1306-1 and the received radio signal to determine the location and/or movement of various detected objects. In some implementations, the device 1300 generates timing and phase information of the received radio signal.

The device 1302 receives (1316) the transmitted radio signal 1306-1. In some implementations, the device 1302 receives the transmitted radio signal 1306-1 via its radar circuitry. The device 1302 generates and transmits (1322) second radio information for the received radio signal. In some implementations, the generated second radio information includes timing and/or phase information of the received radio signal. In some implementations, the generated second radio information includes information regarding the location and/or movement of various detected objects. In some implementations, the device 1302 transmits the second radio information via a wireless communications channel, such as Wi-Fi or Bluetooth.

The device 1300 receives (1324) the transmitted second radio information. In some implementations, the device 1300 receives the transmitted second radio information via a wireless communications channel, such as Wi-Fi or Bluetooth. The device 1300 processes (1326) the first and second radio information to determine the location and motion of various objects within the signal range. For example, the device 1300 compares the first and second radio information to the transmitted radio signal 1306-1 to detect objects and determine their location and motion.

Radar-Equipped Smart Devices

Figure 14A:
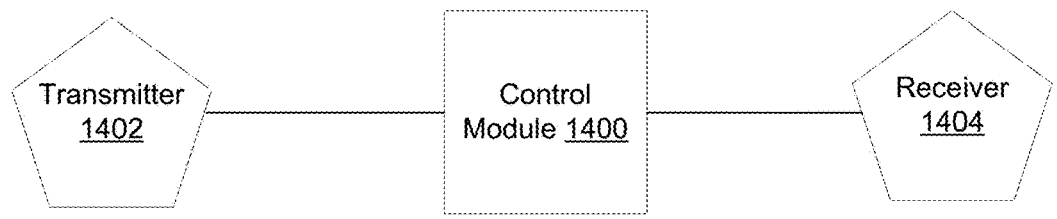
FIGS. 14A-14C are block diagrams illustrating representative radar systems, in accordance with some implementations.
Figure 14B:
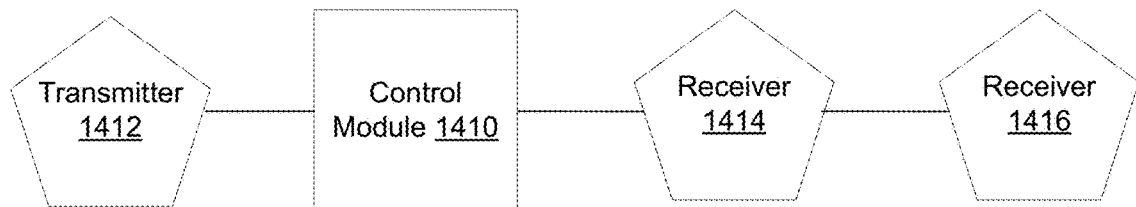
Figure 14C:
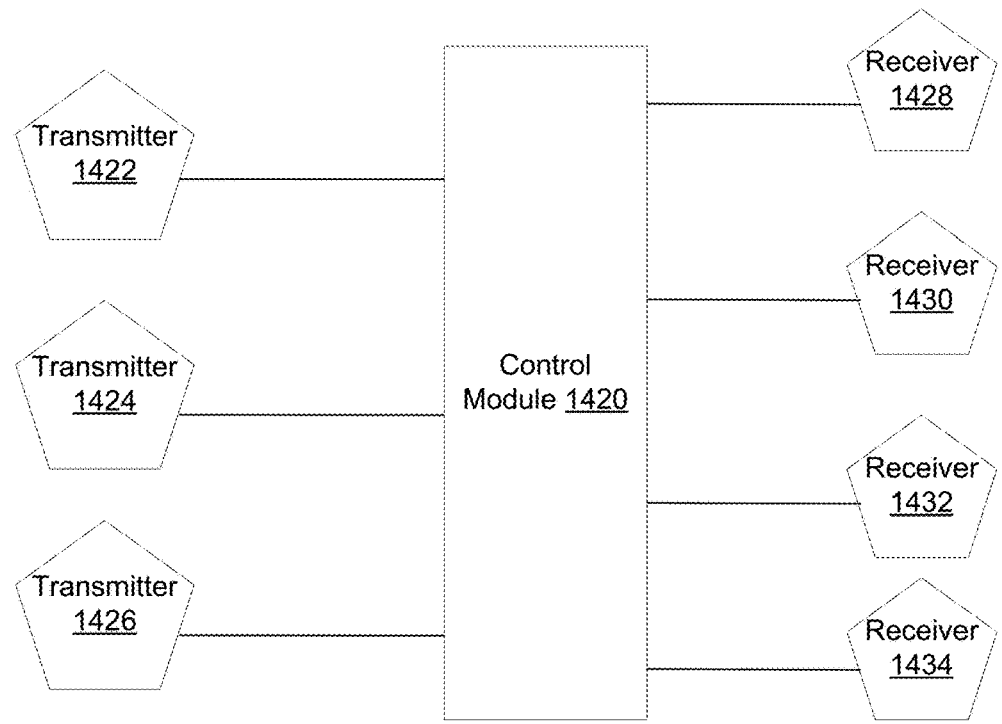

FIGS. 14A-14C illustrate block diagrams of radar systems, in accordance with some implementations. In some implementations, the radar systems illustrated in FIGS. 14A-14C are components of a smart device 204. For example, in accordance with some implementations, components of the smart device 204 illustrated in FIG. 9A, such as communications module 942, radar module 944, and/or radar processing module 9324 comprise one of the radar systems illustrated in FIGS. 14A-14C.

FIG. 14A illustrates a block diagram of a one-dimensional radar system, in accordance with some implementations. The one-dimensional radar system in FIG. 14A includes radar control module 1400, a radio transmitter 1402, and a radio receiver 1404. In some implementations, the one-dimensional radar system is configured such that the transmitter 1402 and the receiver 1404 are a known distance apart on a single plane. In some implementations, the transmitter 1402 includes an antenna, such as a stamped sheet metal antenna, an adhesive antenna (e.g., a sticker or tape antenna), a trace antenna on the surface of a printed circuit board (also sometimes called a PCB antenna or a board antenna), a chip antenna, or a ceramic antenna. In some implementations, the receiver 1404 includes an antenna, such as a stamped sheet metal antenna, an adhesive antenna, a trace antenna, a chip antenna, or a ceramic antenna.

FIGS. 14B and 14C illustrate block diagrams of multi-dimensional radar systems. FIG. 14B shows a multi-dimensional radar system with radar control module 1410, a radio transmitter 1412, and radio receivers 1414 and 1416. In some implementations, the radio transmitter 1412 and the radio receivers 1414 and 1416 each include an antenna configured for one or more radio frequency bands. For example, the transmitter 1412 emits a radio signal, such as a tone or pulse (e.g., a 77 GHz tone). The receivers 1414 and 1416 receive radio waves corresponding to the emitted radio signal. The control module 1410 compares the timing and phase of the received radio waves with the emitted radio signal to determine the location and/or motion of various detected objects. Differences between the radio waves received at receiver 1414 and the radio waves received at receiver 1416 are analyzed to determine the location/motion of the detected objects with greater accuracy and/or precision.

FIG. 14C shows a multi-dimensional radar system with radar control module 1420, radio transmitters 1422, 1424, and 1426, and radio receivers 1428, 1430, 1432, and 1434. In some implementations, the radio transmitters 1422, 1424, and 1426 and the radio receivers 1428, 1430, 1432, and 1434 are all on a same plane perpendicular to a dimension of interest. In some implementations, the radio transmitters 1422, 1424, and 1426 and the radio receivers 1428, 1430, 1432, and 1434 each include an antenna configured for one or more radio frequency bands. For example, first the transmitter 1422 emits a radio signal. The receivers 1428, 1430, 1432, and 1434 receive radio waves corresponding to the emitted radio signal. The control module 1420 compares the timing and phase of the received radio waves with the emitted radio signal to determine the location and/or motion of various detected objects. Differences between the radio waves received at respective receivers are analyzed to determine the location/motion of the detected objects with greater accuracy and/or precision. Next the transmitter 1424 emits a radio signal and the process is repeated. Then transmitter 1426 emits a radio signal and the process is repeated again. Utilizing multiple transmitters and multiple receivers at known distances from one another allows for more accurate and precise results. Utilizing multiple receivers also enables tracking of multiple objects moving simultaneously. For example, accurate tracking of N objects generally requires at least N+1 receivers.

In some implementations, the radar systems described herein utilize continuous-wave radar. In some implementations, the radar systems utilize un-modulated continuous wave radar to detect moving objects based on Doppler effects. In some implementations, the radar systems utilize frequency-modulated continuous wave radar (FMCW), such as sawtooth or sinusoidal frequency modulation, to determine object distances and motion. For example, in accordance with some implementations, the frequency is modulated across a frequency band, such as 3-10 GHz, 24-24.5 GHz, 57-64 GHz, and/or 77-81 GHz. In some implementations, the radar system utilizes FMCW and determines the velocity of various objects based on a phase shift, or a rate of phase shift, in radar signals reflected off the objects. In some implementations, the radar system utilizes a phase shifting modulation continuous wave radar (PMCW). In some implementations, the radar system utilizes PMCW to detect object locations and motion by generating pseudo-random phase-shifting sequences.

In some implementations, the radar systems described herein employ relatively low power radar transmitters due to the radar transmitters being deployed within or in proximity to a smart home environment (e.g., a smart home environment 100 as shown in FIG. 1), where long range radar detection is not required. For example, in accordance with some implementations, the radar transmitters consume less than one watt of power while in an idle or periodic scan mode. In some implementations, the radar transmitters comprise low power radar transmitters configured to consume less than a threshold amount of power (e.g., less than 1 W, 100 mW, or 10 mW). In some implementations, operation of the radar transmitters is constrained to a limited range—even compared to the natural range of the radar transmitters—based on a characteristic size (e.g., area, volume, width, depth, height, etc.) of the smart home environment 100 as a whole or of rooms within the smart home environment 100. In some implementations, the radar transmitter range is constrained through use of radar tags as described herein (e.g., radar tags 1202 as discussed with reference to FIGS. 12A-12D). In some implementations, the radar transmitter range is constrained by radar signal processing operations performed by the server system 508 or the electronic tag 206 that have the effect of rejecting signal returns from objects whose distance from the transmitter is greater than a predefined distance. In some implementations, operation of the radar transmitters is constrained to identify objects that are stationary or that are moving slowly as such transmitters are commonly used in a smart home environment to identify relatively slowly moving people (adults and children) and pets. In some implementations, the radar systems described herein are employed to detect anomalies of objects, people and/or animals within a smart home environment 100. For example, anomalies detectable by the radar system in some implementations include anomalous behavior of people within the smart home environment, such as an individual who has fallen down, is breathing erratically, is in the home following activation of a smoke alarm, an individual that is not recognized (e.g., an intruder), or a child present in restricted areas of a home, such as near entrances to a garage or a pool.

Various types of internal antennas are optionally used with the various devices disclosed herein. Internal antennas are sometimes called embedded antennas. As used herein, an internal antenna includes any antenna that lies within the device casing. Internal antennas are generally not implemented within metal casings as the metal casing will degrade efficiency. The internal antennas are coupled to a communications control module (e.g., control module 1400, 1410, or 1420). The communications control module is sometimes called communications circuitry, a radio module, or a radio. In some implementations, the communications control module comprises a communications chip. In some implementations, an internal antenna is coupled to a communications control module via one or more controlled impedance structures, such as coaxial cable, controlled impedance circuit board traces (e.g., microstrip or stripline), spring-loaded pogo pins or spring fingers, flex circuits with controlled impedance lines, and the like. In some implementations, the internal antenna is coupled to the communications control module via one or more filters, amplifiers, and/or switches. Cables and traces will introduce losses and should be carefully considered. For example, cables and traces create opportunities for noise to enter the receiver system.

Internal antennas are generally susceptible to interference with other device components (including other internal antennas). In some instances, the primary noise source is digital circuitry, such as the processor(s) and memory. For example, in some instances, processor clocks, high-speed memory, displays, and graphics processors are the highest sources of noise and produce the widest range of frequencies. In some implementations, the digital electronics are shielded with board-mounted shield cans. In some implementations, the antenna(s) are positioned as far from the largest noise sources as possible. In some implementations, the antenna interconnect(s) are routed away from the largest noise sources. In some implementations, non-shielded antenna interconnects (e.g., spring fingers or pogo pins) are positioned to limit exposure to the largest noise sources.

A sheet metal antenna is also sometimes called a stamped metal antenna. In some implementations, a sheet metal antenna is mounted on circuit board and coupled to a communications module. In some implementations, sheet metal antenna is mounted perpendicular to the plane of circuit board. In some implementations, the sheet metal antenna is mounted parallel to the plane of circuit board. In some implementations, the sheet metal antenna comprises an inverted-F style antenna. In some implementations, the sheet metal antenna comprises a patch antenna. In some implementations, the patch antenna is a printed patch antenna. In some implementations, the patch antenna is printed on a surface of a multi-layer circuit board. In some implementations, the patch antenna comprises a directional antenna with a primary lobe of radiation oriented away from the ground plane of the device.

The size and shape of the local ground plane and the relatively close spacing of the ground plane to the antenna element each have an impact on the antenna design. Sheet metal antennas are optimally placed on the edge of a ground plane, such as the edge of a circuit board, or on top of a planar ground plane surface. Thus, a sheet metal antenna is optimally not surrounded by ground planes and/or other conducting surfaces.

A board antenna is sometimes also called a printed circuit board (PCB) antenna or a PCB trace antenna. In some implementations, a board antenna is mounted on circuit board and is coupled to communications module. Board antennas are generally affected by the circuit board's substrate properties, such as the dielectric constant and dissipation factor. In some implementations, the board antenna comprises a single-ended antenna. In some implementations, the board antenna comprises a differential antenna. In some implementations, the board antenna comprises a Yagi antenna. In some implementations, the board antenna comprises an F antenna. In some implementations, the board antenna comprises an inverted-F antenna. In some implementations, the board antenna is laminated on the circuit board surface. In some implementations, the board antenna occupies one or more layers on the circuit board.

A chip antenna is generally mounted on a printed circuit board. In some implementations, chip antennas are placed on a circuit board like a standard circuit component, although these antennas generally suffer in efficiency. Chip antennas are generally affected by the circuit board's substrate properties, such as the dielectric constant and dissipation factor. The circuit board's substrate material reduces the resonant length of the antenna, which results in a reduction of the usable bandwidth. The circuit board substrate also introduces a loss mechanism and reduces the antenna's efficiency. In some instances where the available board space for the antenna is limited, a chip antenna is an optimal antenna type. In some implementations, the chip antenna comprises a ceramic chip antenna. In some implementations, the chip antenna comprises an F antenna. In some implementations, the chip antenna comprises an inverted-F antenna. In some implementations, the chip antenna comprises a monopole antenna.

In some implementations, an adhesive antenna is mounted to a cover (also sometimes called a casing or a housing). In some implementations, the adhesive antenna comprises a tape antenna. In some implementations, the adhesive antenna comprises a sticker antenna. In some implementations, the adhesive antenna comprises a conductive paint antenna. In some implementations, the adhesive antenna comprises a wire antenna.

To optimize performance and reduce noise, a radar system (e.g., radar antennas and circuitry) is generally positioned such that the radar system is unobstructed by other components. For example, in a device with multiple circuit boards, the radar system is generally positioned on the circuit board nearest to the cover in the direction the radar system is intended to monitor. Metal casings and other similar materials that create electro-magnetic fields are generally not positioned in front of the radar system as they may introduce noise and/or decrease the detection range. In some implementations, the radar system is positioned within a smart device so as to minimize impedance mismatches for the transmitted radio waves leaving/entering the device. In some implementations, the radar system is positioned within a smart device so as to minimize interference with other communication systems by positioning antennas remote from one another (e.g., by placing the antennas on opposite ends of a circuit board). In some implementations, the radar system is positioned parallel to the device cover facing a particular area of interest (or dimension of interest) so as to optimize resolution in the area of interest (or dimension of interest).

In a device with both Wi-Fi and radar systems, such as a radar-equipped smart device 204, interference between the Wi-Fi and radar signals is optionally minimized by configuring the device such that the radar frequency is not a harmonic of the Wi-Fi frequency or vice versa.

In a device with both a radar system and a temperature sensor, such as a radar-equipped thermostat 102, interference between the temperature sensor and the radar system is optionally minimized by configuring the device such that the temperature sensor is not operating at the same time as the radar, or immediately following the radar operation. In some instances, operation of the radar system generates sufficient heat to make temperature sensor readings of the smart home environment inaccurate. In some implementations, a duty cycle for the radar system is configured such that the radar does not transmit radio waves immediately prior to the temperature sensor performing a temperature reading.

Figure 14D:
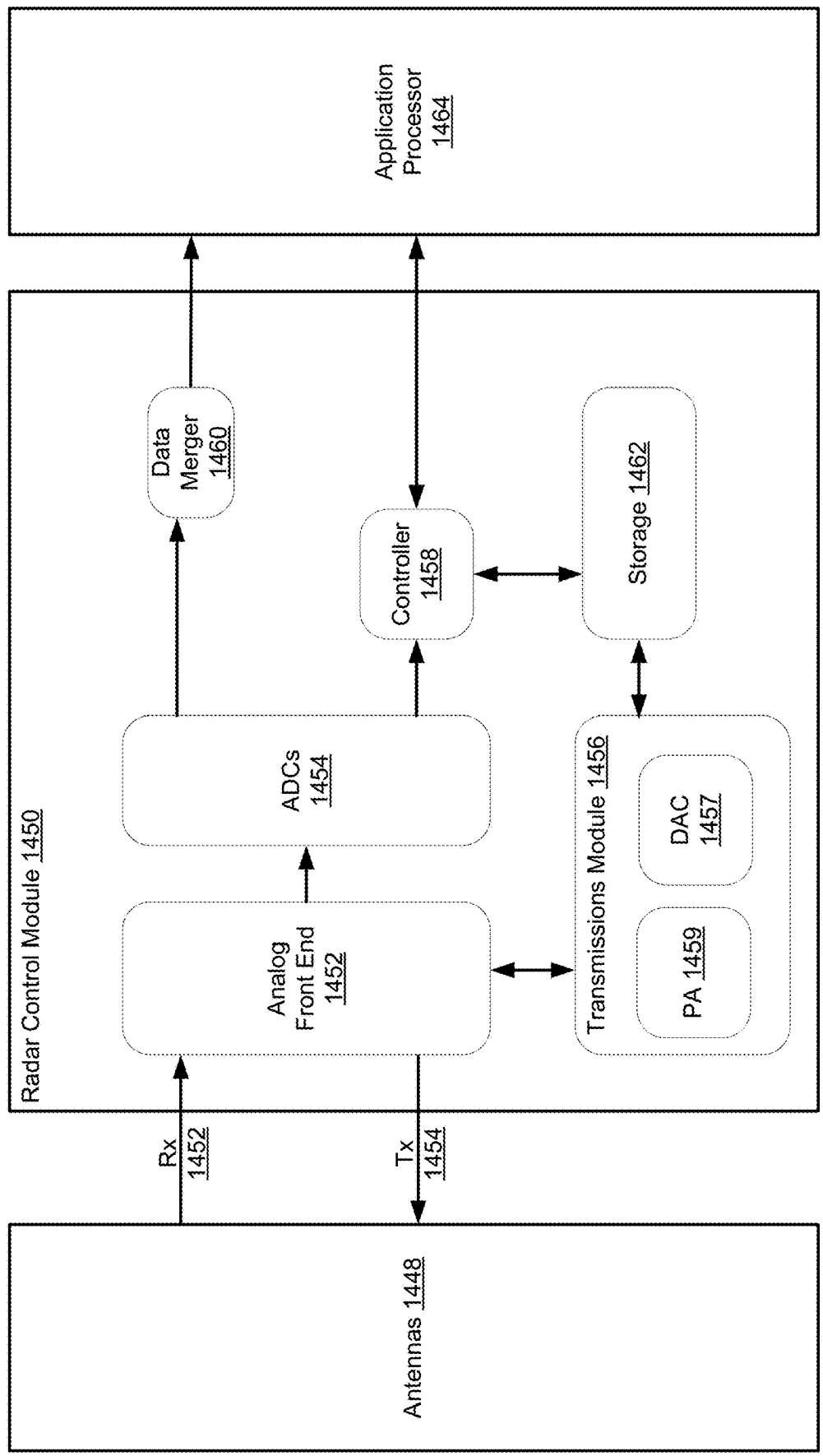
FIG. 14D is a block diagram illustrating a representative radar control module, in accordance with some implementations.

FIG. 14D is a block diagram illustrating a radar control module 1450, in accordance with some implementations. The radar control module 1450 is coupled to a plurality of antennas 1448 for transmitting and receiving radio waves via receiver lines 1452 and transmission lines 1454. In some implementations, the radar control module 1450 includes an analog front end 1452 coupled to the antennas 1448.

In some implementations, the analog front end 1452 is coupled to a plurality of analog-to-digital converters (ADCs) 1454 for converting the analog signals received from the antennas to digital signals. In some implementations the plurality of ADCs 1454 includes a first plurality of ADCs for calculating an imaginary component of the received signals and a second plurality of ADCs for calculating a real component of the received signals.

In some implementations, the analog front end 1452 is coupled to a transmissions module 1456. In some implementations, the transmissions module 1456 is configured to generate various radio signals for transmission by the antennas 1448. In some implementations, the transmissions module 1456 is configured to sample received signals from the analog front end for use in generating radio signals for future transmission. In some implementations, the transmissions module 1456 includes a digital-to-analog converter (DAC) 1457 and a power amplifier 1459. In some implementations, the transmissions module 1456 includes a signal mixer and/or oscillator. In some implementations, the transmissions module 1456 is configured to build a programmable radar signal for transmission by the antennas 1448.

In some implementations, the ADCs 1454 are coupled to a controller 1458 for processing of the digital signals. In some implementations, the controller 1458 performs for digital signal processing (DSP), such as a fast Fourier transform (FFT), on the digital signals. In some implementations, the controller 1458 includes a multi-core processor, such as an ARM® processor produced by ARM Limited.

In some implementations, the radar control module 1450 includes a storage 1462. In some implementations, the storage is for storing data from the controller 1458 and/or the transmissions module 1456. In some implementations, the storage is used to store data received from an application processor 1464. In some implementations, the storage includes a plurality of registers. In some implementations, the storage includes volatile and/or non-volatile memory.

In some implementations, the radar control module 1450 includes a data merger 1460 coupled to the ADCs 1454. In some implementations, the data merger 1460 is configured to aggregate the data output by the individual ADCs for further processing.

In some implementations, the radar control module 1450 includes a power submodule (not shown) for providing power to the various components of the radar control module 1450.

In some implementations, the radar control module 1450 is coupled to an application processor 1464 and outputs data from the data merger 1460 and/or the controller 1458 for further processing by the application processor 1464. In some implementations, control module 1400, control module 1410, and/or control module 1420 comprises radar control module 1450.

Figure 14E:
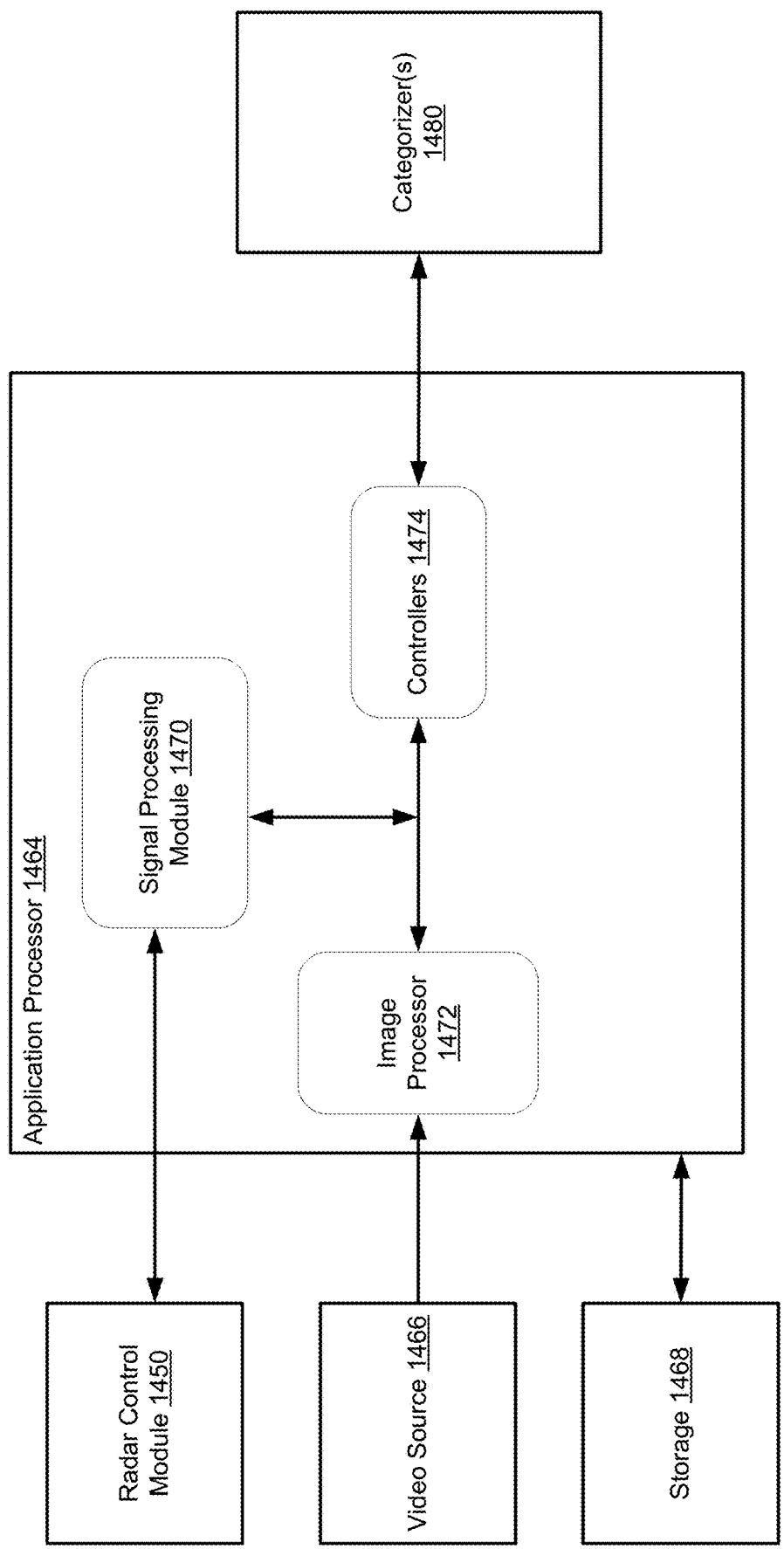
FIG. 14E is a block diagram illustrating a representative application processor, in accordance with some implementations.

FIG. 14E is a block diagram illustrating an application processor 1464, in accordance with some implementations. FIG. 14E shows application processor 1464 coupled to the radar control module 1450, a video source 1466, a storage 1468, and categorizer(s) 1480. In some implementations, the application processor 1464 is a component of a radar-equipped device, such as a smart device 204. In some implementations, the application processor 1464 is a component of a server system, such as server system 508. In some implementations, the application processor 1464 comprises event processor 7146 and radar processor 7145. In some implementations, the categorizer(s) 1480 comprise event categorizer 1107 and/or radar categorizer 1108. In some implementations, video source 1466 comprises video source 1101. In some implementations, the radar control module 1450 is a component of the radar source 1101.

In some implementations, the application processor 1464 includes an image signal processor (ISP) 1472 for processing images received from the video source 1466. In some implementations, processing the images includes determining pixel colors, adjusting exposure, adjusting focus, correcting for lens imperfections, reducing noise, and the like.

In some implementations, the application processor 1464 includes a signal processing module 1470 for processing data received from the radar control module 1450 and/or the image processor 1472. In some implementations, the signal processing module 1470 performs transformations of the data, such as fast Fourier transforms, to facilitate aggregating and analyzing the data.

In some implementations, the application processor 1464 includes a plurality of controllers 1474 for analyzing the radar data and/or the image data. In some implementations, the controllers 1474 identify objects of interest in the radar data and/or the image data. In some implementations, the controllers 1474 perform machine learning by analyzing the identified objects, categories assigned to the identified objects, and/or clusters of the identified objects.

In some implementations, the categorizer(s) 1480 categorize objects of interest identified by the controllers 1474. In some implementations, the categorizer(s) 1480 categorizer radar and/or motion events involving one or more objects of interest identified by the controllers 1474.

In some implementations, the application processor 1464 is coupled to a storage 1468. In some implementations, the storage 1464 includes volatile memory and/or non-volatile memory. In some implementations, the storage 1464 comprises DDR memory. In some implementations, the storage 1464 stores data output by the ISP 1472, the controllers 1474, and/or the categorizer(s) 1480. For example, the storage 1464 stores objects of interest identified by the controllers 1474. In some implementations, the storage 1464 comprises video and radar source data database 1109, categorization modules database 1110, and/or event data and event masks database 1111.

FIGS. 15A-15M illustrate various assembly views of a camera device 118, in accordance with some implementations. In particular, the implementations illustrate the placement of the components as part of a component layout strategy for achieving improved coexistence. Components of a camera 118 (e.g., where the camera is a smart device 204, FIG. 9A) and various implementations are described in greater detail throughout.

Figure 15A:
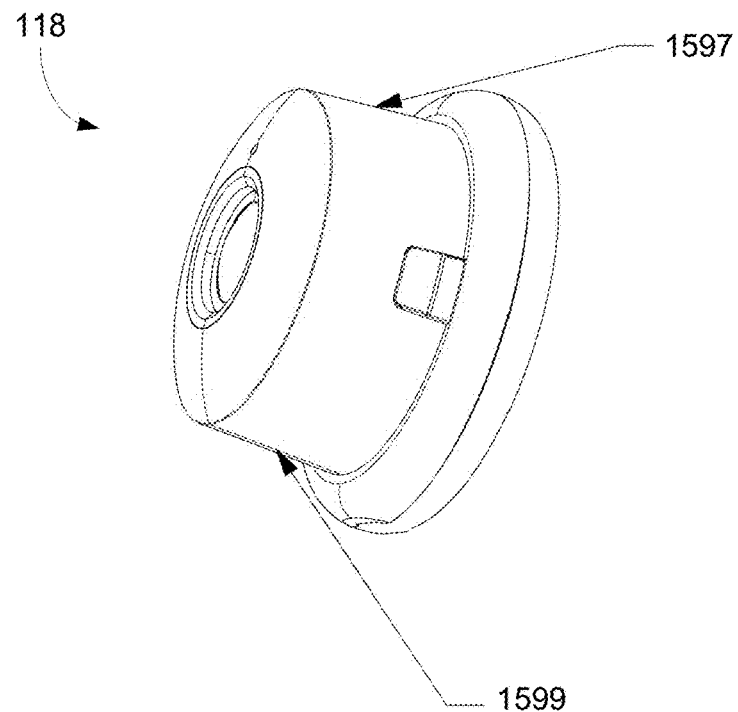
FIGS. 15A-15M illustrate various assembly views of a camera device 118, in accordance with some implementations.
Figure 15B:
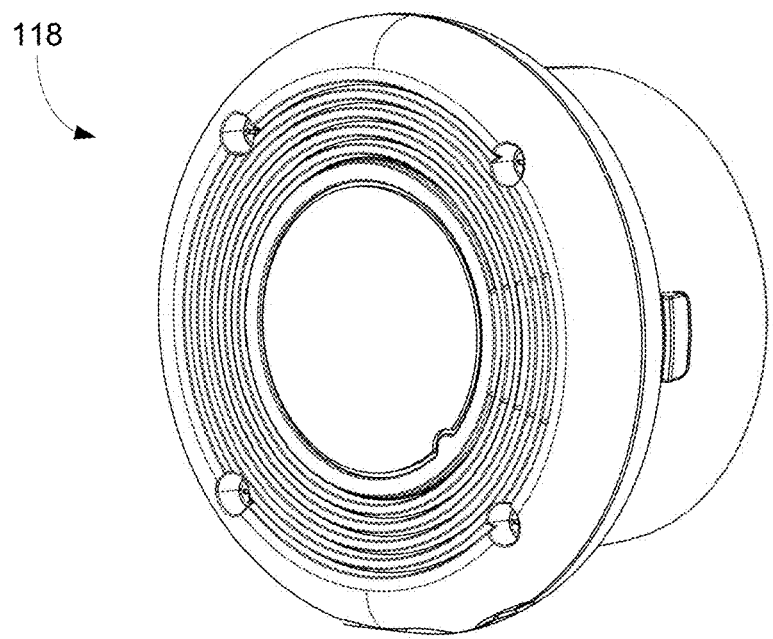

Specifically, FIGS. 15A and 15B illustrate perspective views of an assembled camera device 118. The camera device 118 captures multimedia data (image, video, and audio data) in real-time, and communicates raw or processed multimedia data to its users via a remote server. The captured raw multimedia data are optionally processed locally in the camera device 118 or remotely within the remote server (e.g., server system 508). In some implementations, the camera device 118 is radar-equipped and includes a radar system, such as one of the radar systems of FIGS. 14A-14C. In some implementations, the radar-equipped camera device 118 captures radar data and communicates raw or processed radar data to a remote server system (e.g., server system 508) for analysis and/or storage. FIG. 15A shows the camera device 118 with one or more radios 1597 corresponding to Wi-Fi communication band, and one or more radios 1599 corresponding to 15.4 communication band. In some implementations, the camera device 118 includes radios, circuitry, and/or modules for implementing radar. In some implementations, camera device 118 includes radios, circuitry, and/or modules for implementing RFID communications.

Figure 15C:
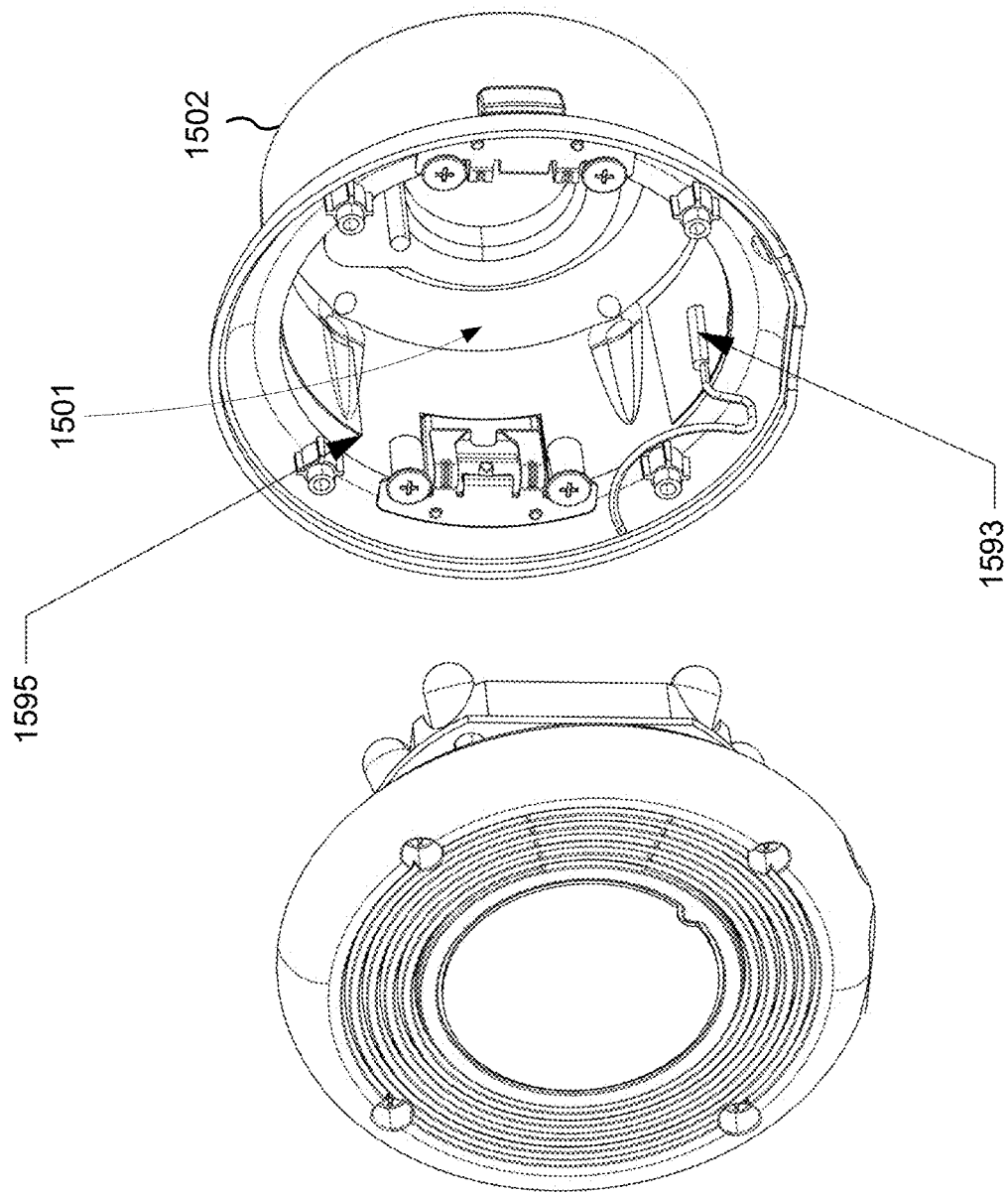
Figure 15D:
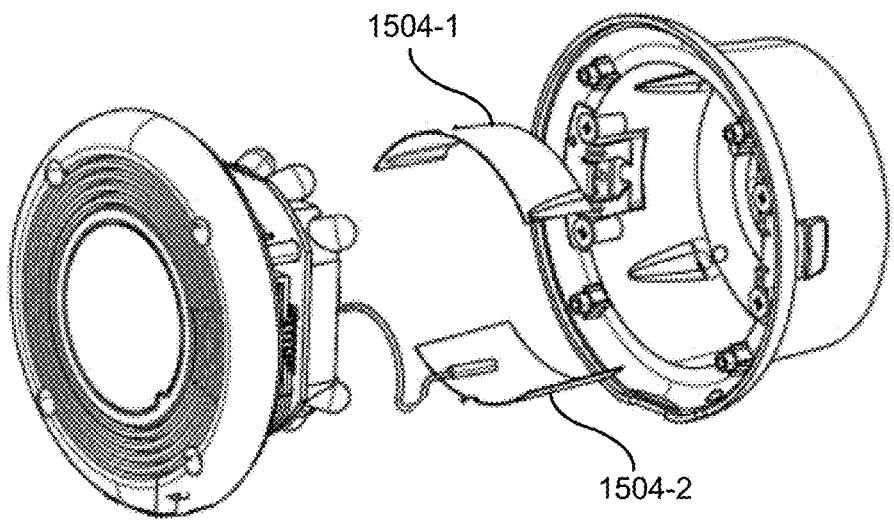
Figure 15E:
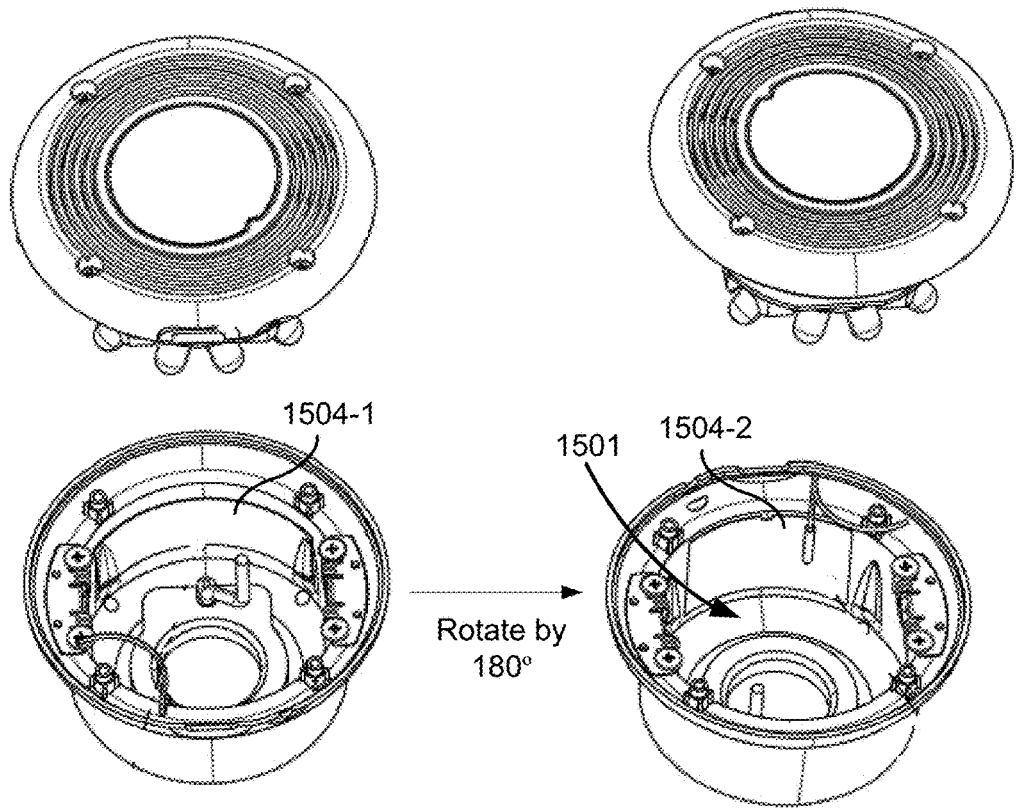

FIG. 15C illustrates a view of the camera device 118 in which the cover 1502 is removed from the camera device 118 assembly. FIG. 15C shows a Wi-Fi antenna 1595 and a 15.4 antenna 1593 attached to the inside of the cover 1502. FIG. 15C also shows a region 1501 on the front face of the inside of the cover. In some implementations, a radar system, such as one of the radar systems of FIGS. 14A-14C, is located at least in part (e.g., a radar antenna is located) within the region 1401. FIGS. 15D and 15E further illustrate views of the camera device 118 and the locations in which one or more antennas (e.g., 1504-1 and 1504-2) are positioned with respect to the cover 1502 of the camera device 118 assembly. As shown in FIG. 15D, a cable (e.g., RF coaxial cable) connects the antenna 1504-2 (e.g., a 15.4 antenna) to the main circuit board of the camera device 118 (which is illustrated with greater detail in FIGS. 15H and 15I). Although not shown, in some implementations, the antenna 1504-1 (e.g., a Wi-Fi antenna) is also connected to the main circuit board using a similar cable. In some implementations, camera 118 includes one or more additional antennas for communicating via other wavelengths and/or protocols, such as RFID or radar. For example, one or more radar antennas are affixed to the cover 1502 and/or are affixed to a circuit board proximate to the cover 1502.

The placement of antennas (e.g., the antennas 1504 and radar antennas) within the camera device 118 assembly is such that interference from conductive and transmitting components is minimized. Placement of the antennas is based at least in part on the type of antennas used. In some implementations, the antennas are optionally integrated into or secured by stickers or tape (or alternatively fixed using a non-conductive adhesive). By selecting the material of the enclosed housing of the camera assembly (e.g., cover 1502) to be a less (or non) conductive material, such as plastic, these antennas are optionally fixed adhesively along the inside of the enclosing housing, thereby reducing the impact of interference otherwise experienced. In some implementations, some or all of the antennas are stamped sheet metal antennas. These antennas are optionally constructed as three-dimensional sheet metal antennas that are mounted on the circuit board nearby the location of the corresponding transceiver. An example is a Planar Inverted-F Antenna (PIFA) stamped metal antenna. In some implementations, some or all of the antennas are trace antennas integrated into/onto a printed circuit board (PCB). In some implementations, the trace is laminated on the surface of the PCB. In some implementations, the traces occupy several layers of a multilayer board. In some implementations, some or all of the antennas are chip antennas, which are passive surface-mounted antenna components optionally made from ceramic. In some implementations, some or all of the antennas are external to the enclosed housing of the camera assembly.

Figure 15F:
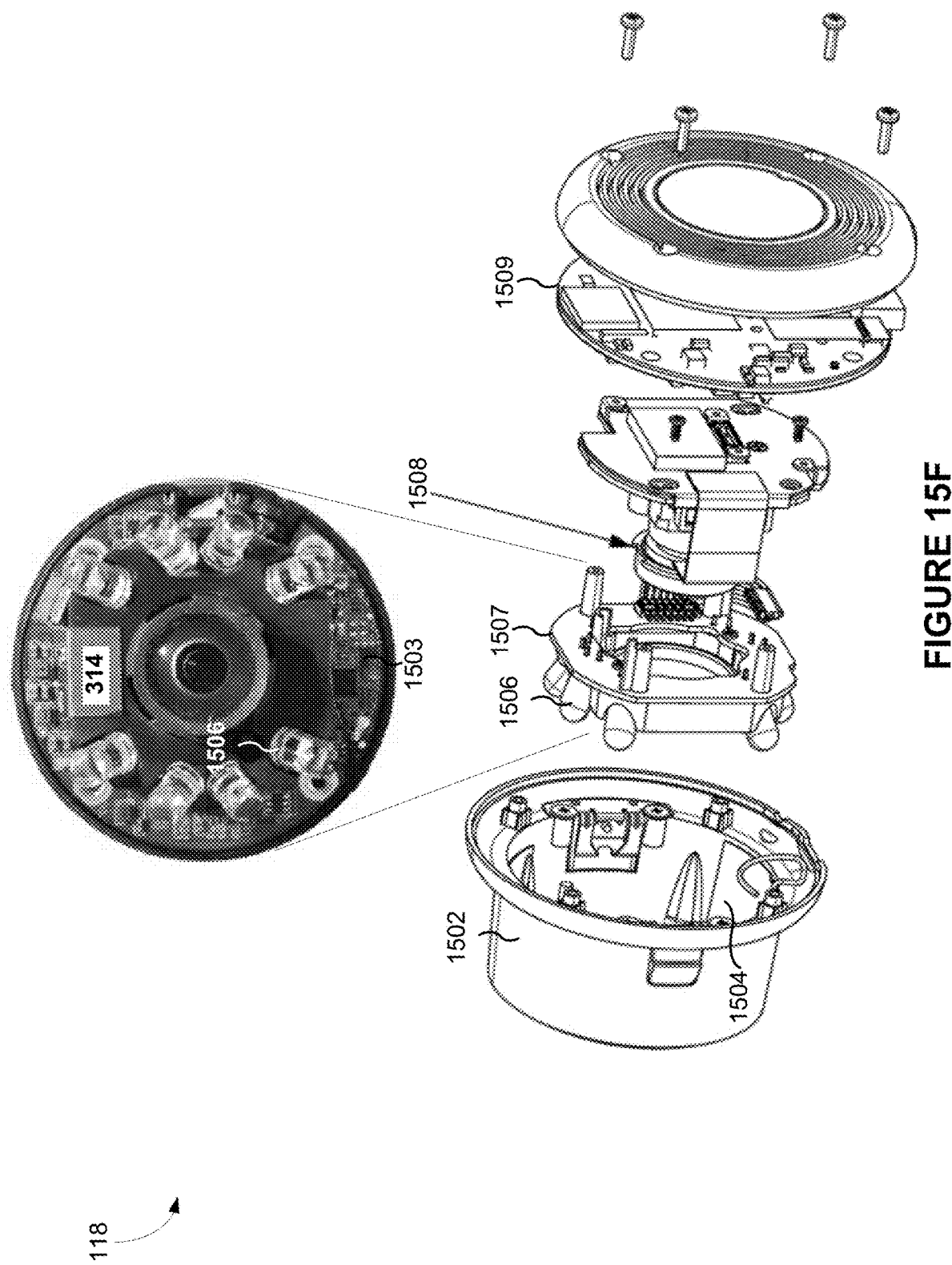

FIG. 15F is an exploded view of a camera device 118 in accordance with some implementations. This view of the camera device 118 illustrates a camera lens 1508, a plurality of LEDs 1506, and the one or more antennas 1504. In some implementations, the camera device 118 includes a radar system (e.g., a radar system of FIGS. 14A-14C) positioned at least in part on circuit board 1507, such as within region 1503. For example, a radar system positioned such that one or more antennas are located above or below the LEDs 1506 on circuit board 1507 (e.g., in region 1503). In some implementations, the camera device 118 includes a radar system positioned at least in part on circuit board 1509. For example, a radar system positioned such that one or more antennas are located near the periphery of circuit board 1509 (e.g., in region 1511 or region 1513) so as to have a field of view unobstructed by circuit board 1507. In some implementations, the camera device 118 includes a radar system mounted at least in part on cover 1502. For example, a radar system mounted such that one or more antennas are located on the forward facing portion of the cover 1502 (e.g., in region 1501).

In accordance with a regular monitor mode, the camera device 118 is configured to provide video monitoring and security in a smart home environment that is illuminated by visible light sources (e.g., the sun or light bulbs). In some implementations, the camera device 118 includes alternative operation modes, such as a night vision mode and a depth imaging mode. Each of the alternative operation modes is associated with a respective illumination condition. For example, in the night vision mode, the camera device 118 is configured to capture activities in the smart home environment at night when no or limited visible light illumination is available. In the depth imaging mode, the camera device 118 is configured to create a depth map or image for the corresponding field of view in the smart home environment. The depth map can be subsequently used in the regular monitor mode for accurate identification of objects in the smart home environment. In some implementations, the depth image is created based on one or more images captured when part of the field of view is selectively illuminated. Therefore, in some implementations, the camera device 118 is configured to include a LED illumination system, and use it as an internal light source to provide illumination in the smart home environment according to the respective illumination condition associated with each alternative operation mode of the camera device 118. In some implementations, the camera device 118 is configured to provide radar monitoring in the smart home environment. In some implementations, the camera device 118 is configured to provide radar monitoring regardless of the illumination-based operating mode of the camera device.

Specifically, in some implementations, the plurality of LEDs 1506 includes infrared LEDs 1506. The infrared LEDs 1506 are enclosed within a dark-colored, infrared-transparent plastic cover 1502 of the camera device 118, and therefore are invisible from the exterior of the camera device 118. Given that the plastic cover 1502 permits infrared light to pass through it, the camera device 118 can rely on the infrared LEDs 1506 to provide illumination at night. In the night vision mode, the plurality of LEDs is powered on to illuminate the field of view with infrared light at night. The camera device 118 includes infrared image sensors that capture infrared images or video clips of the field of view. In the depth imaging mode, the plurality of LEDs 1506 is grouped into a number of LED sets, and each LED set is selectively powered up to illuminate respective part of a field of view associated with a venue where the camera device 118 is located. Images captured in association with these LED sets are combined to generate a depth map of the entire field of view at the venue.

Alternatively, in some implementations, the plurality of LEDs 1506 is a mix of infrared and visible light LEDs, including at least one infrared LED and at least one visible light LED. In the night vision mode, the at least one infrared LED of the plurality of LEDs is powered on to illuminate the field of view with infrared light.

In some implementations, the plurality of LEDs 1506 is disposed on an internal assembly structure of the camera device 118, and configured to surround the camera lens 1508 of the camera device 118. In some implementations, as shown in the inset of FIG. 15F, each LED is optionally tilted with an angle with respect to the optical axis that passes through a center 340 of the camera lens 1508. Here, the optical axis is perpendicular to the lens surface at the center of the camera lens 1508. In some implementations, each LED is tilted away from the optical axis of the camera with the angle in the range of 20-40 degrees. In this example, the plurality of LEDs 1506 includes eight LEDs that are grouped in four pairs of LEDs. The four pairs of LEDs are disposed symmetrically within four quadrants surrounding the camera lens 1508. In some implementations, a mechanical or electrical component 314 is placed between two LED pairs or between two LEDs within a LED pair. It is noted that the camera lens 1508 can be surrounded by a number of LEDs having a different physical arrangement from the above example (e.g., the camera lens 1508 is surround by a hundred LEDs distributed uniformly in three layers surrounding the camera lens 1508).

In some implementations, the antennas (e.g., antennas 1504 and/or radar antennas) are attached on an interior wall of the camera cover 1502 according to the form factor of the camera device 118. Each of the antennas is positioned at a respective preferred location with a respective preferred orientation with respect to the other antennas to suppress or reduce the impact from the presence and interference of the other antennas. In some situations, the receiving element and the base assembly are made from metal material, and each of the antennas is positioned at a respective preferred location with a respective preferred orientation with respect to the receiving element and the base assembly to suppress or reduce the impact from their presence. To render the preferred location and orientation, each of the antennas is marked with a respective alignment mark that is configured to guide assembly of the respective antenna onto the interior wall of the camera cover 1502.

In some implementations, the one or more antennas include at least a first antenna and a second antenna. The first antenna is configured to wirelessly transfer data captured by the camera device 118 over a wireless local area network (WLAN), and the second antenna is configured to communicate configuration data associated with the WLAN via a first radio network for the purposes of commissioning the camera device 118 into the WLAN. In some implementations, the camera device 118 further includes a third antenna to allow the camera device 118 to communicate with a local hub device (e.g., the hub device 180 shown in FIG. 1) via a second radio network that is distinct from the first radio network. In some implementations, the camera device 118 further includes a third antenna to allow the camera device 118 to perform radar operations. In some implementations, the WLAN and the first and second radio networks are associated with custom or standard wireless protocols (e.g., IEEE 802.15.4, Wi-Fi, ZigBee, 6LoWPAN, Thread, Z-Wave, Bluetooth Smart, ISA100.11 a, WirelessHART, MiWi, etc.). In a specific example, the first, second, and third antennas are configured to transfer their respective data wirelessly according to IEEE 802.11, IEEE 802.15.4 and ZigBee specifications, respectively. In another example, the first, second and third antennas are configured to transfer their respective data wirelessly via IEEE 802.11, RFID, and radar, respectively.

In some implementations, the antennas are electrically coupled to separate wireless transmitter circuits that operate on distinct frequency bands, and transmit wireless signals at the distinct frequency bands concurrently. In some implementations, the antennas are electrically coupled to a duplex filter, or a switch that controls their connections to a single wireless receiver circuit.

Figure 15G:
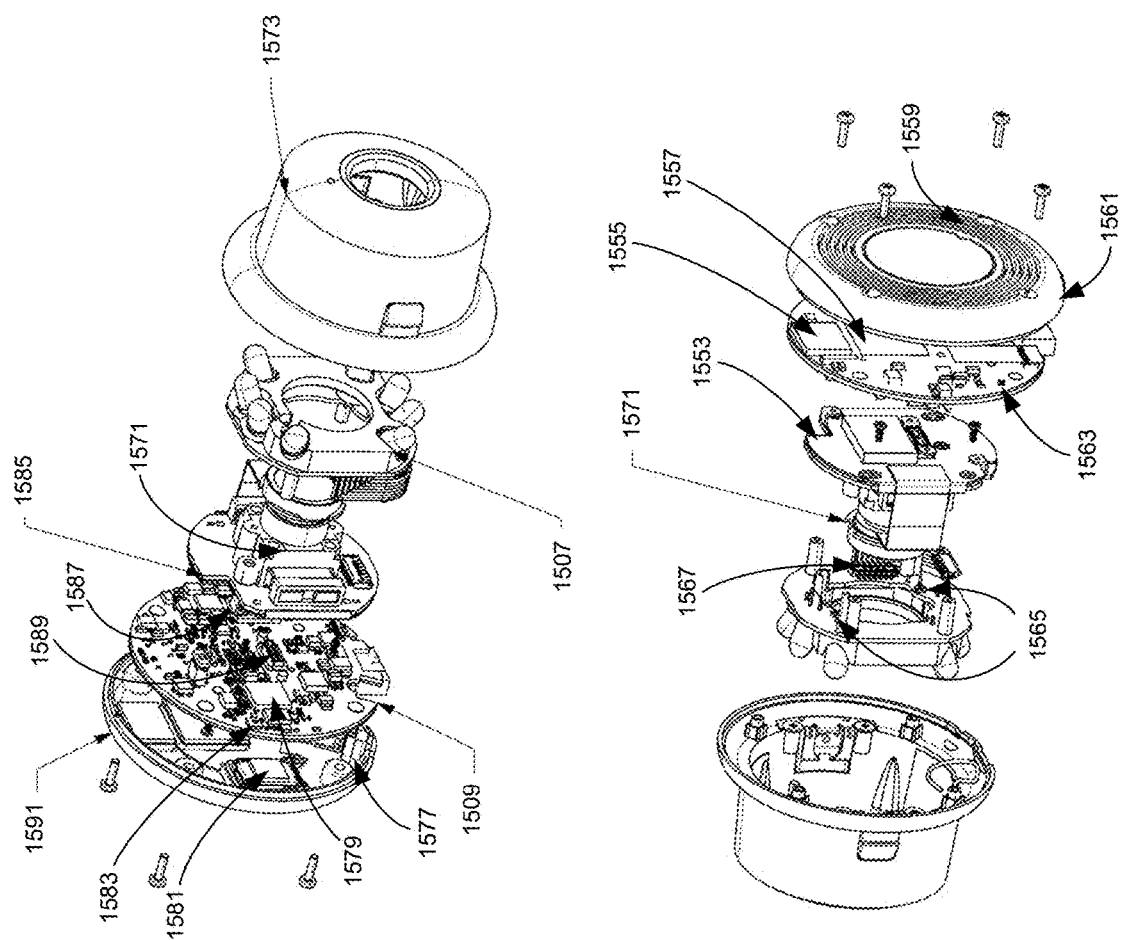
Figure 15H:
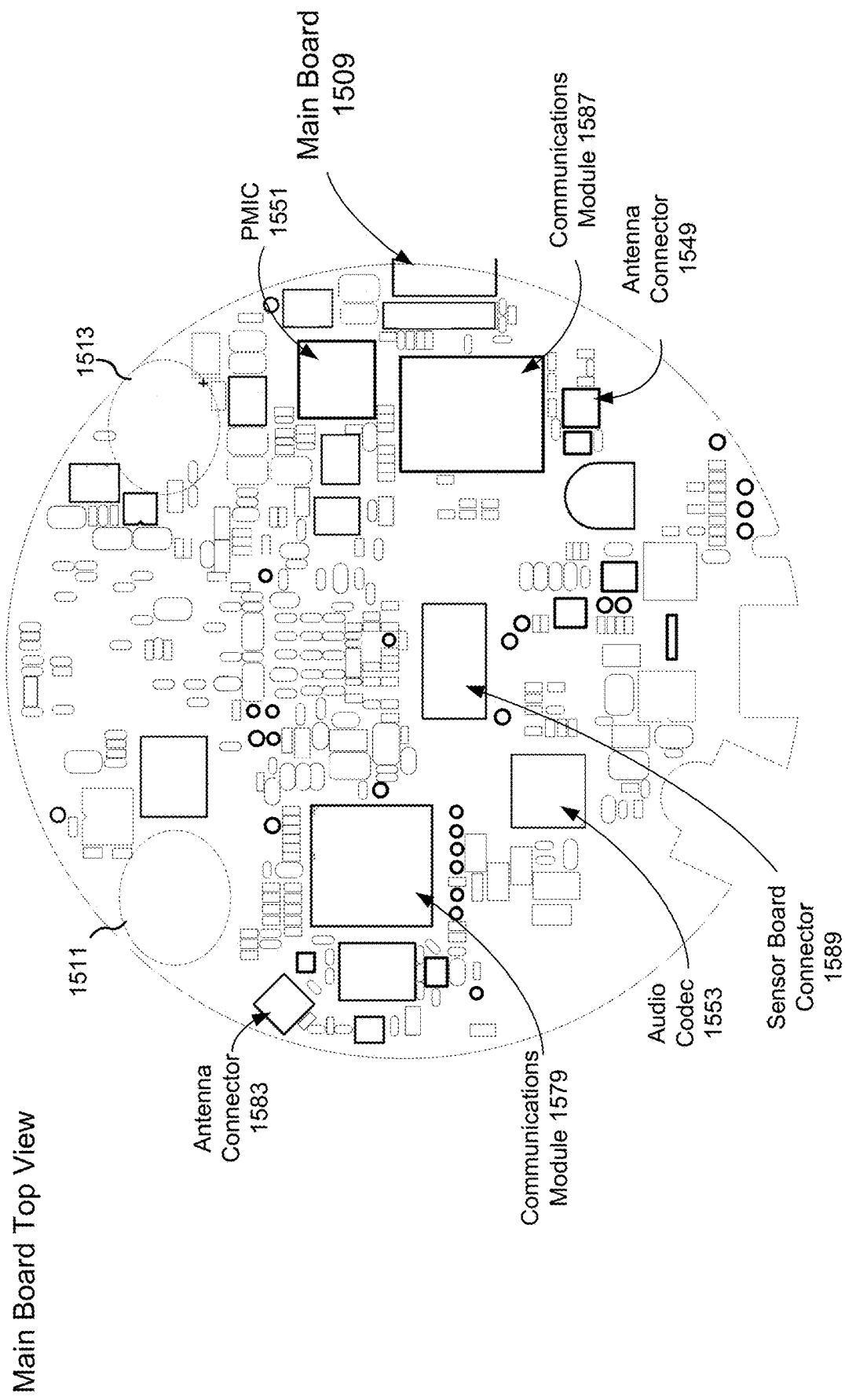
Figure 15I:
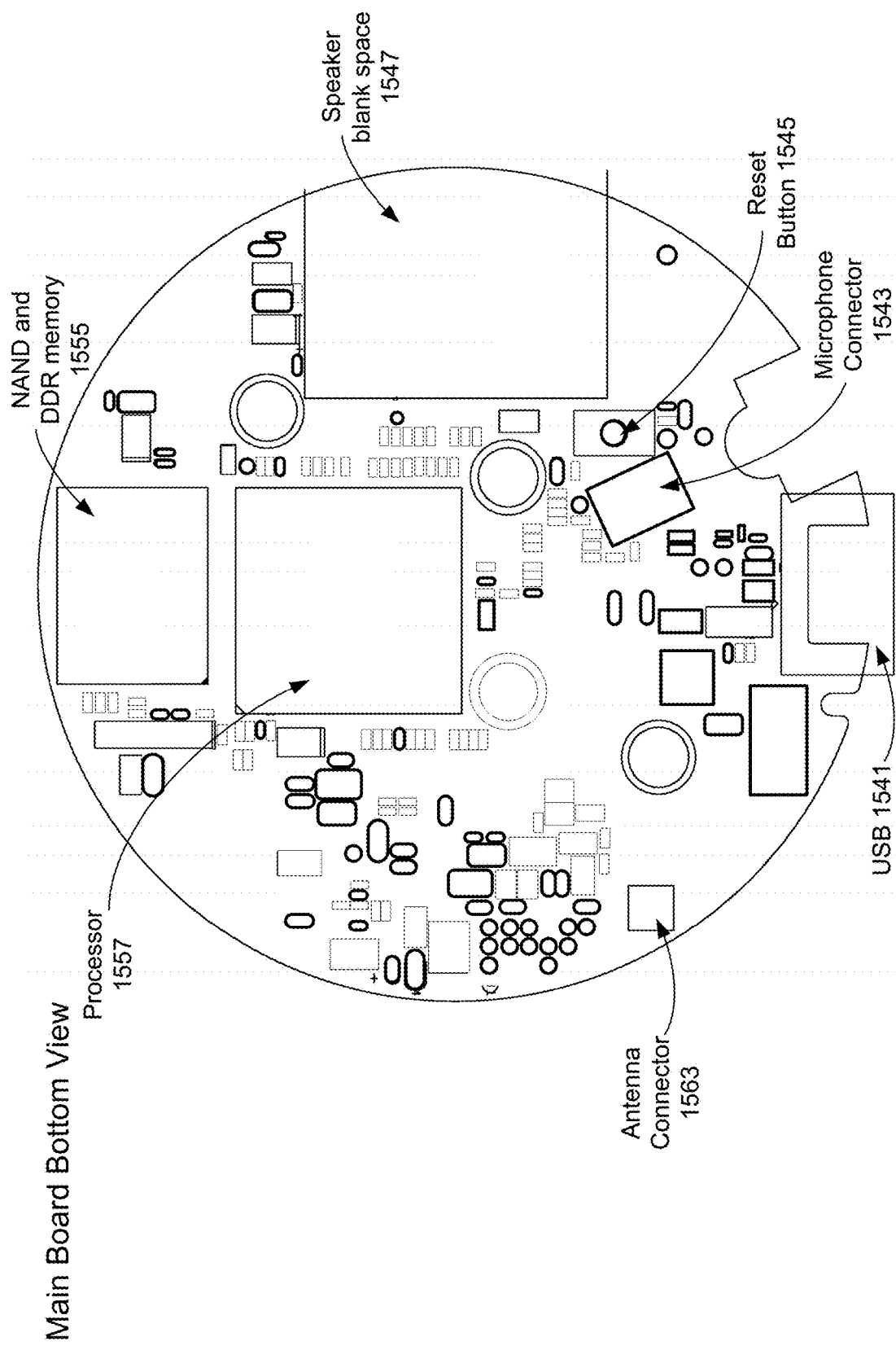
Figure 15J:
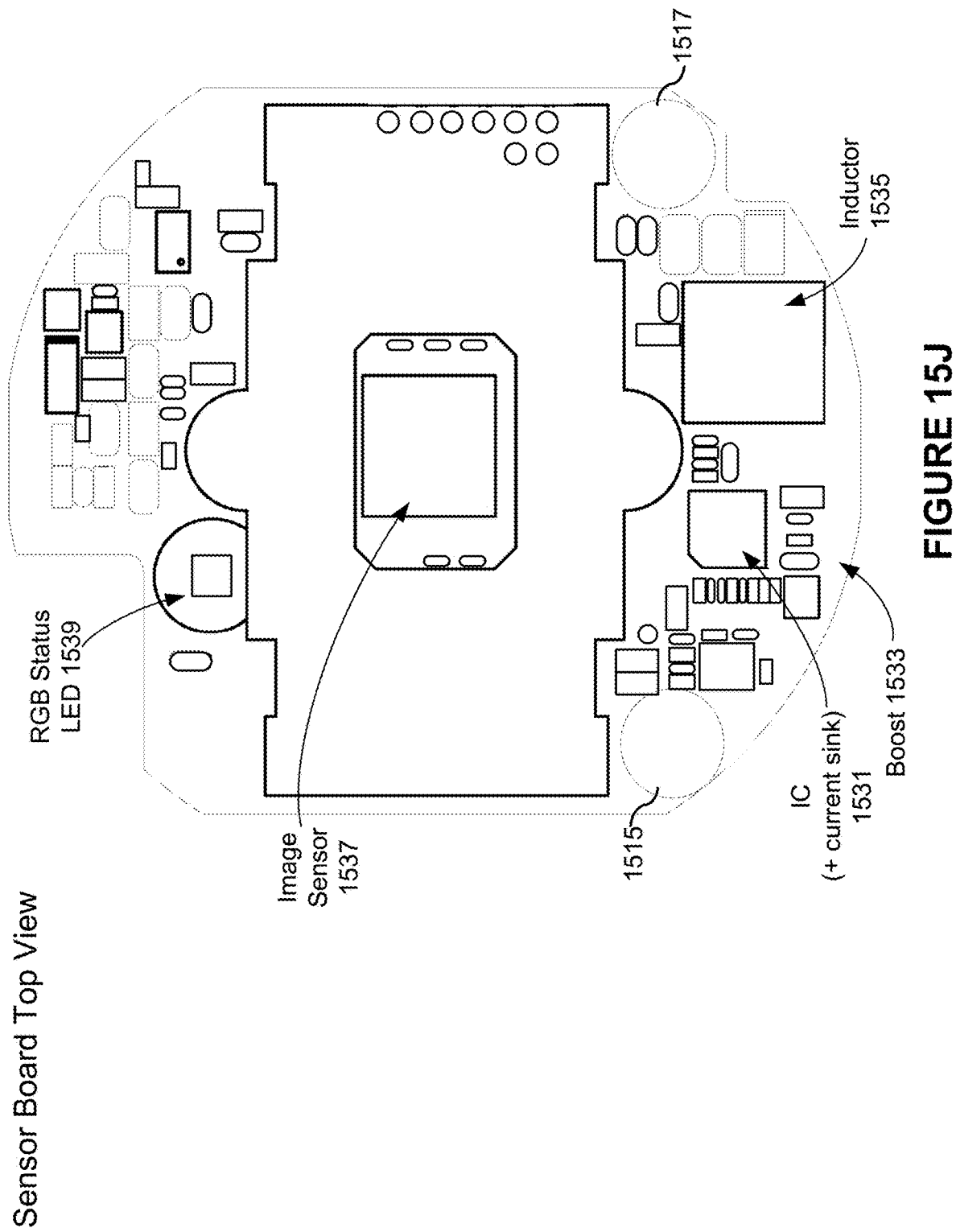
Figure 15K:
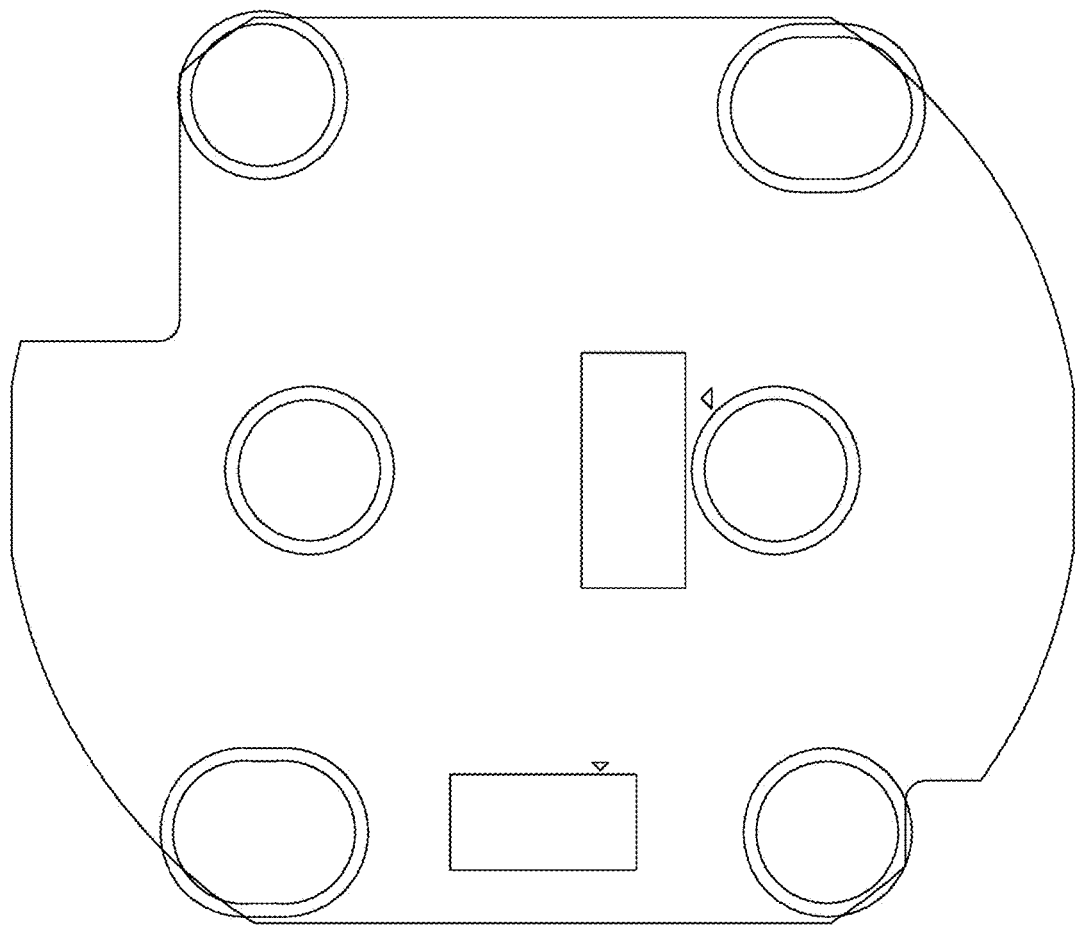
Figure 15L:
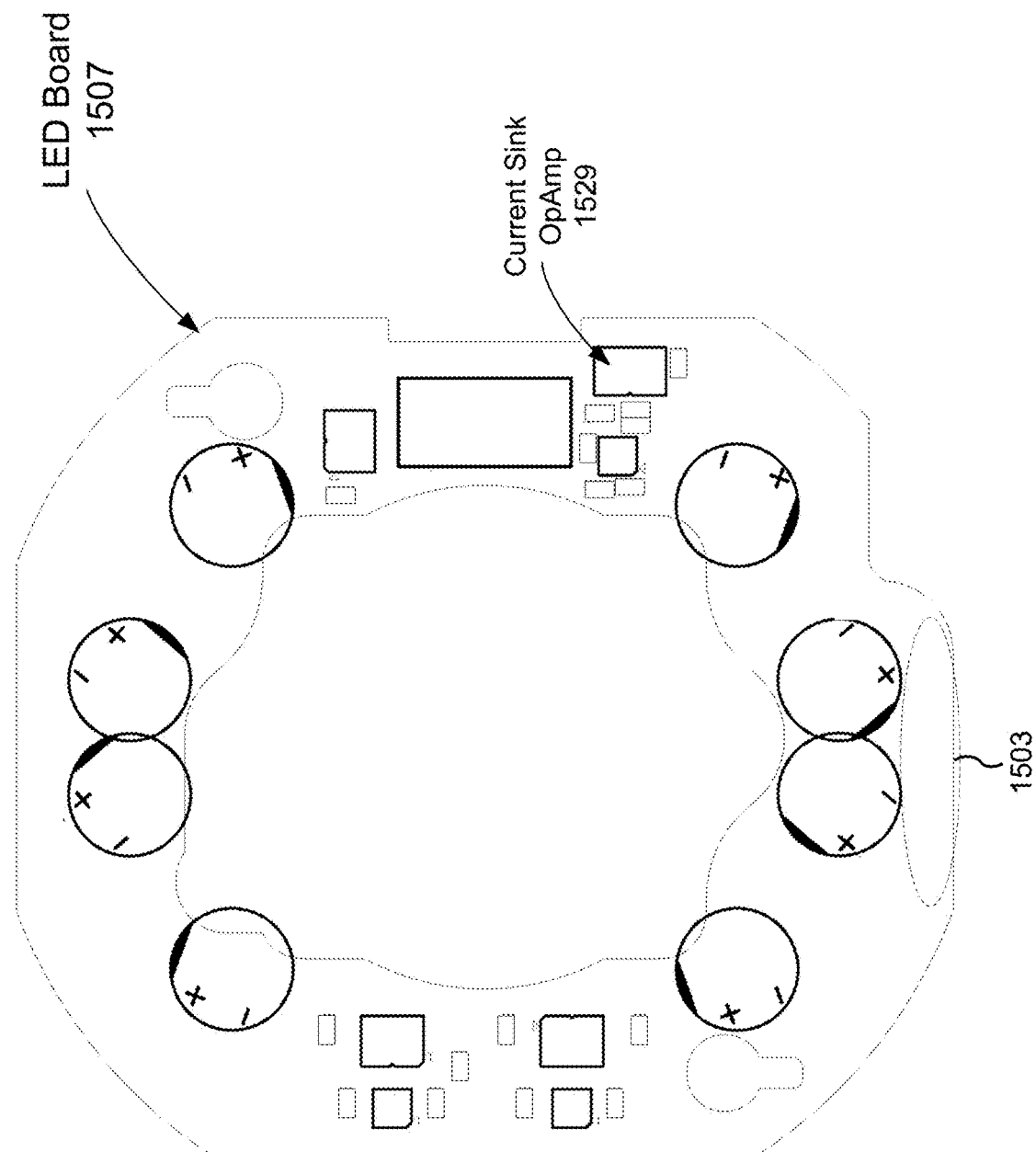
Figure 15M:
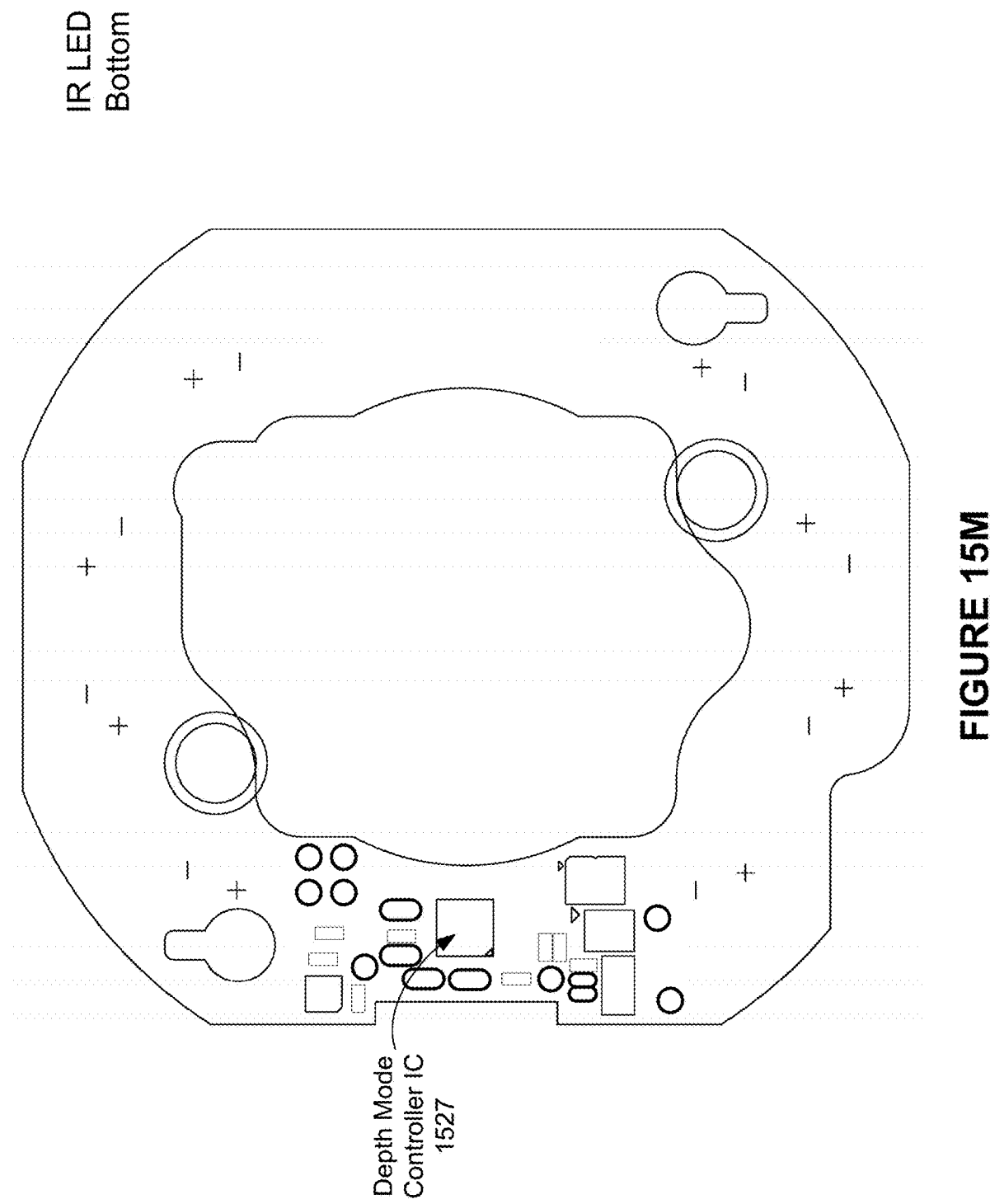

FIGS. 15G-15M illustrate additional views of the camera device 118. Particularly, FIG. 15G illustrates exploded views of the camera device 118. FIGS. 15H and 15I illustrate top and bottom views, respectively, of a main circuit board of the camera device 118. FIGS. 15J and 15K illustrate top and bottom views, respectively, of a sensor board of the camera device 118. FIGS. 15L and 15M illustrate top and bottom views, respectively, of an IR LED circuit board of the camera device 118.

In some implementations, the camera device 118 includes a front cover 1573, a rear cover 1591, a sensor assembly 1571, a sensor board 1585, an LED board 1507, a main board 1509, a speaker 1581, a microphone 1577, and attachment screws 1565. In some implementations, the main board 1509 includes a board-to-board connector 1589 for coupling the main board to the sensor board 1585, memory 1555 (e.g., NAND memory), and a processor 1557 (e.g., an Amberella A5S CPU) for image processing, motion detection, compression, and the like. In some implementations, the sensor board 1585 includes a heatsink 1553. In some implementations, an LED controller 1567 is coupled to (e.g., mounted on) the LED board 1507. In some implementations, the rear cover 1591 includes a plurality of ridges 1559 for lowering touch sense of heat. In some implementations, the rear cover 1591 comprises a metal cover.

In some implementations, a camera assembly includes an enclosed housing having a rear surface 1591, a front surface 1573, and a periphery (e.g., camera 118, FIGS. 15A-15M). In some implementations, the camera assembly further includes a lens module 1571 located within the housing and configured to receive light via the front surface (e.g., lens 1508, FIG. 15F). In some implementations, video data captured by the lens module is exchanged between the camera assembly and a server using a wireless local area network.

In some implementations, the camera assembly further includes communication circuitry located within the housing and configured to wireless communicate over a plurality of different communication protocols (e.g., main circuit board 1509 of the camera device 118 that includes multiple transceivers). In some implementations, the communication circuitry includes a first circuit 1579 configured for communication over the first communication protocol (e.g., Wi-Fi transceiver) and a second circuit 1587 configured for communication over the second communication protocol (e.g., 802.15.4 transceiver), where the first circuit and the second circuit are distinct. In some implementations, the communication circuitry is an integrated circuit configured for communication over both the first and second communication protocols (e.g., radio(s) 950, which includes a radio 950-1 for Bluetooth LE, and a radio 950-2 for Wi-Fi). In some implementations, the communication circuitry is configured to wirelessly communicate over at least three different communication protocols (e.g., Wi-Fi, 802.15.4, and Bluetooth LE). In some implementations, the second antenna is further configured for communication over a third one of the communication protocols. In some implementations, the communication circuitry is further configured to provide transmission access for communicating over the first communication protocol while denying transmission access for communicating over the second communication protocol, while detecting an activated priority control signal. In some implementations, the communication circuitry includes a first circuit configured for communication over the first communication protocol (e.g., RFID) and a second circuit configured for communication via radar. In some implementations, the communication circuitry is located at least in part on multiple circuit boards (e.g., main board 1509 and LED board 1507).

In some implementations, the camera assembly further includes a first antenna arranged at a first location on an inner surface of the periphery (e.g., antenna 1504-1), the first antenna configured for communication over a first one of the communication protocols (e.g., Wi-Fi), and a second antenna (e.g., antenna 1504-2) arranged at a second location on the inner surface of the periphery, the second location being different than the first location, the second antenna configured for communication over a second one of the communication protocols (e.g., 802.15.4). In some implementations, the first antenna is arranged at the first location on the inner surface of the periphery and/or the second antenna is arranged at the second location on the inner surface of the periphery by an adhesive material (e.g., FIG. 15E). In some implementations, the first antenna has a first orientation and the second antenna has a second orientation such that the impact from the presence and interference of each other antenna are suppressed (e.g., orienting antennas 1504-1 and 1504-2 and different angles with respect to each other and other components within the camera assembly). In some implementations, the first antenna and the second antenna are marked with a respective alignment mark that is configured to guide the assembly of the respective antenna onto the interior wall of the camera lid.

In some implementations, the first antenna and the second antenna are configured to operate at the same frequency (e.g., 2.4 GHz). In some implementations, the first antenna and the second antenna are configured to operate at distinct frequencies (e.g., 2.4 GHz and 5 GHz). In some implementations, the first antenna is configured to transmit and receive, over the first communication protocol, signals comprising one or more of alerts, control signals and status information to and from other smart home devices (e.g., emergency alerts from a hazard detector 104 using 802.15.4, or any signals transmitted/received by any of the smart devices 204). Furthermore, the second antenna is configured to transmit and receive, over the second communication protocol signals for configuring the smart home device (e.g., Bluetooth LE for provisioning and setting up the camera 118), and over the third communication protocol data corresponding to video captured by the smart home device (e.g., Wi-Fi for streaming video data). In some implementations, a third antenna is configured to transmit and receive radio signals for use in radar.

In some implementations, the first antenna or the second antenna is configured to transmit and receive wireless signals in a wireless local area network according to the IEEE 802.11 specifications. In some implementations, the first antenna or the second antenna is configured to transmit and receive wireless signals in a wireless personal area network according to the IEEE 802.15.4 standard. In some implementations, the first antenna or the second antenna is configured to transmit and receive wireless signals according to the Bluetooth Low Energy standard. In some implementations, the first antenna or the second antenna is configured to transmit and receive wireless signals for use in radar. In some implementations, the first antenna and the second antenna are electrically coupled to a duplex that controls their connections to a single wireless receiver circuit.

In some implementations, the camera assembly further includes a loop arm that is configured to hold the enclosed housing when the enclosed housing is inserted within a cutout opening in the loop arm. In some implementations, the loop arm is made from metal material, and the first location of the first antenna and the second location of the second antenna are such that the impact from the presence of the metal loop arm is suppressed (e.g., placed in a location that is farthest from the location at which the loop arm and the enclosed housing make contact).

In some implementations, the camera device 118 includes a radar system, such as one of the radar systems of FIGS. 14A-14C, located on the top of the main board 1509. For example, in some implementations, the radar system is located in a lower region of the top-side of the main board (e.g., below the sensor board connector). In some implementations, the radar system is located in an upper region of the top-side of the main board (e.g., in region 1511 or in region 1513). In some implementations, the radar system is located in several regions. For example, the control module (e.g., control module 1420) is located in a first region (e.g., region 1511) and the transmitters and/or receivers are located in a second region (e.g., region 1513).

In some implementations, the camera device 118 includes a radar system, such as one of the radar systems of FIGS. 14A-14C, located on the top of the sensor board. For example, in some implementations, the radar system is located in an upper region of the top-side of the sensor board (e.g., above the image sensor). As another example, the radar system is located at least in part in region 1515 and/or region 1517 on the top of the sensor board.

In some implementations, the camera device 118 includes a radar system, such as one of the radar systems of FIGS. 14A-14C, located on the top of the LED board 1507. For example, in some implementations, the radar system is located in a region on the left side of the top-side of the LED board (e.g., to the left of the LEDs).

In some implementations, the camera device 118 includes a radar system located on a circuit board (e.g., a flex circuit board) connected to the main board 1509, the LED board 1507, and/or the sensor board.

In some implementations, the radar system is positioned such that the control module (e.g., control module 1400) is located on a first component of the camera device 118 and the antennas (e.g., transmitter 1402 and/or receiver 1404) are located on a second component of the camera device 118. In some implementations, the radar system is positioned such that the control module (e.g., control module 1400) is located on a first circuit board (e.g., within the region 1511 on the main board 1509) and the antennas are located on a second circuit board (e.g., in region 1504 on LED board 1507). In some implementations, one or more of the antennas are located on a flex circuit board, or are mounted to the cover 1502 (e.g., within region 1501) of the camera device 118.

FIG. 15H shows a top view of the main board 1509 in accordance with some implementations. In some implementations, the main board 1509 includes the antenna connector 1583 (e.g., a Wi-Fi or radar antenna connector), the communications module 1579 (e.g., to be operated in conjunction with the antenna connector 1583), the sensor board connector 1589, a PMIC 1551, the communications module 1587 (e.g., a 15.4 or radar communications module), and an antenna connector 1549 (e.g., a 15.4 or radar antenna connector). In some implementations, the main board 1509 includes a radar module mounted in region 1511 or region 1513. In some implementations, the main board 1509 includes a radar antenna mounted in region 1511 or region 1513.

FIG. 15I shows a bottom view of the main board 1509 in accordance with some implementations. In some implementations, the main board 1509 includes the processor 1557, the memory 1555, a speaker space 1547, a reset button 1545, a microphone connector 1543, a USB connector 1541, and the antenna connector 1563 (e.g., a radar or 15.4 antenna connector).

FIG. 15J shows a top view of the sensor board 1585 in accordance with some implementations. In some implementations, the sensor board 1585 includes an RGB status LED 1539, an inductor 1535, a boost 1533, an integrated circuit (IC) 1531, and an image sensor 1537. In some implementations, the sensor board 1585 further includes a radar module mounted in region 1515 or region 1517. In some implementations, sensor board 1585 further includes a radar antenna mounted in region 1515 or region 1517.

FIG. 15L shows a top view of the LED board 1507 in accordance with some implementations. In some implementations, the LED board 1507 includes a current sink operational amplifier (OpAmp) 1529. In some implementations, the LED board 1507 further includes a radar module mounted in region 1503. In some implementations, sensor board 1585 further includes a radar antenna mounted in region 1503.

FIG. 15M shows a bottom view of the LED board 1507 in accordance with some implementations. In some implementations, the LED board 1507 includes a depth mode controller integrated circuit 1527.

Figure 16A:
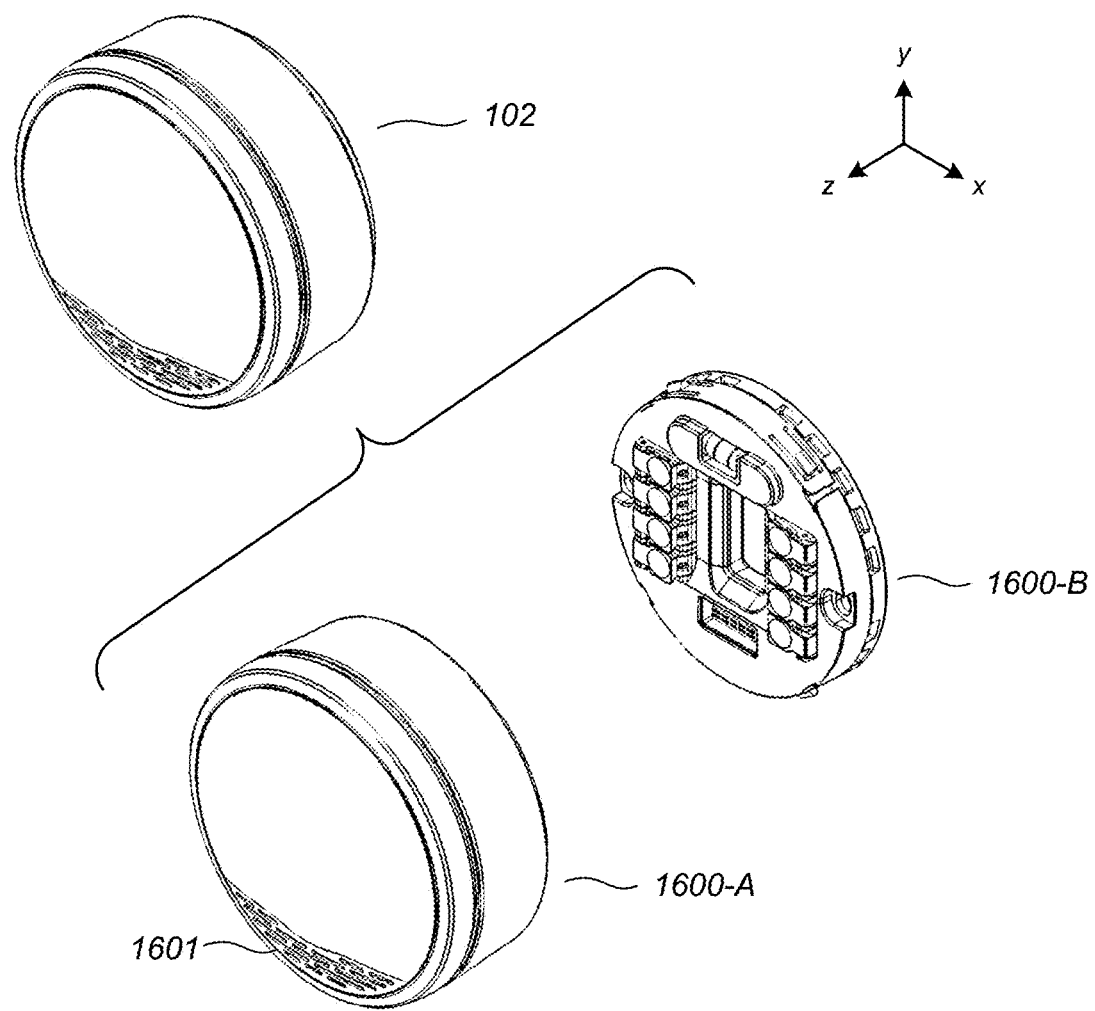
FIGS. 16A-16C illustrate various component views of a thermostat, in accordance with some implementations.
Figure 16B:
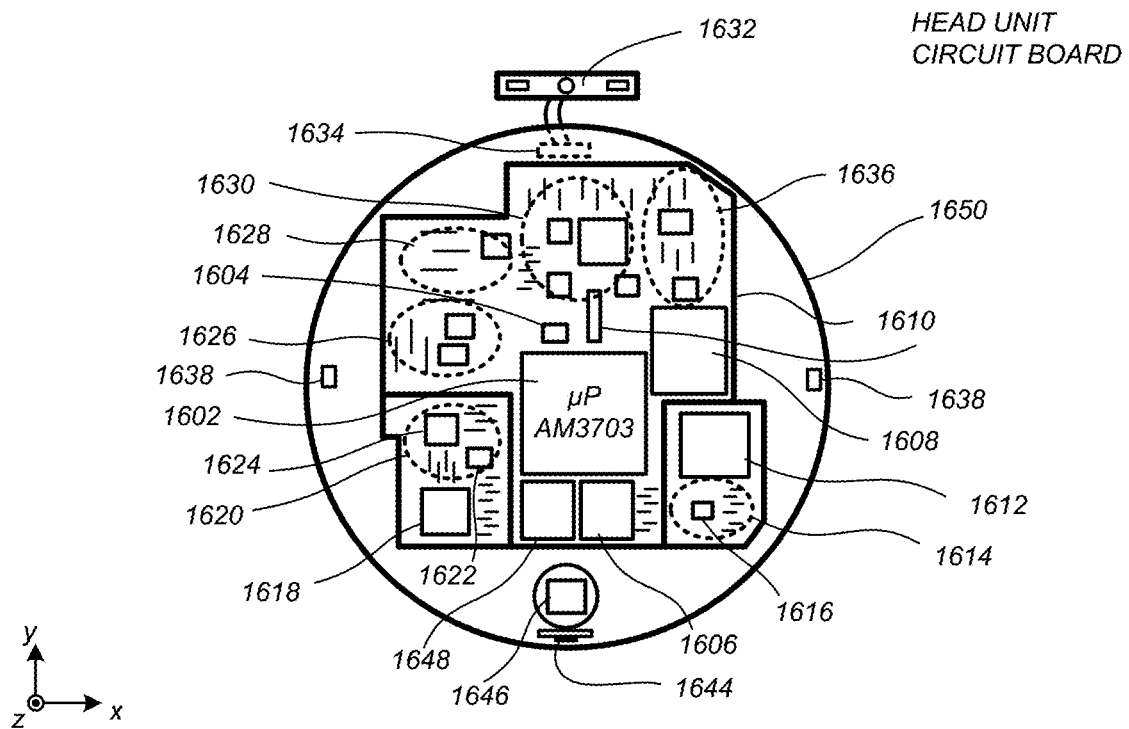
Figure 16C:
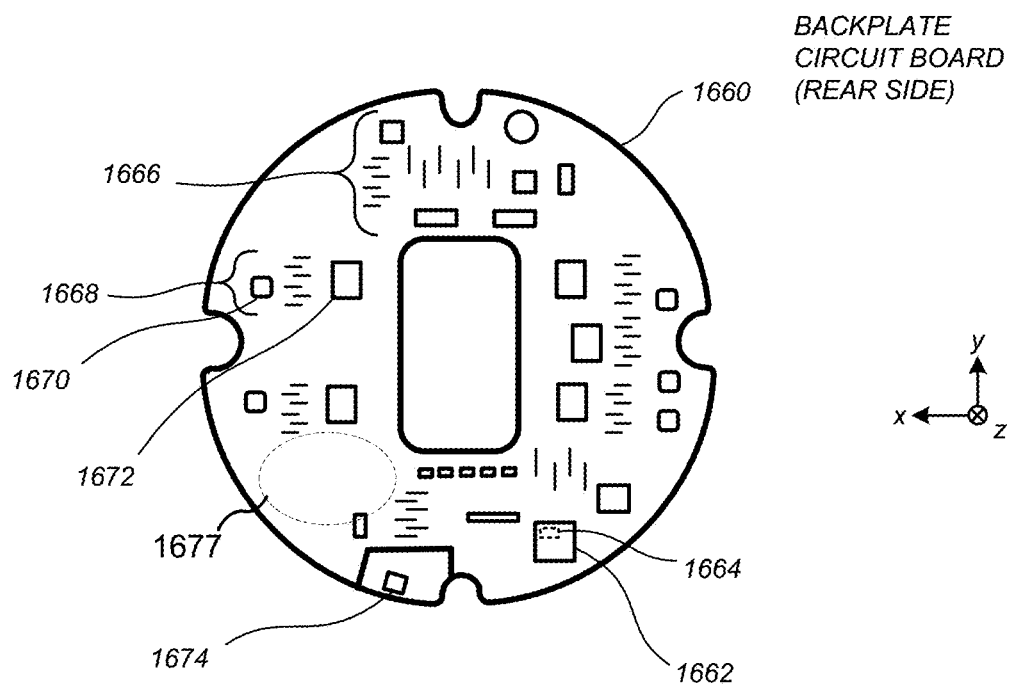

FIGS. 16A-16C illustrate various views of a smart thermostat (e.g., smart thermostat 102, FIG. 1) that is optionally used as part of a smart home environment 100, as previously described.

Specifically, FIG. 16A illustrates an exploded perspective view of the smart thermostat 102 with respect to two components, the head unit 1600-A, and the back plate 1600-B. The head unit 1600-A includes a head unit circuit board 1650 (described in further detail with respect to FIG. 16B), and the back plate 1600-B includes a backplate circuit board 1660 (described in further detail with respect to FIG. 16C). Further technical and/or functional descriptions of various ones of the electrical and mechanical components illustrated herein below can be found in one or more of the commonly assigned incorporated applications, such as U.S. Ser. No. 13/199,108. In the drawings shown, the "z" direction is outward from the wall, the "y" direction is the head-to-toe direction relative to a walk-up user, and the "x" direction is the user's left-to-right direction.

FIG. 16B illustrates a head-on view of the head unit circuit board 1650 for the smart thermostat, which comprises a head unit microprocessor 1602 (such as a Texas Instruments AM3703 chip) and an associated oscillator 1604, along with memory 1606 (e.g., DDR SDRAM), and storage 1608 (e.g., mass NAND storage). For wireless communications capability (e.g., Wi-Fi), there is provided (e.g., in a separate compartment of radio frequency (RF) shielding 1610) a wireless communications module 1612, such as a Murata Wireless Solutions LBWA19XSLZ module, which is based on the Texas Instruments WL1270 chipset supporting the 802.11 b/g/n WLAN standard. For the wireless communications module 1612 is supporting circuitry 1614 including an oscillator 1616. In accordance with some implementations, for ZigBee capability, there is provided (e.g., in a separately shielded RF compartment) a ZigBee module 1618, such as a C2530F256 module from Texas Instruments. For the ZigBee module 1618 there is provided supporting circuitry 1620 including an oscillator 1622 and a low-noise amplifier 1624. In accordance with some implementations, the smart thermostat also includes display backlight voltage conversion circuitry 1626, piezoelectric driving circuitry 1628, and/or power management circuitry 1630 (local power rails, etc.). In some implementations, provided on a circuit board 1632 (e.g., a flex circuit board) that attaches to the back of the head unit circuit board by a flex circuit connector 1634 is a proximity and ambient light sensor (PROX/ALS), such as a Silicon Labs SI1142 Proximity/Ambient Light Sensor with an I2C Interface. In some implementations, the smart thermostat includes one or more of: battery charging-supervision-disconnect circuitry 1636, and spring/RF antennas 1638. In some implementations, the smart thermostat also includes one or more of: a temperature sensor 1644 (rising perpendicular to the circuit board in the +z direction containing two separate temperature sensing elements at different distances from the circuit board), and a PIR motion sensor 1646. In some implementations, PIR motion sensor 1646 (and associated circuitry) is replaced by a radar system, such as one of the radar systems of FIGS. 14A-14C. In some implementations, smart thermostat includes a radar system in addition to PIR motion sensor 1646. In some implementations, the radar system is located at least in part on the head unit circuit board 1650. For example, in accordance with some implementations, the radar system is located in a bottom region of the top-side of the head unit circuit board 1650 (e.g., next to, or replacing, the PIR motion sensor 1646). In some implementations, the radar system is located at least in part on a flex circuit board coupled to the head unit circuit board 1650 (e.g., in addition to, or replacing, the PROX/ALS circuit).

In some implementations, even though the PROX/ALS and temperature sensors 1644 and PIR motion sensor 1646 are physically located on the head unit circuit board 1650, all these sensors are polled and controlled by the low-power backplate microcontroller on the backplate circuit board, to which they are electrically connected. In some implementations, the head unit circuit board includes a Bluetooth module 1648, and additional circuitry (not shown) which includes one or more oscillators, amplifiers, and/or any other support circuitry. In some implementations, the head unit circuit board includes one or more integrated circuits which include a combination of radios and transceivers. For example, in some implementations, the wireless communications module 1612 and the Bluetooth module 1648 comprise a single chip, wherein the wireless communications module 1612 and the Bluetooth module 1648 transmit and receive signals using a single antenna 1638. Various implementations of transceivers (e.g., radio(s) 940 and radio(s) 950) are described in greater detail with respect to FIG. 9A.

FIG. 16C illustrates a rear view of the backplate circuit board 1660, comprising a backplate processor/microcontroller 1662, such as a Texas Instruments MSP430F System-on-Chip Microcontroller that includes an on-board memory 1664. The backplate circuit board 1660 further comprises power supply circuitry 1666, which optionally includes power-stealing circuitry, and switch circuitry 1668 for switching between respective HVAC functions. In some implementations, for each HVAC function the switch circuitry 1668 includes an isolation transformer 1670 and a back-to-back NFET package 1672. The use of FETs in the switching circuitry allows for "active power stealing", i.e., taking power during the HVAC "ON" cycle, by briefly diverting power from the HVAC relay circuit to the reservoir capacitors for a very small interval, such as 100 microseconds. This time is small enough not to trip the HVAC relay into the "off" state but is sufficient to charge up the reservoir capacitors. The use of FETs allows for this fast switching time (100 micro-seconds), which would generally be difficult to achieve using relays (which stay on for tens of milliseconds). Also, such relays would generally readily degrade doing this kind of fast switching, and may also make audible noise. In contrast, in accordance with some implementations, the FETs operate with no, or essentially no, audible noise. In some implementations, the backplate circuit board 1660 also includes a combined temperature/humidity sensor module 1274, such as a Sensirion SHT21 module. In some implementations, the backplate microcontroller 1662 performs one or more of: polling of the various sensors, sensing for mechanical wire insertion at installation, alerting the head unit regarding current vs. setpoint temperature conditions and actuating the switches accordingly, and other functions such as looking for appropriate signal on the inserted wire at installation.

In accordance with the teachings of the commonly assigned U.S. Ser. No. 13/269,501, the commonly assigned U.S. Ser. No. 13/275,307, and others of the commonly assigned incorporated applications, the smart thermostat 102 (FIG. 1) represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described auto-away/auto-arrival algorithms) while at the same time not requiring a so-called "C-wire" from the HVAC system or line power from a household wall plug. In some instances, such advanced functionalities can require a greater instantaneous power draw than a "power-stealing" option (i.e., extracting smaller amounts of electrical power from one or more HVAC call relays) can safely provide. By way of example, in some circumstances, the head unit microprocessor 1602 draws on the order of 250 mW when awake and processing, and an LCD module (not shown) draws on the order of 250 mW when active. Moreover, the Wi-Fi module 1612 draws 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

In some implementations, the smart thermostat 102 resolves such issues at least by virtue of the use of a rechargeable battery (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat 1800 is provided with both (i) a relatively powerful and relatively power-intensive first processor (such as a Texas Instruments AM3703 microprocessor) that is capable of quickly performing more complex functions such as driving a visually pleasing user interface display and performing various mathematical learning computations, and (ii) a relatively less powerful and less power-intensive second processor (such as a Texas Instruments MSP430 microcontroller) for performing less intensive tasks, including driving and controlling the occupancy sensors. In some implementations, to conserve power, the first processor is maintained in a "sleep" state for extended periods of time and is "woken up" only for occasions in which its capabilities are needed, whereas the second processor is kept on more or less continuously (although preferably slowing down or disabling certain internal clocks for brief periodic intervals to conserve power) to perform its relatively low-power tasks. The first and second processors are mutually configured such that the second processor can "wake" the first processor on the occurrence of certain events, which can be termed "wake-on" facilities. In some implementations, these wake-on facilities can be turned on and turned off as part of different functional and/or power-saving goals to be achieved. For example, a "wake-on-PROX" facility can be provided by which the second processor, when detecting a user's hand approaching the thermostat dial by virtue of an active proximity sensor (PROX, such as provided by a Silicon Labs SI1142 Proximity/Ambient Light Sensor with I2C Interface), "wakes up" the first processor so that it can provide a visual display to the approaching user and be ready to respond more rapidly when their hand touches the dial. As another example, a "wake-on-PIR" facility can be provided by which the second processor will wake up the first processor when detecting motion somewhere in the general vicinity of the thermostat by virtue of a passive infrared (PIR) motion sensor, such as provided by a PerkinElmer DigiPyro PYD 1998 dual element pyrodetector. Notably, wake-on-PIR is not synonymous with auto-arrival, as there would need to be N consecutive buckets of sensed PIR activity to invoke auto-arrival, whereas only a single sufficient motion event can trigger a wake-on-PIR wake-up.

In some implementations, the smart thermostat 102 utilizes a radar system, such as one of the radar systems in FIGS. 14A-14C, to detect approaching users and/or hand touches, and wakes up the first processor based on the radar system detections.

In some implementations, the smart thermostat 102 includes a radar system, such as one of the radar systems of FIGS. 14A-14C, located on the top of the head unit 1600-A. For example, in some implementations, the radar system is located at least in part within region 1601 on the inside of the head unit cover. In some implementations, the radar system is located in an upper region of the cover of the head unit.

In some implementations, the smart thermostat 102 includes a radar system, such as one of the radar systems of FIGS. 14A-14C, located on the top of the head unit circuit board 1650. For example, in some implementations, the radar system is replaces the PIR sensor 1646 at the bottom of the head unit circuit board 1650. As another example, the radar system is located at least in part next to (e.g., to the left or right side of) the PIR sensor 1646.

In some implementations, the smart thermostat 102 includes a radar system located at least in part on a circuit board (e.g., a flex circuit board), such as flex circuit board 1632, connected to the head unit circuit board 1650 or the backplate circuit board 1660.

In some implementations, the radar system is positioned such that the control module (e.g., control module 1400) is located on a first component of the smart thermostat 102 and the antennas (e.g., transmitter 1402 and/or receiver 1404) are located on a second component of the smart thermostat 102. In some implementations, the radar system is positioned such that the control module (e.g., control module 1400) is located on a first circuit board (e.g., in region 1677 on the backplate circuit board 1660) and the antennas are located on a second circuit board (e.g., in place of PIR 1646 on the head unit circuit board 1650). In some implementations, one or more of the antennas are located on a flex circuit board (e.g., flex circuit board 1632), or are mounted to the cover (e.g., within region 1601) of the smart thermostat 102.

FIGS. 17A-17D illustrate various views of a smart hazard detector (e.g., smart hazard detector 104, FIG. 1) that may be used as part of a smart home environment 100, as previously described. In accordance with some implementations, these figures also show the plurality of holes or openings of cover plate 1728 forming a visually pleasing design that is viewable by occupant of a room within which the smart hazard detector 104 is mounted.

Figure 17A:
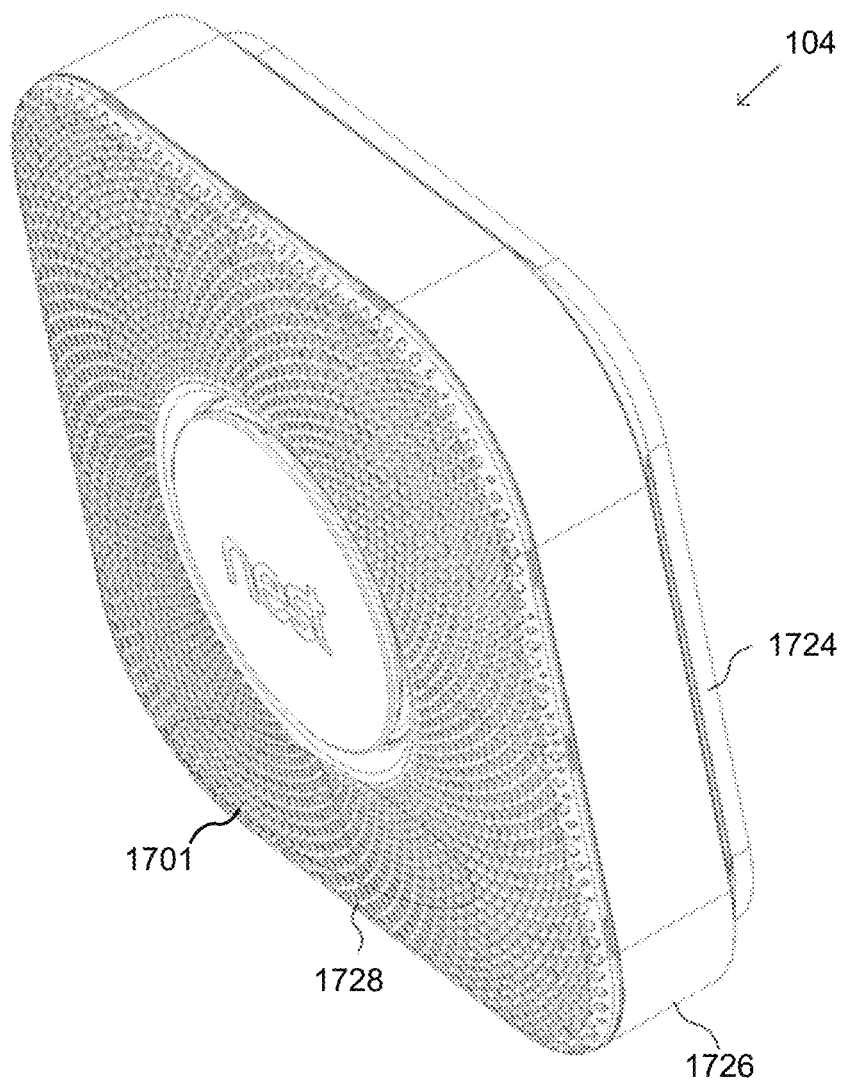
FIGS. 17A-17D illustrate various component views of a hazard detector, in accordance with some implementations.

Specifically, FIG. 17A illustrates an assembled view of the smart hazard detector 104. FIG. 17A shows the mounting plate 1724, front casing 1726, and cover plate 1728 in an assembled configuration with the various other components contained within an interior space of smart hazard detector 104. In accordance with some implementations, the lens button 1732 is shown attached to the smart hazard detector 104 so as to be centrally positioned with respect to cover plate 1728. As briefly described, light ring 1742 is optionally used to provide a halo appearance of light around and behind lens button 1732. The assembled smart hazard detector 104 provides a compact yet multifunctional device.

Figure 17B:
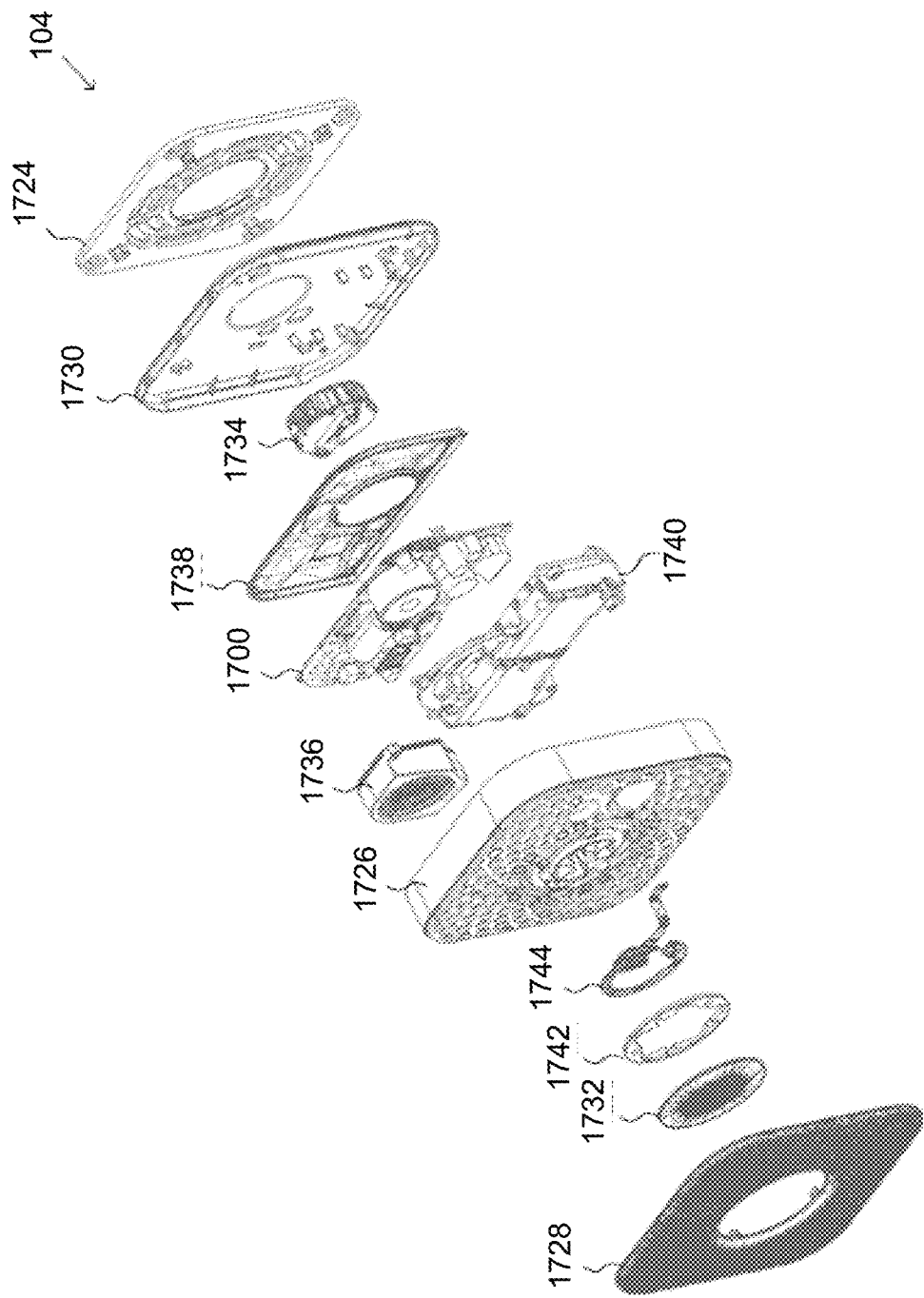

FIG. 17B illustrates an exploded perspective view of the smart hazard detector 104. As shown in FIG. 17B, the smart hazard detector 104 includes a mounting plate 1724 that attaches to a wall or ceiling of a structure to secure the smart hazard detector 104 thereto. Smart hazard detector 104 also includes a back plate 1730 that mounts to the mounting plate 1724 and a front casing 1726 that couples with or otherwise secures to the back plate 1730 to define a housing having an interior region within which components of the smart hazard detector 104 are contained. In some implementations, a circuit board 1700 is coupled with or attached to the back plate 1730. Various components are optionally mounted on the circuit board 1700. For example, in accordance with some implementations, a smoke chamber 1734 is coupled with or mounted on the circuit board 1700 and configured to detect the presence of smoke. In some implementations, the smoke chamber 1734 is mid-mounted relative to the circuit board 1700 so that air flows into the smoke chamber 1734 from a position above the circuit board 1700 and a position below the circuit board 1700. In some implementations, a speaker 1736 and/or an alarm device are mounted on the circuit board 1700 to audibly warn an occupant of a potential fire danger when the presence of smoke is detected via the smoke chamber 1734. Other components, such as a motion sensor, carbon monoxide sensor, microprocessor, and the like are optionally mounted on the circuit board 1700 as described herein. In some implementations, the smart hazard detector 104 includes a radar system or module, such as one of the radar systems of FIG. 14A-14C, for transmitting and receiving radar signals. In some implementations, smart hazard detector 104 includes a communication module for communicating with other smart devices and/or electronic tags (e.g., via RFID or Wi-Fi).

In some implementations, the smart hazard detector 104 includes a radar system mounted at least in part on the circuit board 1700. For example, one or more radar antennas are located on the circuit board 1700. In some implementations, the smart hazard detector 104 includes a radar system mounted at least in part on the front casing 1726. For example, one or more radar antennas are located on, or attached to, the front casing 1726. In some implementations, the smart hazard detector 104 includes a radar system mounted at least in part on the cover plate 1728. For example, one or more radar antennas are located on, or attached to, the cover plate 1728.

In some implementations, a protective plate 1738 is attached to or otherwise coupled with the circuit board 1700 to provide a visually pleasing appearance to the inner components of smart hazard detector 104 and/or to funnel or direct airflow to the smoke chamber 1734. For example, when a user views the internal components of the smart hazard detector 104, such as through vents in the back plate 1730, the protective plate 1738 provides the appearance of a relatively smooth surface and otherwise hides the components or circuitry of the circuit board 1700. The protective plate 1738 optionally functions to direct a flow of air from the vents of the back plate 1730 toward the smoke chamber 1734 so as to facilitate air flow into and out of the smoke chamber 1734.

In some implementations, the smart hazard detector 104 includes a battery pack 1740 that is configured to provide power to the various components of smart hazard detector 104. For example, provide power when smart hazard detector 104 is not coupled with an external power source, such as a 120 V power source of the home or structure. In some implementations, a cover plate 1728 is coupled with the front casing 1726 to provide a visually pleasing appearance to smart hazard detector 104 and/or for other functional purposes. In some implementations, the cover plate 1728 includes a plurality of holes or openings that allow one or more sensors coupled with circuit board 1700 to view or see through a surface of the cover plate 1728 so as to sense objects external to the smart hazard detector 104. In some implementations, the plurality of openings of cover plate 1728 are arranged to provide a visually pleasing appearance when viewed by occupants of the home or structure. In some implementations, the plurality of openings of cover plate 1728 is arranged according to a repeating pattern, such as a Fibonacci or other sequence.

In some implementations, a lens button 1732 is coupled with, or mounted to, the cover plate 1728. The lens button 1732 optionally allows one or more sensors to view through the lens button 1732 for various purposes. For example, in some implementations, a passive IR sensor (not shown) is positioned behind the lens button 1732 and configured to view through the lens button 1332 to detect the presence of an occupant or occupants within the home or structure. In some implementations, a radar system is positioned behind the lens button 1732 and configured to view through the lens button 1332 to detect the presence of an occupant or occupants within the home or structure. In some implementations, the lens button 1732 also functions as a button that is operable by a user to input various commands to smart hazard detector 104, such as to shut off an alarm that is triggered in response to a false or otherwise harmless condition. In some implementations, a light ring 1742 is positioned distally behind the lens button 1732 and is configured to receive light, such as from an LED, and disperse the light within ring 1742 to provide a desired visual appearance, such as a halo behind lens button 1732. In some implementations, positioned distally behind the light ring 1742 is a flexible circuit board 1744 that includes one or more electrical components, such as a passive IR sensor, LEDs, radar circuitry, and the like. Flexible circuit board 1744 (also sometimes referred to as a flex ring 1744) may be electrically coupled with circuit board 1700 to communicate and/or receive instructions from one or more microprocessors mounted on circuit board (not shown) during operation of smart hazard detector 104.

Figure 17C:
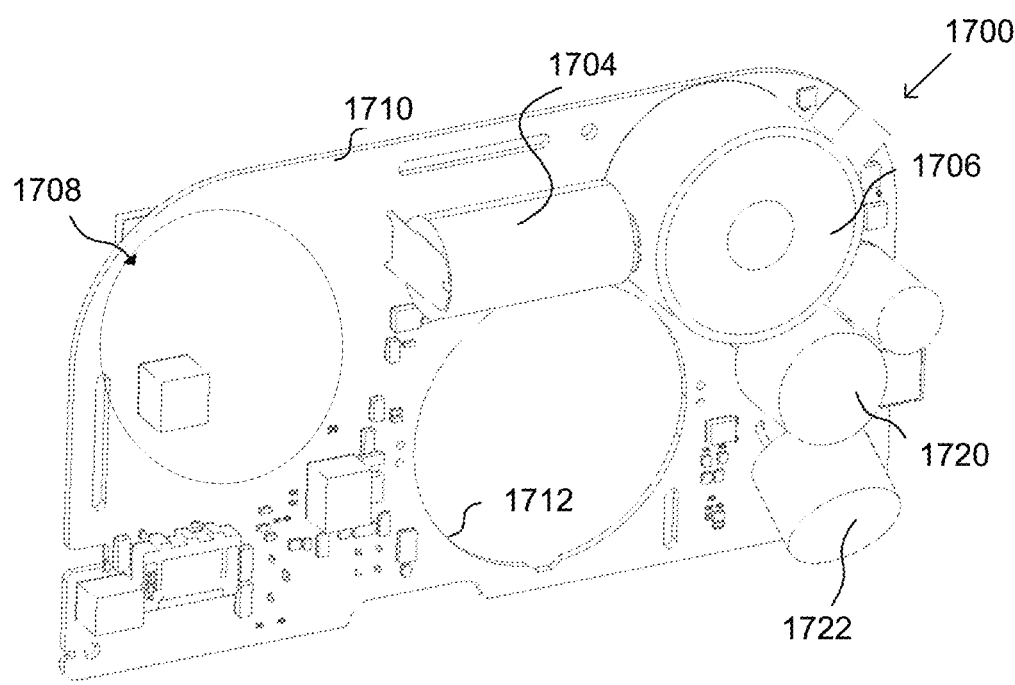
Figure 17D:
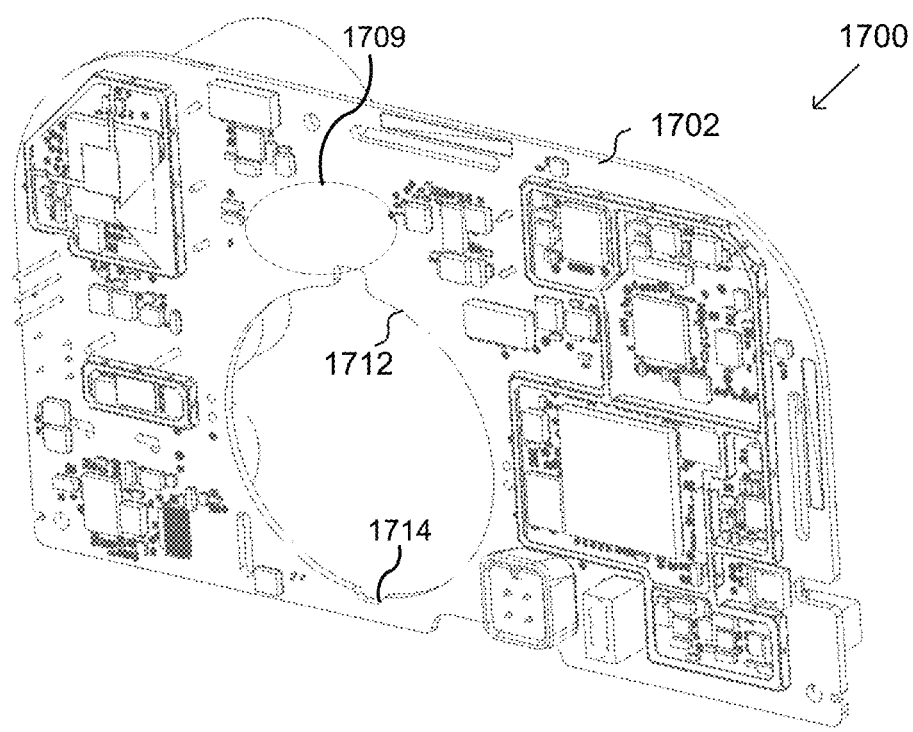

FIGS. 17C and 17D illustrate front and rear perspective views of a circuit board 1700 of a smart hazard detector (e.g., smart hazard detector 104, FIG. 1). The circuit board 1700 includes a main body 1702 having a front side or surface and a rear side or surface. As described herein, various electrical components are mounted on circuit board 1700. In some implementations, these components are mounted on the front surface of circuit board 1700, on the rear surface of circuit board 1700 opposite the front surface, or on both surfaces of the circuit board 1700. For example, in accordance with some implementations, one or more microprocessors and/or other processor related components are mounted on the rear surface of the circuit board 1700 facing a protective plate while one or more functional components (e.g. an alarm device, CO detector, speaker, motion sensors, Wi-Fi device, Zigbee device, Bluetooth device, RFID device, radar device, and the like) are mounted on a front surface of the circuit board 1700 facing a room of the home or structure in which the smart hazard detector 104 is positioned. In some implementations, other components are mid-mounted relative to the circuit board 1700 so that opposing surfaces are positioned on opposing sides of the circuit board 1700 as described herein. In some implementations, the circuit board 1700 includes one or more integrated circuits, each of which include a combination of radios and transceivers. For example, in some implementations, a Wi-Fi device and a Bluetooth device of the smart hazard detector 104 comprise a single chip, wherein the Wi-Fi device and the Bluetooth device transmit and receive signals using a single antenna. Various implementations of transceivers (e.g., radio(s) 940, radio(s) 950) are described in greater detail with respect to FIG. 9A.

As shown in FIG. 17C, in some implementations, the front surface of the circuit board 1700 includes a CO detector 1704 that is configured to detect presence of carbon monoxide gas and trigger an alarm device 1706 if the carbon monoxide gas levels are determined to be too high (e.g., exceed a predefined threshold). The alarm device 1706, optionally comprising a piezoelectric buzzer having an intentionally shrill or jarring sound, is optionally mounted on the front surface of the circuit board 1700 so as to face an occupant of the room in which the smart hazard detector 104 is positioned to alarm the occupant of a potential danger. In some implementations, the alarm device 1706 is configured to produce one or more sounds and/or signals to alert an occupant of the potential danger. In some implementations, the front surface of the circuit board 1700 includes an area 1708 in which a speaker (not shown) is positioned. In some implementations, the speaker is configured to provide audible warnings and/or messages to the occupant of the room. For example, the speaker is configured to alert the occupant of a potential danger and instruct the occupant to exit the room. In some implementations, the speaker provides specific instructions to the occupant, such as an exit route to use when exiting the room and/or the home or structure. In some implementations, other messages are communicated to the occupant, such as to alert the occupant that the batteries are low, that CO levels are relatively high in the room, that the smart hazard detector 104 needs periodic cleaning, and/or alert the occupant of any other abnormalities or issues related to the hazard detector 104 or components thereof.

In some implementations, the circuit board 1700 includes one or more motion sensors mounted on the front surface thereof. The motion sensors are optionally used to determine the presence of an individual within a room or surrounding area of the smart hazard detector 104. In some implementations, the circuit board 1700 includes a radar system, or components thereof, mounted on the front surface to determine the presence of an individual with the room or surrounding area. In some implementations, this information is used to change the functionality of the smart hazard detector 104 and/or one or more other devices connected in a common network as described previously. For example, in accordance with some implementations, this information is relayed to a smart thermostat to inform the thermostat that occupants of the home or structure are present so that the smart thermostat may condition the home or structure according to one or more learned or programmed settings. In some implementations, the smart hazard detector 104 uses this information for one or more purposes, such as to quiet the alarm device (e.g. in response to a hush gesture) as described herein or for various other reasons.

In some implementations, a first ultrasonic sensor 1720 and a second ultrasonic sensor 1722 are mounted on the front surface of circuit board 1700. The two ultrasonic sensors, 1720 and 1722, are optionally offset axially so as to point in slightly different directions. In this orientation, each ultrasonic sensor is optionally used to detect motion of an individual based on an orientation of the smart hazard detector 104 relative to the room and/or occupant. In some implementations, detecting the motion of the individual is used to quiet the alarm device as described herein or for any other reason. In some implementations, an axis of the first ultrasonic sensor 1720 is oriented substantially outward relative to the smart hazard detector 104 while an axis of the second ultrasonic sensor 1722 is oriented an angle relative to the axis of the first ultrasonic sensor 1720. In some implementations, the first ultrasonic sensor 1720 is configured to sense motion of an individual when the smart hazard detector 104 is mounted on a ceiling of the home or structure. Because the first ultrasonic sensor 1720 is oriented substantially outward relative to the smart hazard detector 104, the first ultrasonic sensor 1720 essentially looks straight down on individuals beneath the smart hazard detector 104. In some implementations, the second ultrasonic sensor 1722 is configured to sense motion of the individual when the smart hazard detector 104 is mounted on a wall of the home or structure. Because the second ultrasonic sensor 1722 is oriented at an angle relative to the first ultrasonic sensor 1720 and the smart hazard detector 104, the second ultrasonic sensor essentially looks downward toward the floor when the smart hazard detector 104 is mounted on a wall of the home or structure, rather than looking directly outward as the first ultrasonic sensor 1720. In some implementations, the angular offset of the two ultrasonic sensors is approximately 30°.

In some implementations, the two ultrasonic sensors, 1720 and 1722, are replaced by a single ultrasonic sensor that is configured to rotate within the smart hazard detector 104 so that the single ultrasonic sensor is capable of looking straight outward similar to the first ultrasonic sensor 1720 and capable of looking downward similar to the second ultrasonic sensor 1722. In some implementations, the single ultrasonic sensor is coupled to circuit board 1700 via a hinge that allows the ultrasonic sensor to rotate based on the orientation of the smart hazard detector 104. For example, when the smart hazard detector 104 is mounted to a ceiling of the home or structure, gravity orients the ultrasonic sensor so as to look straight downward; whereas when the smart hazard detector 104 is coupled to a wall of the home or structure, gravity causes the ultrasonic sensor to rotate via the hinge and look downward toward a floor and relative to the smart hazard detector 104. In some implementations, a motor is coupled with the single ultrasonic sensor so as to rotate the ultrasonic sensor based on the orientation of the smart hazard detector 104. In this manner, the ultrasonic sensor points in a direction that is likely to detect motion of an individual within the room or space surrounding the smart hazard detector 104, regardless of the smart hazard detector's orientation. In some implementations, the single ultrasonic sensor has a wide field of view that is able to accommodate both mounting positions of the smart hazard detector 104.

As shown in FIGS. 17C and 17D, the body 1710 of circuit board 1700 also includes a substantially centrally located aperture 1712 through which a smoke chamber is inserted so as to mid-mount the smoke chamber relative to the circuit board 1700. The aperture 1712 optionally includes a pair of notches 1714 through which wires are inserted to electrically couple the smoke chamber with the circuit board 1700. As previously described, mid-mounting of the smoke chamber through an aperture 1712 allows smoke and air to enter the smoke chamber from the front side of the circuit board 1700 and the rear side of the circuit board 1700.

Various aspects of the electrical components on the circuit board 1700 are now described, the positions thereon of many of which will be apparent to the skilled reader in view of the descriptions herein and FIGS. 17C and 17D. In some implementations, included on the circuit board 1700 are one or more of: a system processor, relatively high-power wireless communications circuitry and antenna, relatively low-power wireless communications circuitry and antenna, non-volatile memory, audio speaker, one or more interface sensors, a safety processor, safety sensors, alarm device 1706, a power source, and powering circuitry. The components are operative to provide failsafe safety detection features and user interface features using circuit topology and power budgeting methods that minimize power consumption. According to some implementations, a bifurcated or hybrid processor circuit topology is used for handling the various features of the smart hazard detector 104, where the safety processor is a relatively small, relatively lean processor that is dedicated to core safety sensor governance and core alarming functionality as would be provided on a conventional smoke/CO alarm, and where the system processor is a relatively larger, relatively higher-powered processor that is dedicated to more advanced features such as cloud communications, user interface features, occupancy and other advanced environmental tracking features, and more generally any other task that would not be considered a "core" or "conventional" safety sensing and alarming task.

By way of example, the safety processor is optionally a Freescale KL15 microcontroller, while the system processor is optionally a Freescale K60 microcontroller. Preferably, the safety processor is programmed and configured such that it is capable of operating and performing its core safety-related duties regardless of the status or state of the system processor. Thus, for example, even if the system processor is not available or is otherwise incapable of performing any functions, the safety processor continues to perform its core safety-related tasks such that the smart hazard detector 104 meets all industry and/or government safety standards that are required for the smoke, CO, and/or other safety-related monitoring for which the smart hazard detector 104 is offered (provided that there is sufficient electrical power available for the safety processor to operate). The system processor, on the other hand, performs "optional" and/or "advanced" functions that are overlaid onto the functionality of the safety processor, where "optional" or "advanced" refers to tasks that are not specifically required for compliance with industry and/or governmental safety standards. Thus, although the system processor is designed to interoperate with the safety processor in a manner that can improve the overall performance, feature set, and/or functionality of the smart hazard detector 104, its operation is not required in order for the smart hazard detector 104 to meet core safety-related industry and/or government safety standards. Being generally a larger and more capable processor than the safety processor, the system processor will generally consumes more power than the safety processor when both are active.

Similarly, when both processors are inactive, the system processor will generally still consume more power than the safety processor. In some implementations, The system processor is operative to govern user interface features and monitor interface sensors (such as occupancy sensors, audio sensors, cameras, etc., which are not directly related to core safety sensing). For example, in accordance with some implementations, the system processor directs wireless data traffic on both high and low power wireless communications circuitry, accesses non-volatile memory, communicates with the safety processor, and causes audio to be emitted from the speaker. As another example, in accordance with some implementations, the system processor monitors interface sensors to determine whether any actions need to be taken (e.g., shut off a blaring alarm in response to a user detected action to hush the alarm). In some implementations, the safety processor is operative to handle core safety related tasks of the smart hazard detector 104. In some implementations, the safety processor polls safety sensors (e.g., smoke, CO) and activates alarm device 1706 when one or more of the safety sensors indicate a hazard event is detected. In some implementations, the safety processor operates independently of the system processor and activates the alarm device 1706 regardless of the state of the system processor. For example, if the system processor is performing an active function (e.g., performing a Wi-Fi update) or is shut down due to power constraints, the safety processor still activates the alarm device 1706 when a hazard event is detected.

In some implementations, the software running on the safety processor is permanently fixed and is prohibited from being updated via a software or firmware update after the smart hazard detector 104 leaves the factory. Compared to the system processor, the safety processor is generally a lower power consuming processor.

In some implementations, the relatively high power wireless communications circuitry includes, for example, a Wi-Fi module capable of communicating according to any of the 802.11 protocols. By way of example, the relatively high power wireless communications circuitry is optionally implemented using a Broadcom BCM43362 Wi-Fi module. In some implementations, the relatively low power wireless communications circuitry comprises a low power Wireless Personal Area Network (6LoWPAN) module or a ZigBee module capable of communicating according to an IEEE 802.15.4 protocol. For example, in some implementations, the relatively low power wireless communications circuitry is implemented using an Ember EM357 6LoWPAN module. In some implementations, the non-volatile memory is any suitable permanent memory storage, such as NAND Flash, a hard disk drive, NOR, ROM, or phase change memory. In some implementations, the non-volatile memory stores audio clips that are played-back using the speaker 1736. The audio clips optionally include installation instructions and/or warnings in one or more languages. In some implementations, the interface sensors include sensors that are monitored by system processor, while the safety sensors include sensors that are monitored by the safety processor. Sensors are optionally mounted to a printed circuit board, a flexible printed circuit board, a housing of a system, or a combination thereof.

In some implementations, the interface sensors include one or more of: an ambient light sensor (ALS) (such as can be implemented using a discrete photodiode), a passive infrared (PIR) motion sensor (such as can be implemented using an Excelitas PYQ1348 module), a radar system (such as a radar system of FIGS. 14A-14C), and one or more ultrasonic sensors (such as can be implemented using one or more Manorshi MS-P1640H12TR modules). In some implementations, the safety sensors include one or more of: the smoke detection chamber 1734 (including, for example, an Excelitas IR module), the CO detection module 1704 (including, for example, a Figaro TGS5342 sensor), and a temperature and humidity sensor (including, for example, a Sensirion SHT20 module). The power source supplies power to enable operation of the smart hazard detector and optionally includes any suitable source of energy. Implementations discussed herein include AC line powered, battery powered, a combination of AC line powered with a battery backup, and/or externally supplied DC power (e.g., USB supplied power). Implementations that use AC line power, AC line power with battery backup, or externally supplied DC power are optionally subject to different power conservation constraints than battery-only implementations.

Preferably, battery-only powered implementations are configured to manage consumption of its finite energy supply such that smart hazard detector 104 operates for a minimum period of time, such as at least seven, eight, nine, or ten years. Line powered implementations are not as constrained. Line powered with battery backup implementations optionally employ power conservation methods to prolong the life of the backup battery. In battery-only implementations, the power source optionally includes one or more batteries. The batteries are optionally constructed from different compositions (e.g., alkaline or lithium iron disulfide) and different end-user configurations (e.g., permanent, user replaceable, or non-user replaceable) are optionally used. In some implementations, six cells of Li—FeS$_2$ are arranged in two stacks of three. Such an arrangement can yield about 27000 mWh of total available power for the smart hazard detector 104.

In some implementations, the smart hazard detector 104 utilizes a radar system, such as one of the radar systems in FIGS. 14A-14C, to detect approaching users and/or hand touches.

In some implementations, the smart hazard detector 104 includes a radar system, such as one of the radar systems of FIGS. 14A-14C, mounted on the cover plate 1728. For example, in some implementations, the radar system is located at least in part within region 1701 on the inside of the cover plate 1728. In some implementations, the radar system is located in an upper region of the cover plate 1728.

In some implementations, the smart hazard detector 104 includes a radar system mounted on the front casing 1726. For example, in some implementations, the radar system is located in an upper region of the front casing 1726.

In some implementations, the smart hazard detector 104 includes a radar system located on the top of the circuit board 1700. For example, in some implementations, the radar system is located at least in part in region 1708 on the top of the circuit board 1700. In some implementations, the smart hazard detector 104 includes a radar system located on the bottom of the circuit board 1700. For example, in some implementations, the radar system is located at least in part in area 1709 on the bottom of the circuit board 1700.

In some implementations, the smart hazard detector 104 includes a radar system located at least in part on a circuit board (e.g., a flex circuit board) connected to the circuit board 1700.

In some implementations, the radar system is positioned such that the control module (e.g., control module 1400) is located on a first component of the smart hazard detector 104 and the antennas (e.g., transmitter 1402 and/or receiver 1404) are located on a second component of the smart hazard detector 104. In some implementations, the radar system is positioned such that the control module (e.g., control module 1400) is located in a first region on the circuit board 1700 (e.g., in region 1709) and the antennas are located in a second region (e.g., in region 1708). In some implementations, one or more of the antennas are located on a flex circuit board, or are mounted to the cover (e.g., within region 1701) of the smart hazard detector 104.

In some implementations, a radar system (e.g., as described in FIGS. 14A-14E) is utilized in a smart pool or hot tub to determine whether the pool or hot tub is occupied. In some implementations, the occupancy determination is utilized by the smart pool or hot tub to adjust operation of the smart pool or hot tub. In some implementations, the occupancy determination is utilized by the smart pool or hot tub to adjust a water temperature. In some implementations, the occupancy determination is utilized to generate an alert (e.g., if a child is detected in the pool). In some implementations, the occupancy determination is utilized by the smart pool or hot tub to adjust a lighting level.

In some implementations, a radar system (e.g., as described in FIGS. 14A-14E) is utilized in a smart light to determine whether person(s) are nearby. In some implementations, the presence determination is utilized by the smart light to adjust operation of the smart light. In some implementations, the presence determination is utilized by the smart light to adjust a luminosity of the light. In some implementations, the presence determination is utilized by the smart light to enable or disable the light (e.g., turn on the light if a person is detected).

In some implementations, a radar system (e.g., as described in FIGS. 14A-14E) is utilized in a smart irrigation system to determine whether person(s) are nearby. In some implementations, the presence determination is utilized by the smart irrigation system to adjust operation of the irrigation system (e.g., to temporarily cease irrigation or to temporarily redirect irrigation).

In some implementations, a radar system (e.g., as described in FIGS. 14A-14E) is utilized in a smart camera to detect and/or track objects. In some implementations, the detection and tracking is aggregated with visual data from the image sensor to enhance object detection and tracking. In some implementations, the detection and tracking is utilized to detect anomalies and direct focus of the image sensor to the detected anomalies. In some implementations, the detection and tracking is utilized in conditions where image detection and/or tracking is limited, such as low light conditions or obstruction of the detected object from the image sensor (e.g., due to smoke or other objects).

In some implementations, a radar system (e.g., as described in FIGS. 14A-14E) is utilized in a smart thermostat to determine whether person(s) are nearby and/or recognize particular individuals. In some implementations, the presence determination is utilized by the smart thermostat to adjust operation of an HVAC system (e.g., to raise or lower a target temperature). In some implementations, the recognition of particular individuals is utilized to personalize HVAC settings.

In some implementations, a radar system (e.g., as described in FIGS. 14A-14E) is utilized in a smart hazard detector to determine whether person(s) are nearby and/or recognize particular individuals. In some implementations, the presence determination is utilized by the smart hazard detector to generate an alert. For example, the presence detection is used to notify emergency responders that someone (e.g., a recognized individual) is present in a burning building.

In some implementations, a radar system (e.g., as described in FIGS. 14A-14E) is utilized in a smart entry device (e.g., a smart doorbell or smart door lock) to determine whether person(s) are nearby and/or recognize particular individuals. In some implementations, the presence determination is utilized by the smart entry device to generate an alert. For example, the presence detection is used to notify a home owner that a person was detected in the entryway. In some implementations, the recognition of particular individuals is utilized to lock and/or unlock a door, gate, or window. In some implementations, the recognition of particular individuals is utilized to set a smart home configuration (e.g., to a personalized configuration for the identified individual). In some implementations, the recognition of particular individuals is utilized to verify an individual's identity (e.g., in conjunction with data from other sensors and/or other information received from the individual, such as a passcode).

In some implementations, a radar system (e.g., as described in FIGS. 14A-14E) is utilized in a smart radar imaging device to classify detected objects. In some implementations, the classification, location, and/or movement information from the radar system is utilized by the smart radar imaging device to identify and display to a user (e.g., on a display screen coupled to the smart radar capture device) what types of objects are detected and where. For example, a smart radar imaging device is directed outside a home (e.g., at the front yard) and displays to a user a picture with the location (and type) of detected objects, such as cars, pedestrians, pets, and the like.

Figure 18:
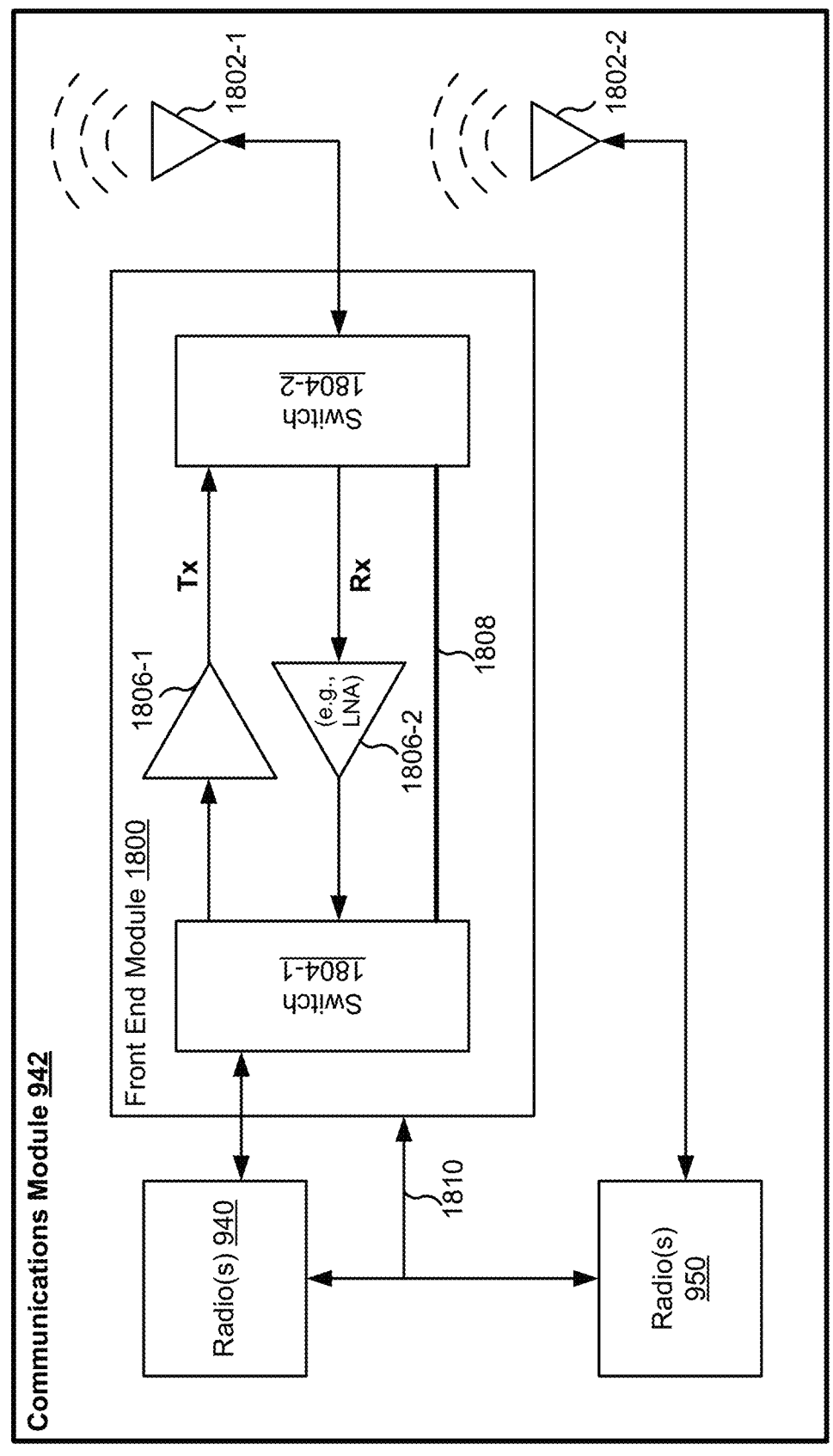
FIG. 18 illustrates a block diagram of a communications module of a smart device utilizing a bypass coexistence technique, in accordance with some implementations.

FIG. 18 illustrates a block diagram of a communications module 942 of a smart device utilizing bypass circuitry, in accordance with some implementations. FIG. 18 illustrates a communications module 942 of a smart device 204 (e.g., FIG. 9A), in accordance with any of the implementations disclosed in FIGS. 1-9 (e.g., devices 102, 104, 106, 108, 110, 112, 114, 116, 118, 120, and/or 122, FIG. 1, such as a camera 118, a smart hazard detector 104, a smart thermostat 102, etc.).

In some implementations, the communications module 942 includes one or more radio(s) 940, one or more radio(s) 950, a front end module 1800, and antennas 1802. In some implementations, the one or more radio(s) 940 and radio(s) 950 are communicably connected, and each have respective antennas 1802 through which respective signals are transmitted and received. As an example, the communications module 942 of a camera 118 includes a first transceiver for transmitting video data (e.g., Wi-Fi, radio(s) 950), and additionally includes a second transceiver for transmitting and receiving packets from other smart devices in a smart home environment (e.g., Zigbee, radio(s) 940). Optionally, a combined transceiver is configured for transmitting and receiving data in accordance with more than one communications protocol (e.g., radio 950 configure for Wi-Fi and Bluetooth LE). In some implementations, radio(s) 950 are utilized for radar communications and radio(s) 940 are utilized for wireless communications such as Wi-Fi or Bluetooth. Components of the communications module 942 (e.g., radio(s) 940, radio(s) 950) are described in greater detail with regards to FIG. 9A.

The front end module 1800 of the communications module 942 includes a variety of circuit elements for manipulating (e.g., amplifying) signals received and transmitted by the radio(s) 940. In particular, the front end module 1800 includes switches 1804 for coupling the radio(s) 940 and the antenna 1802 by selectively using an amplifier (e.g., amplifier 1806-1 and a low noise amplifier 1806-2) or bypass line 1808. Whether the front end module 1800 couples the radio(s) 940 and the antenna 1802 by the low noise amplifier 1806-2 or the bypass line 1808 depends on whether the radio 950 is active and transmitting signals using the second antenna 1802-2. Although not illustrated, other implementations of the front end module 1800 may include additional circuit elements, including one or more additional switches, amplifiers, transistors, and/or any combination of active or passive elements. A combination of circuit elements may be used in the front end module 1400, for example, to modify the sensitivity of the communications module 942 and signals transmitted and/or received through the radio(s) 940.

As described previously, poor signal isolation typically results from the close physical placement of antennas 1802. In particular, device components risk damage in the event that the signal power of transmitting antennas in a transmission chain nearby (e.g., antenna 1802-2 for Wi-Fi transmissions) exceeds the maximum input power of components in the receiving chain (e.g., 802.15.4 receiving chain formed by radio(s) 940 and antenna 1802-1).

Some methods for enabling and enhancing coexistence of transceiver devices (e.g., radio(s) 940, radio(s) 950) include the use of a bypass line 1808 in a front end module 1800. In particular, by using the switches 1804 to automatically and selectively enable the bypass line 1808 when the radio 950 (e.g., Wi-Fi) is "on" and transmitting signals through the antenna 1802-2 (e.g., radio(s) 950 signals to the front end module 1400 through connection 1810 that it is "on" and transmitting), transmissions received through the antenna 1802-1 do not pass through the low noise amplifier 1806-2, and instead pass through the bypass line 1808 to the radio(s) 940. Consequently, the effective maximum input power that can be tolerated by the front end module 1800 may be increased (e.g., the front end module 1800 has a larger input power threshold when the bypass line 1808 is used to couple the radio 940 and the antenna 1802-1), as determined by characteristics of the bypass line 1808, rather than the low noise amplifier 1806-2. When the radio 950 is "off," the switches 1804 operate to couple the radio(s) 940 and the antenna 1802-1 with the low noise amplifier 1806-2 in the receiver pathway. Thus, with respect to receiver chain sensitivity, the front end module 1800 has a higher receiver sensitivity when the low noise amplifier 1806-2 is used to couple the radio 940 and the antenna 1802-1. Given the selective operation of the low noise amplifier 1806-2 based on the activity of the radio 950, the risk of damage to the low noise amplifier 1806-2 is avoided, while still achieving improved sensitivity through the use of the low noise amplifier 1806-2. Therefore, the front end module 1800 is configured to couple the antenna 1802-1 to the radio 940 via the bypass line 1808 when the radio(s) 950 is active and transmitting signals using the antenna 1802-2 such that a signal received via the antenna 1802-1 is not amplified by the amplifier 1806-2 prior to being passed to the radio 940. The front end module 1800 is further configured to couple the antenna 1802-1 to the radio 940 via the amplifier 1806-2 when the radio(s) 950 is not transmitting signals using the antenna 1802-2 such that a signal received via the antenna 1802-1 is amplified by the amplifier 1806-2 prior to being passed to the radio 940.

Figure 19A:
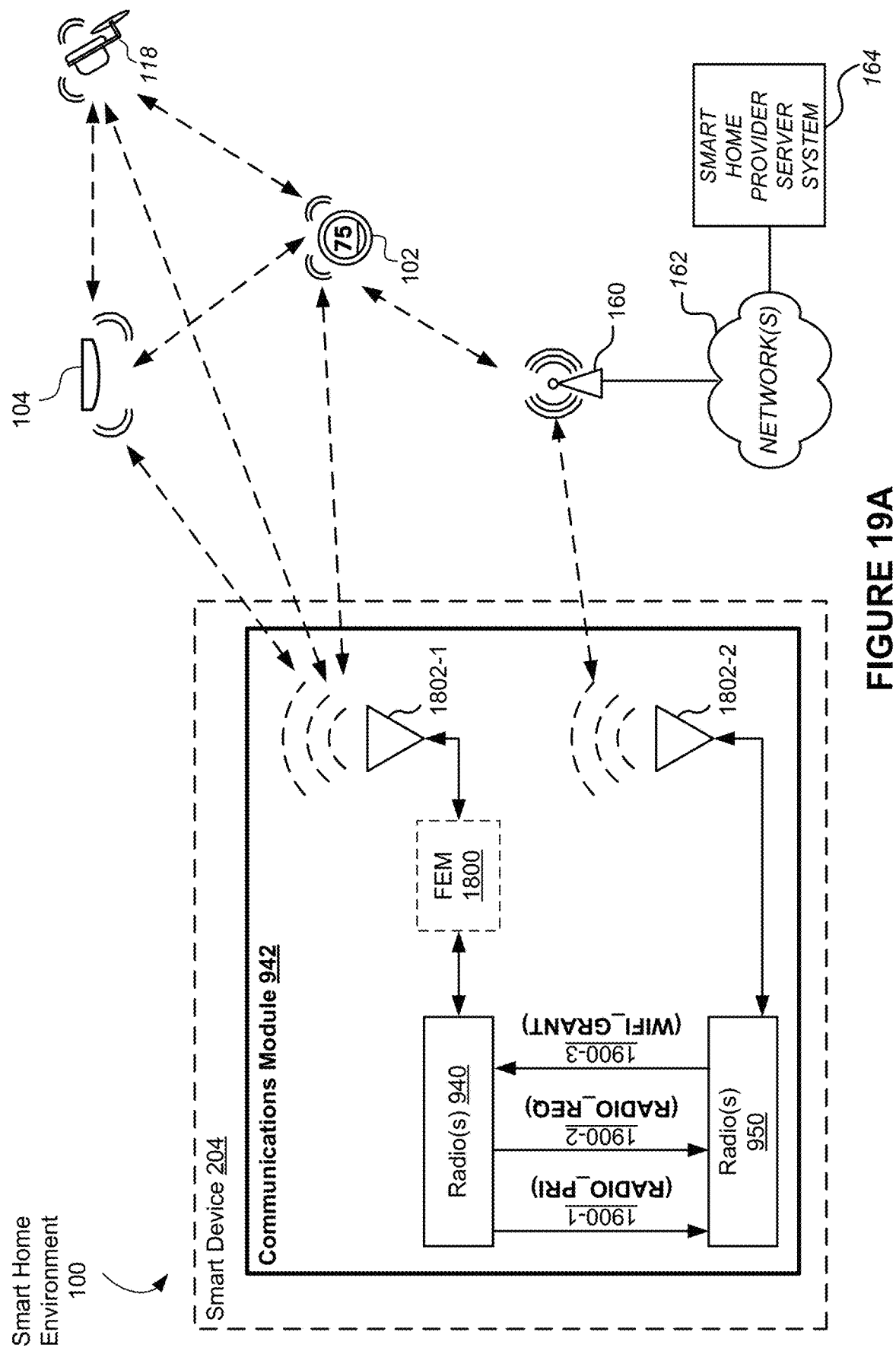
FIGS. 19A-19B illustrate a coexistence scheme for a smart device having multiple radios in smart home environment, in accordance with some implementations.
Figure 19B:
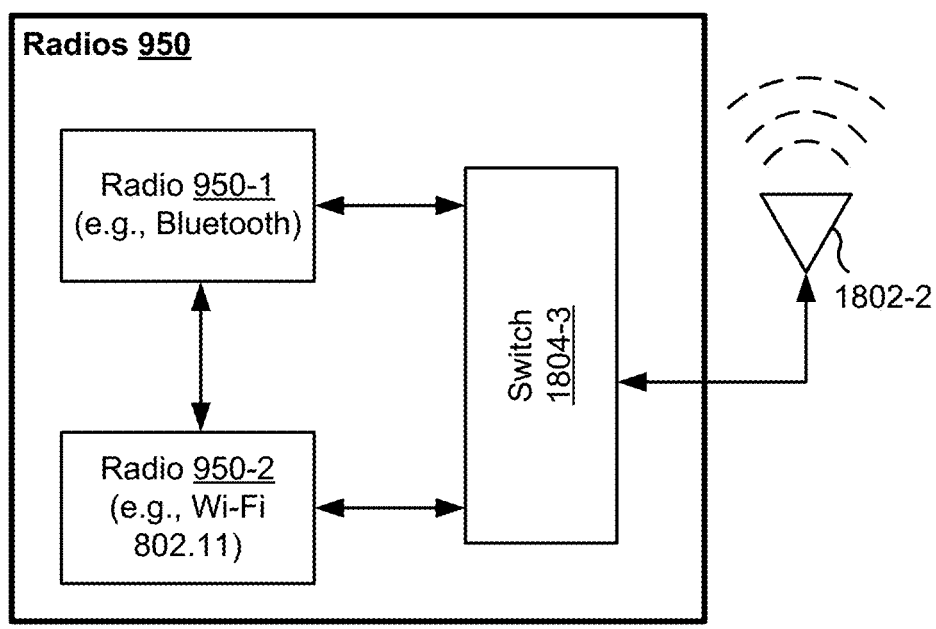

FIGS. 19A-19B illustrate a coexistence scheme for a smart device having multiple radios in smart home environment 100, in accordance with some implementations.

As illustrated in FIG. 19A, a smart device 204 (e.g., a camera 118) transmits data to and receives data from other devices and/or electronic tags in proximity (e.g., smart hazard detector 104, camera 118, smart thermostat 102, or electronic tag 206). Simultaneously, data (e.g., live video stream recorded by the camera 118) is transmitted to and from a remote server system over a network (e.g., a smart home provider server system 164, over the network 162 through a network interface 160). In some implementations, the various devices in the smart home environment 100 are also communicably connected and may therefore transmit/receive data from one another. The specific smart devices illustrated and described in FIG. 19A are merely examples, and other implementations include various combinations of smart devices (not illustrated).

In some implementations, a camera 118 (or any smart device 204 that generates high bandwidth output data) needs to transmit one more video streams at different resolutions (e.g., 180p, 780p and 1080p) to the server system 164 for additional processing, storage, and/or sharing with authorized users. In some situations, as when the video stream is a live, high definition (e.g., 780p or 1080p) video stream, this requires the camera 118 to maintain a low latency, high bandwidth connection to the server system 164 through the network interface 160 for a substantial period of time (e.g., from a few minutes to hours). This is accomplished in some implementations by the camera 118 employing a Wi-Fi connection provided by the network 162 to connect to the server system 164 to transmit video streams. At the same time, the camera 118 needs to be responsive to high priority alerts from other smart devices 204 so these alerts can be processed locally (e.g., used to change system state in the camera 118, transmitted to a hub device 180 for integration processing in view of other system alerts and status information, relayed to other smart home devices 204, or transmitted to client devices 504 that are configured to issue alerts directed to authorized users) and/or transmitted to the server system 164. In some implementations, these alerts are issued via Bluetooth or IEEE 802.11.15.4 signals by radios in other smart devices 204 (such as a smart hazard detector 304) and are received by corresponding radios in the camera 118 (or any comparable smart device 204). These alerts are typically of short duration and low bandwidth in contrast to streaming video, which is long duration and high bandwidth. In some implementations, these alerts need to be retransmitted to other smart devices 204 by the corresponding Bluetooth or IEEE 802.11.15.4 radios in the camera 118 (or any comparable smart device 204), which operate at the same frequency as the Wi-Fi radio (e.g., 2.4 GHz). This requires the camera 118 to prioritize use of the radios and antennas such that high priority transmissions received from other smart devices 204 (e.g., smoke or CO alerts) are transmitted with minimal latency, while during normal operation (e.g., when there are no incoming alerts from other smart devices 204), video streaming is enabled with high efficiency through the Wi-Fi radio. Devices with multiple radios (e.g., Wi-Fi, Bluetooth, and 802.11.15.4) may be utilized in a number of additional ways. In some implementations, for example, one or more radios of a device may be used for secure device provisioning (e.g., via Bluetooth). Additionally, as described above, one or more radios are optionally used for low-power communications (e.g., in devices not connected to a persistent power source). Moreover, one or more radios are optionally used for radar operations.

Any of the operations described above in which multiple radios are utilized require a co-existence strategy, described herein, that manages the use of multiple radios (e.g., 2 or more). In some implementations, the co-existence strategy enables multiple radios to use antennas with poor isolation from each other to transmit, without interference, signals at the same frequency or frequencies that would otherwise interfere (e.g., frequencies that are harmonics of one another). In some implementations, the co-existence strategy enables multiple radios to draw power, produce heat, and/or generate electromagnetic fields without interfering with one another.

In different implementations, a smart device 204 is any sort of home automation device that employs multiple radios for a variety of purposes, including purposes similar to those described herein. For example, the multiple radios include two or more of: a Wi-Fi radio to stream data to a cloud service or with a local network; a Bluetooth radio for configuration purposes; an IEEE 802.11.15.4 radio to enable communications with other home automation devices in smart devices in a smart home environment to; a radar radio to monitor position/movement of various objects; or purposes that differ in one or more ways from those purposes (e.g., without limitation, a Wi-Fi radio used to exchange data, alerts, and/or control commands with, and/or monitor communication status of, other smart home automation devices, a Bluetooth radio used to exchange data, alerts, and/or control commands with, and/or monitor communication status of, other smart home automation devices; an IEEE 802.11.15.4 radio used to transmit remote control commands and occupant presence information from one home automation device to another; and an RFID radio to enable communications with other smart devices and/or electronic tags in the smart home environment). For example, the smart device 204 can be a smart/connected appliance, such as a refrigerator, washing machine, dryer, or dishwasher; a home entertainment device, such as a television, digital video recorder, audio/visual receiver, connected speaker, or media projector; a home networking device, such as a network router, switch or network attached storage; a home security/access device, such as a connected door lock, garage door controller, or doorbell with integrated security camera or hazard detector; indoor and/or outdoor home lighting devices; landscape irrigation devices and controllers; automated home window coverings and/or skylights; and heating and cooling systems.

Each of the home automation devices 204 has specific features (e.g., end user features, operating features and/or network/collaboration features) based upon its type and purpose, and includes electronic and electromechanical components that can be controlled and/or automated to further the purposes/uses of a home automation environment and/or of the respective automation device. For example, a particular smart refrigerator with a rich set of connected features (i.e., features controllable via various network connections to other smart home devices and/or to applications running on end user devices—such as a smart phones, tablets, laptops or desktop) optionally has a compressor, ice cube maker, internal and exterior lighting, freezer section, refrigerator section, external display panel, processor, audio recorder/microphone, video camera, memory, proximity sensor and three different radios, all of which support one or more of inter-device communications and/or data streaming. Given a refrigerator configured as described above, in some implementations, temperature of the freezer and refrigerator sections, ice maker operation, etc. are optionally controlled over Wi-Fi, Bluetooth or IEEE 802.11.15.4 connections, refrigerator performance data and recorded and/or live audio and video are optionally sent over the Wi-Fi connection, and status and presence messages and alerts are optionally exchanged with other home automation devices using IEEE 802.11.15.4 connections. As another example, given a landscape irrigation controller with Wi-Fi, Bluetooth and IEEE 802.11.15.4 radios, the controller optionally transmits irrigation commands (e.g., ON and OFF) consistent with irrigation programs to outdoor sprinklers using IEEE 802.11.15.4 connections, obtains weather information (such as temperature and predicted precipitation from the Internet and/or local smart home automation devices—e.g., an outdoor moisture detector—via the Wi-Fi connection), and accepts operating and configuration commands from a smart phone running a corresponding irrigation application using Bluetooth or Wi-Fi connections. In these example implementations and other similar implementations, the multiple radios and their respective antennas are located in accordance with antenna placement principles described herein and the multiple radios are configured to co-exist (i.e., cooperatively transmit and receive over their associated antennas) using co-existence principles and signals described herein.

As shown in FIG. 19A, some implementations of a communications module 942 include one or more radio(s)

940, radio(s) 950, antennas 1802, an optional front end module 1800 (as described in FIG. 18), and one or more control lines 1900 which transmit signals between the one or more radio(s) 940 and radio(s) 950 (e.g., RADIO_PRI on control line 1900-1, RADIO_REQ on control line 1900-2, and WI-FI_GRANT on control line 1900-3). Various components of the communications module 942 are described in greater detail with respect to FIG. 9A.

In some implementations, the control lines 1900 are used to transmit control signals between one or more radio(s) 940 and radio(s) 950 to manage the operation of transceiver devices in accordance with a coexistence scheme. In particular, as described in greater detail below, control signals are transmitted as a means for indicating and determining a priority of signals being transmitted by the one or more radio(s) 940 and radio(s) 950. A transceiver determined to have a lower priority yields to a higher priority transceiver by suspending transmissions for a duration of time as the higher priority transceiver completes transmitting/receiving data, thus lessening or altogether avoiding the negative effects of poor isolation resulting from transceiver devices operating simultaneously. As an example, when the RADIO_PRI (i.e., request for transmission priority) and RADIO_REQ (e.g., request for transmission) control lines 1900-1 and 1900-2 are asserted by the radio(s) 940, the radio 950 yield to transmission requests by the radio(s) 940 by suspending its own transmissions while the radio(s) 940 transmit/receive data. Referring to the example in FIG. 19A, when the RADIO_PRI and RADIO_REQ control lines 1900-1 and 1900-2 are asserted, the radio 950 of the smart device 204 (e.g., Wi-Fi transceiver of a camera 118) momentarily suspend uploads of recorded video to the smart home provider server system 164, while permitting the radio(s) 940 (e.g., 802.15.4) to transmit critical packets received from a smart hazard detector 104 to a smart thermostat 102 by activating (or "asserting") the WI-FI_GRANT control signal. As another example, when the RADIO_PRI and RADIO_REQ control lines 1900-1 and 1900-2 are asserted, the radios 950 of the smart device momentarily suspend transmission of data while permitting the radios 940 to operate (e.g., perform radar operations). As a result, interference and transmission collisions are avoided between the transceiver devices, while reducing the risk of damaging hardware components (e.g., by exceeding device input power thresholds) and/or failing to transmit critical data (e.g., emergency pings from a smart hazard detectors 104).

In some implementations, one of the transceivers serves as a "master" device which receives requests for transmissions and moderates transmissions between itself and requesting transceivers. In the example shown, the radio 950 (e.g., Wi-Fi transceiver) is the master, as indicated by the directions of the control lines 1900 (i.e., with respect to the radio 950, WI-FI_GRANT is an output, and RADIO PM and RADIO_REQ are inputs).

The radio(s) 940 and/or the radio(s) 950 optionally operate in station mode (i.e., transceiver acts as a client that connects to an access point, such as a router), Access Point (AP) mode (i.e., transceiver acts as an access point through which other devices can connect and access other connected devices), and/or Ad-Hoc mode (e.g., mode in which network connected devices have equal status and may associate with any other network device in range). Furthermore, radio(s) 940 and/or the radio(s) 950 optionally operate in a variety of power modes (e.g., full power mode, power save mode). In the given example, the WI-FI_GRANT control signal is kept activated when the radio 950 is in power save mode.

Although the example illustrates the use of three control lines, other implementations may include additional control lines and control signals for determining a request priority of a transmitting device. Additional control lines and control signals may, for example, be used in implementations which include two or more radio(s) 940 or radio(s) 950 in a combined device (e.g., a combined Bluetooth and 802.15.4 chip), such that the plurality of transceiver devices can separately arbitrate with the master device.

Alternatively, in some implementations, two or more radio(s) 940 or radio(s) 950 are integrated as a combined device (e.g., a combined Bluetooth and Wi-Fi 802.11 chip), and a separate arbitration scheme is implemented such that the two radio(s) 940 or radio(s) 950 arbitrate internally before arbitrating with the other transceiver of the communications module 942. FIG. 19B illustrates an example of an internal arbitration scheme between transceivers combined in a single device (e.g., Bluetooth and Wi-Fi transceivers combined in a single device, shown by radio(s) 950-1 and 950-2, respectively). Using a switch 1804-3, for example, radio(s) 950-1 and 950-2 decide between each other (e.g., based on instructions and logic in the firmware of radio 950-1 and/or 950-2) as to which transceiver will have control over the antenna 1802-2. Thus, the example coexistence scheme of FIG. 19A operates independently from, but simultaneously with, any internal coexistence schemes implemented between radio(s) 940 or radio(s) 950 (e.g., coexistence scheme involving 802.15.4 or radar and Wi-Fi is independent from internal coexistence scheme involving Wi-Fi and Bluetooth).

While in describing FIGS. 18 and 19A-19B reference is generally made with respect to 802.15.4 and Wi-Fi, other implementations optionally include any combination of other transmission protocols, as described previously with respect to FIG. 9A.

In some circumstances, two or more networks of radar-equipped devices operate in proximity to one another such that signals from one network are detectable by the other network. In such circumstances, operation of one network can introduce noise into the other. For example, within a particular network the radar-equipped devices are configured such that only one device is transmitting a radar signal at any given time. In this example, a second network, not governed by the particular network, may transmit at the same time. The simultaneous or overlapping transmissions leads to imprecise and/or inaccurate results by one or both networks.

In some implementations, the particular network is configurable to operate at a plurality of distinct frequencies. The particular network performs a scan to determine whether other networks within signal range are operating at one or more of the plurality of distinct frequencies. The particular network then selects a particular frequency of the plurality of distinct frequencies so as to minimize interference with other networks. In some implementations, the particular network utilizes a radar scheme incorporating a pseudo-random sequence of phase shifts into the transmissions (e.g., using a PMCW scheme) so as to distinguish the network's transmissions from other networks' transmissions. In some implementations, the particular network adjusts one or more parameters of its transmissions so as to minimize interference with other networks. For example, the particular network adjusts the radar transmission period to minimize simultaneous or overlapping transmissions with other networks. In another example, the particular network adjusts the radar transmission bandwidth and/or start/end frequencies to minimize radar transmissions of the same frequency as transmissions from other networks.

In some implementations, the particular network utilizes a back-off protocol to establish or assert transmission priority. For example, the particular network communicates with one or more other networks via a wireless channel, such as Wi-Fi, to establish a radar priority or timing scheme. In another example, the particular network communicates with one or more other networks via the radar system to establish a radar priority or timing scheme.

Figure 20A:
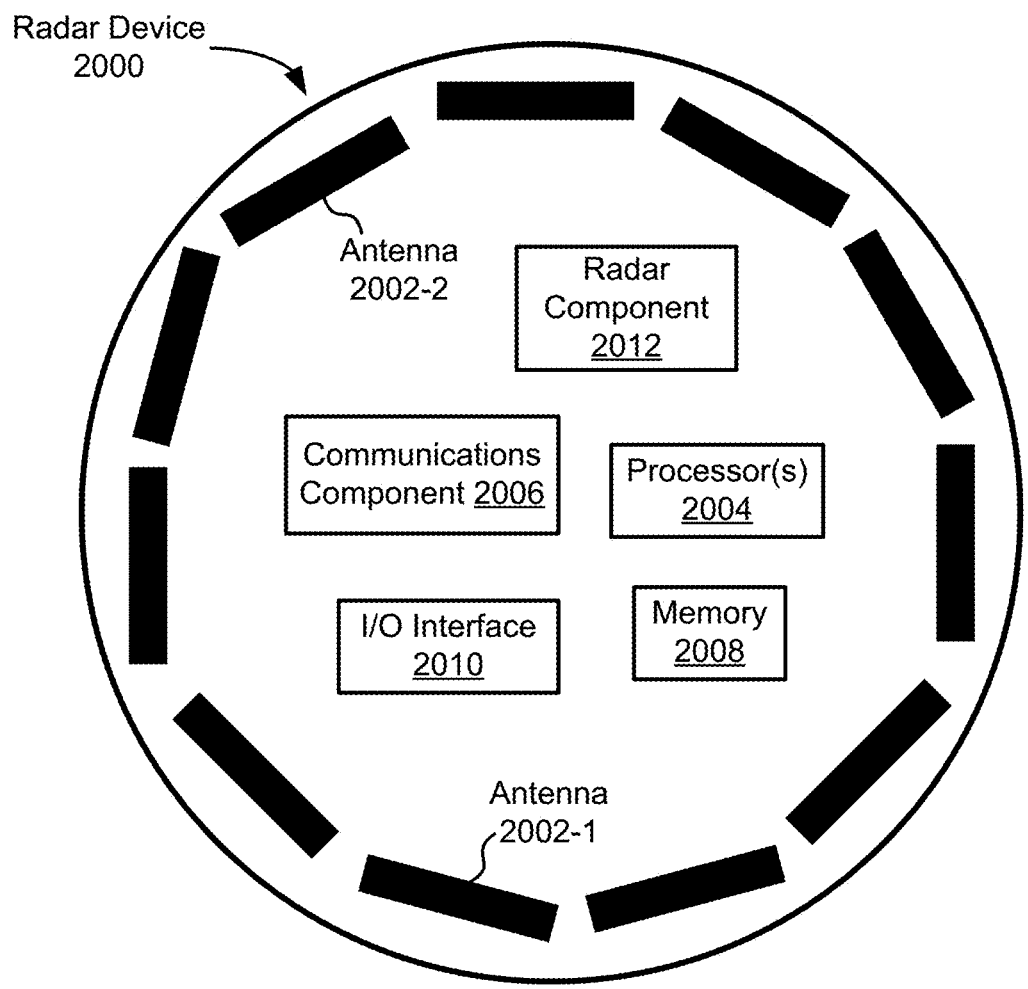
FIG. 20A illustrates a component view of a representative radar device, in accordance with some implementations.

FIG. 20A illustrates a component view of a radar device 2000, in accordance with some implementations. The radar device 2000 includes a plurality of antennas 2002 (e.g., antennas 2002-1 and 2002-2). The radar device 2000 also includes one or more processors 2004, memory 2008, I/O interface 2010, communications component 2006, and radar component 2012. In some implementations, the radar device 2000 comprises a smart device (e.g., a smart device 204, FIG. 9A). In some implementations, the antennas 2002 are configured for use with radar (e.g., using 3-10 GHz, 24-24.5 GHz, 57-64 GHz, and/or 77-81 GHz frequency bands). In some implementations, the antennas 2002 are configured for use with ultra-sonic radar. In some implementations, the antennas 2002 are arranged at set intervals along the perimeter of the radar device 2000. In some implementations, the antennas 2002 are arranged at irregular intervals along the perimeter of the radar device 2000. In some implementations, the antennas 2002 are arranged such that each antenna faces a distinct direction. In some implementations, the antennas 2002 are arranged within the radar device 2000 so as to receive radio waves coming from substantially any position along the perimeter of the radar device. In some implementations, each antenna 2002 is configured to transmit and/or receive at a same frequency or frequency band, while in other implementations, the antennas 2002 are configured to transmit and/or receive at a plurality of distinct frequencies.

The radar component 2012 couples to the antennas 2002 and facilitates radar operations. In some implementations, the radar component 2012 includes, or is configured to operate in a similar manner as, radio communication module 924, radar processing module 9324, and/or radar module 944. In some implementations, the radar component 2012 includes, or is configured to operate in a similar manner as, communications module 942 and/or communication interface(s) 904. In some implementations, the radar component 2012 is configured to govern operation of the antennas 2002. In some implementations, the radar component 2012 is configured to control transmission by the antennas 2002. For example the radar component 2012 determines which antenna should transmit at a given time and/or determines at what frequency the antenna should transmit. In some implementations, the radar component 2012 performs analysis on received radio waves using one or more radar techniques to determine the positioning/movement of detected objects. In some implementations, the radar component performs a preliminary analysis to generate initial radar data and the initial radar data is sent to a server system (e.g., server system 508) for further processing, analysis, and/or classification. For example, the radar component 2012 analyses received radio waves to detect one or more objects of interest. In this example, the radar device 2000 sends radar data corresponding to the radio waves to a server system and the server system performs additional analysis on the radar data. For example, the server system classifies the objects of interest (e.g., determines that an object of interest corresponds to a person) and/or classifies and event based on the objects of interest (e.g., determines that the objects of interest correspond to two people playing ball in the backyard). As another example, the server system determines whether each object of interest is within a particular perimeter and disregards of objects of interest it determines were outside of the particular perimeter.

In some implementations, the communications component 2006 is configured to facilitate wireless and/or wired communications between the radar device 2000 and one or more remote devices. In some implementations, the communications component 2006 is capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some implementations, one or more of the antennas 2002 are configured for wireless communication with remote devices (e.g., in conjunction with communications component 2006). In some implementations, one or more additional antennas (not shown) operate in conjunction with the communications component 2006 to facilitate wireless communication. In some implementations, the radar device 2000 is configured to concurrently transmit radar signals via one or more of the antennas 2002 and communicate with remote devices using the communications component 2006. In some implementations, the I/O interface 2010 includes one or more ports (e.g., USB ports), display(s) (e.g., LED displays), microphone(s), speaker(s), and/or other human interface element(s) (e.g., buttons, sliders, and the like).

In some implementations, the radar device 2000 is configured to monitor its environs via radar. In accordance with some implementations, the radar device 2000 emits one or more radar waves via a first antenna 2002 and receives one or more reflected radar waves via a set of the antennas 2002. For example, the radar device 2000 transmits a radar signal using the antenna 2002-1 and receives corresponding reflected radar signals using antenna 2002-1 and the adjacent antennas 2002. In some implementations, the radar device 2000 processes the radar signals using one or more radar techniques to ascertain the positioning and/or movement of objects/entities in the radar device's environs. In some implementations, each antenna 2002 transmits radar waves in turn. In this way, in accordance with some implementations, the radar device 2000 monitors activity in every direction along its perimeter. In some implementations, the radar device 2000 concurrently transmits radar waves via multiple antennas 2002. For example, the radar device 2000 concurrently transmits via antenna 2002-1 and antenna 2002-2.

As an example, at a first time both antenna 2002-1 and antenna 2002-2 transmit radio signals. During a first time window, antenna 2002-1 and adjacent antennas receive reflected radio signals corresponding to the radio signal transmitted by antenna 2002-1 at the first time. Also during the first time window, antenna 2002-2 and adjacent antennas receive reflected radio signals corresponding to the radio signal transmitted by antenna 2002-2 at the first time. Subsequently, at a second time, the antenna to the right of antenna 2002-1 and the antenna to the right of antenna 2002-2 concurrently transmit radio signals. In accordance with some implementations, this process continues as each antenna 2002 transmits in turn.

In some implementations, the radar device 2000 utilizes one or more of continuous-wave (CW) radar, step continuous wave (step CW) radar, phase-modulated continuous wave (PMCW), and frequency-modulated continuous wave (FMCW) radar. In some implementations, a phase difference between the transmitted radar signal (e.g., radio waves) and the received reflected radar signal is utilized to determine positioning and/or movement of detected objects. In some implementations, a timing difference between reflected radar signals being received at a first antenna 2002 and at a second antenna 2002 is used to determine positioning/movement of a detected object. In some implementations, relative positioning of the antennas 2002 is used to determine positioning/movement of a detected object.

In some implementations, the radar device 2000 is configured to determine whether each detected object comprises an expected object. For the example, radar device 2000 determines whether a new object is present within a particular area. In some implementations, the radar device 2000 identifies, or obtains identification for, a detected object and determines whether the detected object comprises an expected object. For example, the radar device 2000 identifies a detected object as comprising a car and determines that a car is expected at that location (e.g., within a driveway). In some implementations, the radar device 2000 is further configured to generate an alert in accordance with a determination that a particular detected object does not comprise an expected object. For example, the radar device 2000 detects a person within a backyard of the home environment and determines that a person is not expected to be within the backyard. Therefore, in this example, the radar device 2000 generates an alert regarding the detected person. In some implementations, the radar device 2000 is configured to perform one or more additional scans in accordance with a determination that a particular detected object does not comprise an expected object. For example, the radar device transmits radar waves via antenna 2002-1 and determines based on the radar waves that an unexpected object is present. In accordance with this determination the radar device transmits one or more additional radar waves via antenna 2002-1 (or one of the antennas adjacent to antenna 2002-1) to confirm the presence of the unexpected object and/or determine additional information about the unexpected object. In some implementations, the radar device 2000 is configured to determine whether each detected object has an expected velocity, and generate an alert if a detected object has an unexpected velocity.

In some implementations, the radar device 2000 utilizes occupancy data and/or data from other devices (e.g., other smart devices within the home environment) to determine whether an object comprises an expected object. In some implementations, the radar device 2000 utilizes machine learning to determine whether an object comprises an expected object. For example, the radar device 2000 monitors activity within the home environment to determine what objects and/or movements are to be expected.

Figure 20B:
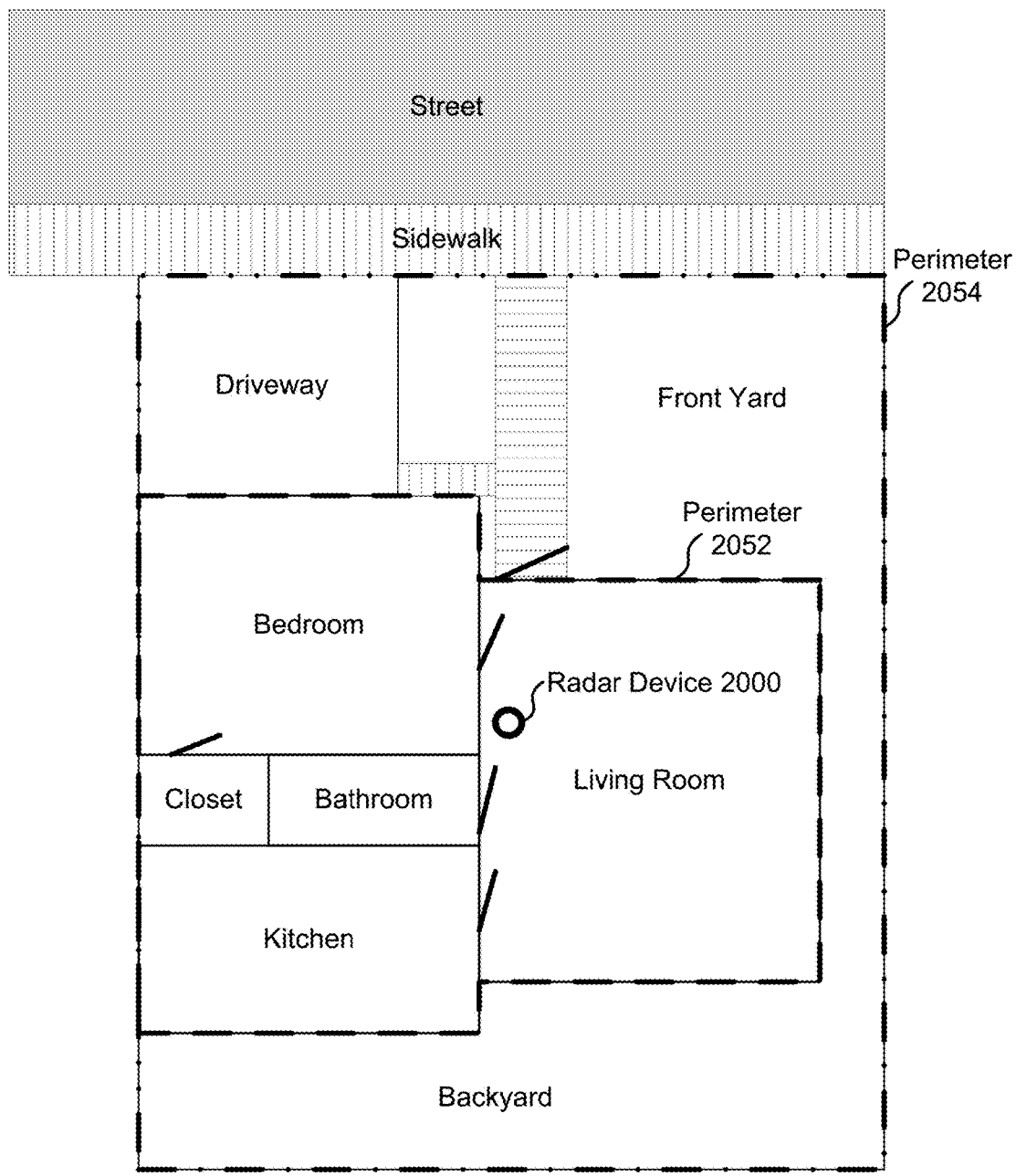
FIG. 20B illustrates a home environment utilizing a representative radar device, in accordance with some implementations.

FIG. 20B illustrates a home environment 2050 utilizing the radar device 2000, in accordance with some implementations. In accordance with some implementations, the radar device 2000 determines a perimeter of a home, office, or similar structure. In some implementations, the home perimeter includes an outer perimeter of a yard or outdoor area.

In some implementations, the radar device 2000 determines the perimeter of the home by obtaining a map or layout of the home. For example, the radar device 200 obtains a layout map (e.g., generated using depth mapping) from a second electronic device. In some implementations, the radar device 2000 utilizes a setup or mapping mode to determine the perimeter of the home. For example, a user of the radar device 2000 sets the device in a mapping mode then walks the perimeter of the home while the radar device 2000 tracks the path of the user via radar. In some implementations, the user of the radar device 2000 carries a radar tag and the radar device 2000 works in conjunction with the radar tag to track the user and map the perimeter of the home. In some implementations, the user of the radar device 2000 carries an electronic device (e.g., a smart phone) and the radar device 2000 works in conjunction with the user's device to track the user and map the perimeter of the home. For example, the user's device transmits positioning data, such as GPS data, to the radar device 2000 via one or more wireless networks (e.g., using Bluetooth low energy (BLE) and/or Wi-Fi). In some implementations, the user's device transmits movement data, such as velocity and/or acceleration, to the radar device 2000 and the radar device utilizes the movement data in conjunction with radar data to track the user's movements. Particularly in noisy environments, operating the radar device 2000 in conjunction with a radar tag or user device enables the radar device 2000 to more accurately and/or precisely track the user's movements and map out the home perimeter.

In some implementations, the radar device 2000 stores one or more mappings of the home (e.g., within memory 2008). In some implementations, the radar device 2000 obtains one or more mappings from a server system (e.g., server system 508). In some implementations, the radar device 2000 utilizes a perimeter mapping corresponding to perimeter 2052 to determine whether detected objects are inside or outside of the home. In some implementations, the radar device 2000 sends radar data to a server system and the server system utilizes a perimeter mapping to determine whether detected objects are within the perimeter. In some implementations, the server system is configured to disregard objects/motion detected outside of a perimeter (e.g., perimeter 2054). In some implementations, the radar device 2000 is configured to disregard objects/motion detected outside of the perimeter 2052. In some implementations, the mapping includes a first perimeter 2052 (e.g., an inner perimeter corresponding to a structure) and a second perimeter 2054 (e.g., an outer perimeter corresponding to the structure and surrounding lands). In some implementations, the radar device 2000 is configured to monitor objects/motion within the first perimeter 2052 utilizing a first radar configuration (e.g., utilizing a first radio frequency band), and monitor objects/motion between the first perimeter 2052 and the second perimeter 2054 utilizing a second radar configuration (e.g., utilizing a second radio frequency band). In some implementations, the radar device 2000 is configured to disregard objects/motion detected outside of the home environment (e.g., outside of perimeter 2054).

In some implementations, the mapping includes information regarding the location of entry points, such as doors, windows, and the like. In some implementations, the radar device 2000 monitors entry points to determine whether objects are entering or leaving the home environment. In some implementations, the radar device 2000 generates a notification or alert in response to detecting an unexpected object at one of the entry points, or in the vicinity of and moving toward one of the entry points. In some implementations, the mapping includes information regarding an interior of the home, such as the location of interior walls, doorways, furnishings, and the like. In some implementations, the radar device 2000 utilizes the home interior information to determine whether a detected object or movement at a particular location, or within a particular room of the home, is unusual or unexpected. In some implementations, the radar device 2000 utilizes the home interior information to adjust for attenuation of a radar signature of a detected object due to a wall or object between the radar device 2000 and the detected object.

In some implementations, the mapping includes labels for one or more rooms or zones within the home environment. For example, the radar device 2000 shown in FIG. 20B optionally stores labels for the Bedroom, Kitchen, Living Room, etc. In some implementations, the radar device 2000 utilizes the labels to inform a user as to where a detected object was located.

In some implementations, the radar device 2000 is configured to monitor objects/motion within the home perimeter(s) and generate alerts or notifications in accordance with detecting unusual objects or motion. In some implementations, the alerts or notifications are transmitted to a user device (e.g., a user's phone). In some implementations, the alerts/notifications include a description of the object and/or motion. For example, the radar device 2000 detects an unexpected object moving within the home environment 2050 (e.g., within the backyard) and identifies the object as a human walking. In this example, the radar device may send an alert stating that "A person was detected walking in your backyard." In some implementations, the radar device 2000 one or more radar characteristics of detected objects to identify the objects. For example, the radar device 2000 identifies an object as a human based on the person's dimensions, respiratory patterns, heartbeat, and/or gait. In some implementations, the radar device 2000 distinguishes between different types of animals and humans based on each animal and/or human's dimensions and/or gait.

In some implementations, a radar device in a home environment includes memory, one or more processors, and a plurality of antennas coupled to the memory and processor(s). In some implementations, the radar device is configured to: (1) transmit one or more radio frequency signals via at least one of the plurality of antennas; (2) receive one or more radio frequency signals corresponding to the transmitted signals; (3) utilize one or more radar techniques to determine positioning/motion of one or more detected objects based on the received signals; (4) obtain a determination as to whether the one or more detected objects include an unexpected object or an object with unexpected motion; and (5) generate an alert in accordance with obtaining a determination that at least one of the detected objects comprises an unexpected object or has unexpected motion. In some implementations, the radar device identifies at least one of the detected objects utilizing one or more radar techniques and information regarding the home environment and/or occupants of the home environment. In some implementations, the radar device is configured to have a field of view of 360 degrees. In some implementations, the radar device is configured to monitor activity all along its perimeter (e.g., in the 360 degree surrounding environment).

Clause 1: An electronic device, comprising: (1) one or more circuit boards; (2) a housing encasing the one or more circuit boards; (3) a communications module coupled to the one or more circuit boards, the communications module including one or more antennas and configured for communicating with one or more remote devices; (4) a radar module coupled to the one or more circuit boards, the radar module configured for generating radar data for a home environment and including: (a) one or more low power radar transmitters; and (b) one or more radar receivers; (5) a processor mounted to one of the one or more circuit boards, the processor configured to: (a) govern operation of the communications module and the radar module; (b) determine location and/or movement of detected objects in the home environment by analyzing the radar data; and (c) detect anomalies associated with the detected objects based at least in part on the determined location and/or movement of the detected objects; and (6) a power source coupled to the processor, the communications module, and the radar module.

Clause 2: The electronic device of clause 1, wherein the radar module is positioned so as to have a field of view of a front surface of the housing.

Clause 3: The electronic device of any one of clauses 1-2, wherein the radar module is configured to operate with a constrained detection range, less than the full detection range of the radar module.

Clause 4: The electronic device of any one of clauses 1-3, wherein the communications module is configured to communicate wirelessly with one or more remote devices.

Clause 5: The electronic device of any one of clauses 1-4, wherein the one or more low power radar transmitters and the one or more radar receivers are mounted on one of the one or more circuit boards.

Clause 6: The electronic device of any one of clauses 1-5, wherein the electronic device comprises a smart home device selected from a group consisting of: (1) a smart thermostat; (2) a smart camera; (3) a hub device; (4) a smart hazard detector; (5) a smart irrigation device; (6) a smart media playback device; (7) a smart entryway interface device; (8) a smart appliance; and (9) a smart security device.

Clause 7: A camera device, comprising: (1) an optical sensor for capturing images of a scene; (2) a radar module for generating radar data from objects in the scene, the radar module including: (a) one or more radar transmitters; and (b) one or more radar receivers; and (3) a communications module for communicating with one or more remote devices, the communications module including one or more antennas configured to communicate utilizing a particular communications protocol.

Clause 8: The camera device of clause 7, further comprising a plurality of LEDs for providing illumination.

Clause 9: The camera device of any one of clauses 7-8, further comprising a processor coupled to the optical sensor, the radar module, and the communications module, the processor configured for governing operation of the optical sensor, the radar module, and the communications module.

Clause 10: The camera device of clause 9, wherein the processor is configured to enable operations of the radar module and the communications module so as to avoid radio interference between respective radio transmissions of the radar and the communications modules.

Clause 11: The camera device of any one of clauses 9-10, wherein the processor is configured to determine occupancy in the scene based on the radar data.

Clause 12: The camera device of any one of clauses 9-11, wherein the processor is configured to recognize individuals in the scene based on biometric characteristics encoded in the radar data.

Clause 13: The camera device of any one of clauses 9-12, wherein the processor is configured to save biometric data of individuals in the scene for subsequent identification.

Clause 14: The camera device of any one of clauses 9-13, wherein the processor is configured to operate in a plurality of radar processing modes, including multi-dimensional, single-dimensional, and paired radar modes.

Clause 15: The camera device of any one of clauses 9-14, wherein the processor is configured to perform data fusion and integration processing based on substantially simultaneous camera data and radar data.

Clause 16: The camera device of clause 15, wherein the camera device is configured to transmit the radar data and camera data to a fusion server for event analysis and/or characterization.

Clause 17: The camera device of any one of clauses 7-16, wherein the particular communications protocol comprises a wireless communications protocol; and wherein the communications module further comprises one or more second antennas configured to communicate utilizing a second communications protocol, distinct from the particular communications protocol.

Clause 18: The camera device of any one of clauses 7-17, wherein the radar is responsive to motion of objects in the scene not detectable by the optical sensor.

Clause 19: The camera device of any one of clauses 7-18, wherein the one or more radar transmitters are configured to transmit a radio chirp; and wherein the one or more radar receivers are configured to receive radar waves corresponding to the radio chirp.

Clause 20: A thermostat device, comprising: (1) one or more temperature sensors; (2) a user interface configured to enable a user to adjust a desired temperature setting; (3) a radar module for generating radar data, the radar module including: (a) one or more radar transmitters; and (b) one or more radar receivers; and (4) a communications module for communicating with one or more remote devices including a heating, ventilation, and air conditioning (HVAC) device, the communications module including one or more antennas configured to communicate utilizing a particular communications protocol.

Clause 21: The thermostat device of clause 20, further comprising an energy storage device configured to selectively provide power to the one or more temperature sensors, the user interface, the radar module, and the communications module.

Clause 22: The thermostat device of any one of clauses 20-21, further comprising a processor coupled to the one or more temperature sensors, the user interface, the radar module, and the communications module and configured for governing operation of the one or more temperature sensors, the user interface, the radar module, and the communications module.

Clause 23: The thermostat device of clause 22, wherein the processor is configured to recognize individuals based on biometric characteristics encoded in the radar data.

Clause 24: The thermostat device of clause 23, wherein the processor is configured to adjust one or more temperature settings based on the recognized individuals.

Clause 25: The thermostat device of any one of clauses 22-24, wherein the processor is configured to save biometric data of individuals encoded in the radar data for subsequent identification.

Clause 26: The thermostat device of any one of clauses 22-25, wherein the processor is configured to enable operations of the radar module and the communications module so as to avoid radio interference between respective radio transmissions of the radar and the communications modules.

Clause 27: The thermostat device of any one of clauses 20-26, wherein the particular communications protocol comprises a wireless communications protocol; and wherein the communications module further comprises one or more second antennas configured to communicate utilizing a second communications protocol, distinct from the particular communications protocol.

Clause 28: The thermostat device of any one of clauses 20-27, wherein the thermostat device is located in a particular room, and wherein the thermostat device is configured to determine occupancy of the particular room based on the radar data.

Clause 29: The thermostat device of clause 28, further comprising a processor configured to adjust one or more temperature settings based on the occupancy determination.

Clause 30: The thermostat device of any one of clauses 28-29, wherein determining occupancy comprises determining whether an object in motion is a person based on the radar data.

Clause 31: The thermostat device of any one of clauses 20-30, wherein the one or more radar transmitters are configured to transmit a radio chirp; and wherein the one or more radar receivers are configured to receive radar waves corresponding to the radio chirp.

Clause 32: A hazard detection device, comprising: (1) one or more smoke detectors; (2) an alert module configured to alert users of detected hazards; (3) a radar module for generating radar data, the radar module including: (a) one or more radar transmitters; and (b) one or more radar receivers; and (4) a communications module for communicating with one or more remote devices, the communications module including one or more antennas configured to communicate utilizing a particular communications protocol.

Clause 33: The hazard detection device of clause 32, further comprising an energy storage device configured to selectively provide power to the alert module, the radar module, and the communications module.

Clause 34: The hazard detection device of any one of clauses 32-33, further comprising a processor coupled to the one or more smoke detectors, the radar module, and the communications module, and configured for governing operation of the one or more smoke detectors, the radar module, and the communications module.

Clause 35: The hazard detection device of clause 34, wherein the processor is configured to determine occupancy in a particular space based on the radar data.

Clause 36: The hazard detection device of any one of clauses 34-35, wherein the processor is configured to recognize individuals based on biometric characteristics encoded in the radar data.

Clause 37: The hazard detection device of any one of clauses 34-36, wherein the processor is configured to save biometric data of individuals encoded in the radar data for subsequent identification.

Clause 38: The hazard detection device of any one of clauses 34-37, wherein the processor is configured to enable operations of the radar module and the communications module so as to avoid radio interference between respective radio transmissions of the radar and the communications modules.

Clause 39: The hazard detection device of any one of clauses 32-38, wherein the particular communications protocol comprises a wireless communications protocol; and wherein the communications module further comprises one or more second antennas configured to communicate utilizing a second communications protocol, distinct from the particular communications protocol.

Clause 40: The hazard detection device of any one of clauses 32-39, further comprising one or more carbon monoxide detectors.

Clause 41: The hazard detection device of any one of clauses 32-40, further comprising a user interface configured to enable a user to disable an ongoing alert.

Clause 42: The hazard detection device of any one of clauses 32-341, wherein, in response to detecting a hazard condition, the hazard device determines whether an individual is in an area affected by the hazard condition based on the radar data.

Clause 43: The hazard detection device of any one of clauses 32-42, wherein the one or more radar transmitters are configured to transmit a radio chirp; and wherein the one or more radar receivers are configured to receive radar waves corresponding to the radio chirp.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first type of signal could be termed a second type of signal, and, similarly, a second type of signal could be termed a first type of signal, without departing from the scope of the various described implementations. The first type of signal and the second type of signal are both types of signals, but they are not the same type of signal.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An electronic device, comprising:
   one or more circuit boards;
   a housing encasing the one or more circuit boards;
   a communications module coupled to the one or more circuit boards, the communications module including one or more antennas and configured for communicating with one or more remote devices;
   a radar module coupled to the one or more circuit boards, the radar module configured for generating radar data for a home environment and including:
      one or more low power radar transmitters; and
      one or more radar receivers;
   one or more processors mounted to one of the one or more circuit boards, the one or more processors configured to:
      govern operation of the communications module and the radar module;
      determine location and/or movement of detected objects in the home environment by analyzing the radar data; and
      detect anomalies associated with the detected objects, the anomalies including movement of the detected objects in an unexpected manner and/or a determination that the detected objects are unexpected in the home environment, wherein the detection is based at least in part on a comparison between the determined location and/or movement of the detected objects and stored data of known objects found in the home environment; and
   a power source coupled to the one or more processors, the communications module, and the radar module.

2. The electronic device of claim 1, wherein the radar module is positioned so as to have a field of view through a front surface of the housing.

3. The electronic device of claim 1, wherein the one or more low power radar transmitters are configured to transmit a radio chirp;
   wherein the one or more radar receivers are configured to receive radar waves corresponding to the radio chirp; and
   wherein analyzing the radar data comprises analyzing the received radar waves.

4. The electronic device of claim 1, wherein the radar module is configured to operate with a constrained detection range, less than the full detection range of the radar module.

5. The electronic device of claim 4, wherein the constrained detection range corresponds to a perimeter of the home environment.

6. The electronic device of claim 1, wherein the communications module is configured to communicate wirelessly with one or more remote devices.

7. The electronic device of claim 1, wherein the one or more low power radar transmitters and the one or more radar receivers are mounted on one of the one or more circuit boards.

8. The electronic device of claim 1, wherein the one or more processors are further configured to generate a notification in response to detecting an anomaly.

9. The electronic device of claim 8, wherein generating a notification comprises sending an alert to a personal device of an occupant of the home environment.

10. The electronic device of claim 1, wherein the one or more processors are further configured to determine occupancy of at least a portion of the home environment based at least in part on the radar data.

11. The electronic device of claim 1, wherein the one or more processors are further configured to recognize occupants of the home environment based at least in part on the radar data.

12. The electronic device of claim 1, wherein the communications module is further configured to receive radar data from one or more remote device; and
wherein the one or more processors are further configured to detect anomalies in the home environment based on the generated radar data and the received radar data.

13. The electronic device of claim 1, wherein the electronic device includes one or more environmental sensors, the one or more environmental sensors configured to generate environmental data for the home environment; and
wherein the one or more processors are further configured to detect anomalies in the home environment based on the generated radar data and the generated environmental data.

14. The electronic device of claim 13, wherein the one or more environmental sensors includes one or more of:
an ambient light sensor;
a humidity sensor;
a temperature sensor;
a motion sensor;
an optical sensor;
an audio sensor; and
a smoke detector.

15. The electronic device of claim 1, wherein the electronic device is further configured to track a location and/or movement of one or more electronic tags within the home environment.

16. The electronic device of claim 15, wherein the electronic device is further configured to adjust one or more smart home settings at a smart home controller based on the location and/or movement of the one or more electronic tags.

17. The electronic device of claim 15, wherein the electronic device is further configured to generate a notification based on the location and/or movement of the one or more electronic tags.

18. The electronic device of claim 1, wherein detecting anomalies associated with the detected objects includes determining that a detected object has one or more of: an unexpected velocity, an unexpected acceleration, and an unexpected location.

19. The electronic device of claim 18, wherein the electronic device is further configured to obtain expected location and movement information for objects the home environment, wherein the expected location and movement information is based on historical data for the home environment.

20. The electronic device of claim 1, wherein the electronic device comprises a smart home device selected from a group consisting of:
a smart thermostat;
a smart camera;
a hub device;
a smart hazard detector;
a smart irrigation device;
a smart media playback device;
a smart entryway interface device;
a smart appliance; and
a smart security device.

* * * * *